United States Patent
Rubenstein

(10) Patent No.: US 11,360,945 B2
(45) Date of Patent: Jun. 14, 2022

(54) SYSTEM AND METHOD FOR INFORMATION SLINGSHOT OVER A NETWORK TAPESTRY AND GRANULARITY OF A TICK

(71) Applicant: UMBRA Technologies Ltd., Hong Kong (CN)

(72) Inventor: Joseph E. Rubenstein, Beijing (CN)

(73) Assignee: UMBRA TECHNOLOGIES LTD., Hong Kong (CN)

(*) Notice: Subject to any disclaimer, the term of this patent is extended or adjusted under 35 U.S.C. 154(b) by 0 days.

(21) Appl. No.: 15/781,664

(22) PCT Filed: Dec. 9, 2016

(86) PCT No.: PCT/IB2016/001867
§ 371 (c)(1),
(2) Date: Jun. 5, 2018

(87) PCT Pub. No.: WO2017/098326
PCT Pub. Date: Jun. 15, 2017

(65) Prior Publication Data
US 2019/0266132 A1    Aug. 29, 2019

Related U.S. Application Data

(60) Provisional application No. 62/296,257, filed on Feb. 17, 2016, provisional application No. 62/266,060, filed on Dec. 11, 2015.

(51) Int. Cl.
*G06F 16/182* (2019.01)
*G06F 9/48* (2006.01)
(Continued)

(52) U.S. Cl.
CPC .......... *G06F 16/182* (2019.01); *G06F 9/4881* (2013.01); *G06F 15/17331* (2013.01); *H04L 67/06* (2013.01); *H04L 67/1097* (2013.01)

(58) Field of Classification Search
CPC ............ G06F 16/182; G06F 15/17331; G06F 9/4881; H04L 67/1097; H04L 67/06
See application file for complete search history.

(56) References Cited

U.S. PATENT DOCUMENTS

| | | |
|---|---|---|
| 5,940,838 A | 8/1999 | Schmuck et al. |
| 6,209,039 B1 | 3/2001 | Albright et al. |
| | (Continued) | |

FOREIGN PATENT DOCUMENTS

| | | |
|---|---|---|
| CN | 101079896 A | 11/2007 |
| CN | 101282448 A | 10/2008 |
| | (Continued) | |

OTHER PUBLICATIONS

"Operations and Quality of Service Telegraph Services, Global Virtual Network Service," ITU-T Standard, International Telecommunication Union, Geneva, Switzerland, No. F.16, Feb. 21, 1995, pp. 1-23 (23 pages).

(Continued)

*Primary Examiner* — Sisley N Kim
(74) *Attorney, Agent, or Firm* — Wilmer Cutler Pickering Hale and Dorr LLP

(57) ABSTRACT

Systems and methods for file transfer and processing in a network environment are disclosed. In one embodiment, the system may comprise one or more processors. The one or more processors may be coupled to a first device. The one or more processors may be configured to retrieve a file from a file queue. The file may be stored in a local store of the first device. The file may be transferred from a second remote device via Remote Direct Memory Access. The one or more processors may further be configured to determine if the file is complete. The one or more processors may further be configured to remove the file from the file queue, if the file is determined to be complete.

10 Claims, 48 Drawing Sheets

(51) Int. Cl.
*G06F 15/173* (2006.01)
*H04L 67/06* (2022.01)
*H04L 67/1097* (2022.01)

(56) References Cited

U.S. PATENT DOCUMENTS

| | | | |
|---|---|---|---|
| 7,389,312 B2 | 6/2008 | Ohran | |
| 7,633,909 B1 | 12/2009 | Jones et al. | |
| 7,689,722 B1 | 3/2010 | Timms et al. | |
| 7,930,339 B2 | 4/2011 | Tobita et al. | |
| 8,107,363 B1 | 1/2012 | Saluja | |
| 8,611,355 B1 | 12/2013 | Sella et al. | |
| 8,966,075 B1 | 2/2015 | Chickering et al. | |
| 9,213,594 B2 | 12/2015 | Strasser et al. | |
| 9,277,452 B1 | 3/2016 | Aithal et al. | |
| 9,298,719 B2 | 3/2016 | Noronha et al. | |
| 9,641,612 B2 | 5/2017 | Yu | |
| 2002/0046253 A1 | 4/2002 | Uchida et al. | |
| 2003/0110214 A1 | 6/2003 | Sato | |
| 2003/0147403 A1 | 8/2003 | Border et al. | |
| 2004/0205339 A1 | 10/2004 | Medin | |
| 2005/0235352 A1 | 10/2005 | Staats et al. | |
| 2006/0075057 A1* | 4/2006 | Gildea | H04L 67/18 709/212 |
| 2006/0195896 A1 | 8/2006 | Fulp et al. | |
| 2006/0225072 A1* | 10/2006 | Lari | G06F 8/71 717/175 |
| 2007/0165672 A1* | 7/2007 | Keels | H04L 1/0083 370/474 |
| 2007/0168517 A1 | 7/2007 | Weller et al. | |
| 2008/0117927 A1 | 5/2008 | Donhauser et al. | |
| 2008/0247386 A1 | 10/2008 | Wildfeuer | |
| 2009/0003223 A1 | 1/2009 | McCallum et al. | |
| 2009/0092043 A1 | 4/2009 | Lapuh et al. | |
| 2009/0106569 A1 | 4/2009 | Roh et al. | |
| 2009/0129386 A1 | 5/2009 | Rune | |
| 2009/0217109 A1 | 8/2009 | Sekaran et al. | |
| 2010/0325309 A1 | 12/2010 | Cicic et al. | |
| 2011/0007652 A1 | 1/2011 | Bai | |
| 2011/0231917 A1 | 9/2011 | Chaturvedi et al. | |
| 2011/0268435 A1 | 11/2011 | Mizutani et al. | |
| 2012/0005264 A1 | 1/2012 | McWhirter et al. | |
| 2012/0082057 A1 | 4/2012 | Welin et al. | |
| 2012/0105637 A1 | 5/2012 | Yousef et al. | |
| 2012/0188867 A1 | 7/2012 | Fiorone et al. | |
| 2012/0210417 A1 | 8/2012 | Shieh | |
| 2012/0270580 A1 | 10/2012 | Anisimov et al. | |
| 2013/0110787 A1 | 5/2013 | Garimella et al. | |
| 2013/0283118 A1 | 10/2013 | Rayner | |
| 2013/0287037 A1 | 10/2013 | Bush et al. | |
| 2013/0318233 A1 | 11/2013 | Biswas et al. | |
| 2013/0322255 A1 | 12/2013 | Dillon | |
| 2013/0343180 A1 | 12/2013 | Kini et al. | |
| 2014/0210693 A1 | 7/2014 | Bhamidipati et al. | |
| 2014/0269712 A1 | 9/2014 | Kidambi | |
| 2014/0337459 A1* | 11/2014 | Kuang | H04L 67/2842 709/213 |
| 2014/0341023 A1 | 11/2014 | Kim et al. | |
| 2014/0359704 A1 | 12/2014 | Chen | |
| 2014/0369230 A1 | 12/2014 | Nallur | |
| 2015/0063117 A1 | 3/2015 | DiBurro et al. | |
| 2015/0063360 A1 | 3/2015 | Thakkar et al. | |
| 2015/0089582 A1 | 3/2015 | Dilley et al. | |
| 2015/0128246 A1 | 5/2015 | Feghali et al. | |
| 2015/0271104 A1 | 9/2015 | Chikkamath et al. | |
| 2015/0281176 A1 | 10/2015 | Banfield | |
| 2015/0326588 A1 | 11/2015 | Vissamsetty et al. | |
| 2016/0006695 A1 | 1/2016 | Prodoehl et al. | |
| 2016/0077745 A1 | 3/2016 | Patel et al. | |
| 2016/0117277 A1* | 4/2016 | Raindel | G06F 13/4068 710/112 |
| 2016/0134543 A1 | 5/2016 | Zhang et al. | |
| 2016/0165463 A1 | 6/2016 | Zhang | |
| 2016/0337223 A1 | 11/2016 | Mackay | |
| 2016/0337484 A1 | 11/2016 | Tola | |
| 2016/0364158 A1* | 12/2016 | Narayanan | G06F 3/067 |

FOREIGN PATENT DOCUMENTS

| | | |
|---|---|---|
| CN | 101969414 A | 2/2011 |
| CN | 102340538 A | 2/2012 |
| CN | 102457539 A | 5/2012 |
| CN | 103118089 A | 5/2013 |
| EP | 1498809 A1 | 1/2005 |
| EP | 1635253 A2 | 3/2006 |
| WO | WO-02/33551 A1 | 4/2002 |
| WO | WO-2006/055838 A2 | 5/2006 |
| WO | WO-2010/072030 A1 | 7/2010 |
| WO | WO-2013/120069 A1 | 8/2013 |
| WO | WO-2015/021343 A1 | 2/2015 |
| WO | WO-2016/094291 A1 | 6/2016 |
| WO | WO-2016/110785 A1 | 7/2016 |
| WO | WO-2016/123293 A1 | 8/2016 |
| WO | WO-2016/162748 A1 | 10/2016 |
| WO | WO-2016/162749 A1 | 10/2016 |
| WO | WO-2016/164612 A1 | 10/2016 |
| WO | WO-2016/198961 A2 | 12/2016 |

OTHER PUBLICATIONS

"Open Radio Equipment Interface (ORI); ORI Interface Specification; Part 2: Control and Management (Release 4)," Group Specification, European Telecommunications Standards Institute (ETSI), 650, Route des Lucioles; F-06921 Sophia-Antipolis; France, vol. ORI, No. V4.1.1, Oct. 1, 2014 (185 pages).

First Office Action, dated Jun. 3, 2020, for Chinese Patent Application No. 201680066545.X (11 pages).

Robert Russell, "Introduction to RDMA Programming," Apr. 17, 2014, XP055232895, last retrieved from the Internet Oct. 5, 2021: URL:web.archive.org/web/20140417205540/http://www.cs.unh.edu/~rdr/rdma-intro-module.ppt (76 pages).

Supplementary Partial European Search Report, dated May 20, 2019, for European Patent Application No. 16872483.9 (8 pages).

\* cited by examiner

| $P$ 35110 | $Q$ 35120 | $R$ 35130 |

$\underbrace{\phantom{XXXXXXXXXXXXXXXXXXXX}}$
$\Delta t$
35100

$$\Delta t = \Delta P + \Delta Q + \Delta R$$
35000

FIG. 35

| P 36110 | Q 36120 | R 36130 | P 36210 | Q 36220 | R 36230 |

$\Delta t = x$
36100

$\Delta t = y$
36200

$$\Delta t = \Delta P + \Delta Q + \Delta R$$
36000

$x \neq y$
36010

FIG. 36

| P 37110 | Q 37120 | R 37130 | P 37210 | Q 37220 | R 37230 |

$\Delta t = x0$
37100

$\Delta t = x2$
37200

$$\Delta t = \Delta P + \Delta Q + \Delta R$$
37000

SYSTEM AND METHOD FOR INFORMATION SLINGSHOT OVER A NETWORK TAPESTRY AND GRANULARITY OF A TICK

This application is a U.S. National Stage application under 35 U.S.C. § 371 of International Patent Application No. PCT/IB2016/001867, which claims the benefit of and priority to U.S. Provisional Application No. 62/266,060 filed on Dec. 11, 2015 and U.S. Provisional Application No. 62/296,257 filed on Feb. 17, 2016. The entire contents of each of these applications are incorporated herein by reference.

International Patent Application Nos., PCT/US15/64242, PCT/US16/12178, PCT/US16/15276, PCT/US16/15278, PCT/US16/26467, PCT/US16/26481, PCT/US16/26489, PCT/US16/37180, and PCT/IB16/00110 are hereby incorporated by reference in their entirety.

FIELD OF THE DISCLOSURE

This present disclosure relates generally to networks, and more particularly to speeding up of the transfer of data over medium to long distances by fundamentally modifying the nature of exchanges between sender and receiver devices. Methodology shift is from round-trip packet transfers to one-way slingshot-like file sending, as well as adopting principles of high performance computing to improve throughput.

This disclosure specifically describes a one-way information slingshot that saves complete, any-sized data files at near wire speed over a network tapestry to remote storage. The information slingshot can be integrated with existing network fabrics or it can be a standalone mechanism independently operating, or a blend of both.

The present disclosure also relates generally to software and networks, and more particularly, to the granularity of a tick of time governing the operations of higher level functionality.

BACKGROUND OF THE DISCLOSURE

Information Slingshot Over a Network Tapestry

The conventional technologies and the limitations or drawbacks of those technologies serve to demonstrate why a different approach can be beneficial. This present disclosure's features, methods and utility described herein outline how to build and use this technology. It also offers perspective of how this present disclosure imbues certain improvements to overcome the limitations of the conventional technologies.

This present disclosure can be beneficial to meet various networking needs. The utilization of this present disclosure by the financial industry is hereby offered as an example to illustrate features and how they overcome the drawbacks of the conventional technologies. However, the scope and scale of the application and use of this present disclosure transcends this narrow focus and are applicable for many other use cases.

The internet is a network of networks. A network fabric may be defined as either a network under the control of one administrative body, or as a type of network protocol such is Internet Protocol (IP), or for a network within a regional area, etc. Fabrics can be weaved together through the peering of network fabrics joined together at the edges. Methods such as network address translation (NAT) and others can be used.

A Global Virtual Network (GVN) is a network type which exists over-the-top (OTT) of the internet and it weaves layers of fabrics into a network tapestry with Egress Ingress Points (EIP) at each fabric edge.

One type of network fabric can be a Wide Area Network (WAN) which consists of a dedicated line such as Multi-protocol Label Switching (MPLS) or Digital Data Network (DDN) or other between two Local Area Network (LANS) points. These dedicated links can also be peered to other networks either on a one to one basis defined as single honed or as one to many networks relationship via a multi-honed peering, with many possible paths or routes through the middle between two or more end points.

A network fabric may also define the scale and scope of a network fabric type from end-to-end. Ethernet defines a type of network but this can also be further classified by protocols such Internet Protocol (IP) over Ethernet, such as Internet Protocol version 4 (IPv4), or Internet Protocol version 6 (IPv6), and other network types. Built on top of IP are protocols such as Transmission Control Protocol (TCP) and User Datagram Protocol (UDP). TCP over IP (TCP/IP) is more verbose and has greater built-in error checking and handling for reliability of data sent versus UPD over IP (UDP/IP) which is geared more for streaming data such as audio or video where one lost packet will not have a dramatically adverse effect.

In addition to different protocols and IP versions built on top of Ethernet, Ethernet itself has Ethernet, Gigabit Ethernet (available at speeds of 1 or 10 or 40 or 100 Gigabit) and other versions of it are expected to be introduced. Ethernet is at the time of writing the popular protocol of choice to connect various devices together which are able to communicate with each other.

Infiniband (IB) is an alternate protocol to Ethernet with IB utilizing different physical NIC ports, plugs, and cabling as well as IB operating in a different manner. To connect many nodes into a high performance computing/computer (HPC) environment, IB is the preferred choice. IB allows for native Remote Direct Memory Access (RDMA) between nodes by-passing the network and operating system (O/S) stacks of the host devices for access where the RDMA storage (or other) devices are connected. There are also alternatives such as Fiber Channel and other network technologies which may offer the ability to sustain fast native RDMA transfers and to save files over distance to a parallel file system (PFS) or into RAM or save to another remote storage device.

While fiber channel is an alternative to IB, for the sake of disclosure, this disclosure focuses on IB as being the network type of choice for connecting HPC nodes, especially over great distances. IB is used as an example for demonstration sake but any alternative network type which can provide similar base connectivity can be used as a substitute to support an Information Slingshot.

When comparing network types, reliability is of paramount importance. Another main driver affecting the choice of type of network and network protocol also has to do with time for communications to travel across the distance of the physical path. Latency is a measure of time for data to travel in one direction or can also be expressed as a round trip time (RTT) over a specified distance between two points. Bandwidth is a measure of the data transfer rate of a network segment, communications route, network fabric, or other network path.

There are rules of physics which are hereby being referenced as a foundation. As time and distance are significant, this disclosure uses the following baseline:

distances herein are measured in miles under the imperial system measures of distance herein can be a number with or without commas, and/or decimals, or may be expressed as an integer one exception for distance used is in the Refractive Index of Fiber Optic Cables noted below where the distance is expressed in a measure of meters under the metric system time is measured in seconds, expressed as integers, fractions and or decimals of seconds time units referenced herein are seconds, milliseconds (ms) and microseconds (μs)

any granularity finer than microseconds such as nanoseconds (ns) may be important in certain practical applications of this disclosure but for sake of demonstration, the finest granularity herein is μs.

In computing, the current main or standard measures of time for networking are milliseconds (ms) and for processing are microseconds (μs). The granularity of a tick of time can for example be measured either as a fraction (Every ¹⁄₂₀th or ¹⁄₁₀th or ¹⁄₁₀₀th) or as decimals (0.05, 0.1, 0.01) of a millisecond. The following table is a reference of some possible values and their corresponding equivalent conversion.

TABLE 1 measures of time

| # | Description | Seconds | Milliseconds (ms) | Microseconds (μs) |
|---|---|---|---|---|
| 1 | 1/10th of a second | 0.10000 | 100 | 100,000 |
| 2 | 1/20th of a second | 0.05000 | 50 | 50,000 |
| 3 | 1/100th of a second | 0.01000 | 10 | 10,000 |
| 4 | 10 microseconds | 0.00001 | 0.010 | 10 |
| 5 | 100 microseconds | 0.00010 | 0.100 | 100 |
| 6 | 1,000 microseconds | 0.00100 | 1.000 | 1,000 |

The following table compares the speed of light in a vacuum versus the speed of light inside of the glass core of optical fiber. This illustrates the physical limitation of fiber efficiency to establish a baseline for the theoretical best speed that one can hope to achieve for light to travel through fiber.

TABLE 2 fiber line speed taking into account drag on optical fiber latency due to refraction: Based on data found on site: http://www.m2optics.com/blog/bid/70587/Calculating-Optical-Fiber-Latency

| | miles/second in a vacuum | miles/second through fiber | fiber efficiency |
|---|---|---|---|
| Speed of light | 186,282.34 | 126,759.88 | 68.05% |

While the Refractive Index of fiber optic cables may vary slightly, an average is herein assumed as follows: Average of approx. 203 m to 204 m/μs vs. speed of light of 299.792 m/μs for an efficiency of 68.05%.

There exist specialized industries whose applications have an absolute requirement for the best quality of service (QoS) with lowest possible latency and zero packet loss over distance. These specialized industries need to exchange information for applications such as financial info, transaction execution to confirmation, scientific computing, and more. In many cases, a dedicated fiber optic line will be used for transport to offer more reliability and higher throughput than what could be expected for transport over the open internet.

One alternative to terrestrial fiber optic line communications is relay by satellite(s) transmission. Slingshot can operate over satellite links and it may be possible for communication speeds to approach the speed of light using such base transport medium. Satellite links are prone to bandwidth limitations, weather risks, cosmic interference, and other challenges. For this disclosure, the focus for Information Slingshot is for its demonstration to be deployed over terrestrial fiber optic line networks.

Ethernet and its combination of networking technologies is the most widely used network type deployed from the local area networks within offices, data centers and other clusters of devices to the global backbones linking networks operated by Internet Service Providers (ISPs) across the global internet. Internet Protocol—IPv4 while widely deployed is a victim of its own success as it faces a situation where the number of available IP Address is almost completely exhausted. Technologies such as NAT for devices in a LAN have helped mitigate this but have still not solved the problem and IPv4 addresses are consequently in very short supply. IPv6 has at its core what appears to be an ample supply of available IP addresses, however, IPv6 has not been deployed universally due to a number of factors, one of them being lock in of installed legacy equipment which only handles IPv4 and not both IPv4 and IPv6. Ethernet became the dominant network type and its wide use is prevalent both in the LAN and across the broader internet because it was a relatively easy standard to implement and to globally deploy. Network effects also come into play as more and more devices utilize a protocol or network type, it makes the decision easier for others to adopt the same, with a further incentive of high volumes leading to commoditization having the effect of driving down prices.

In the data center where concentrated computing, storage, processing and other operations are spread over various rack-mounted servers, a faster transport than Ethernet was required to back-channel connect these servers together for them to share data and communicate. Fiber channel and IB are two such technologies offering ultra-low latency and high capacity bandwidth. IB's lossless and parallel transfers offer strong advantages particularly alongside the deployment of Remote Direct Memory Access (RDMA) and also the opportunity to deploy and utilize a globally dispersed Parallel File System (PFS). The limitation of IB was that it was only deployable at a relatively short distance measured in meters. This was then extended to only a few kilometers. Until recently, IB "long-distance" links were limited to within a Metro Area Network (MAN) or between two nearby metro areas connecting data centers to each other via superfast IB over dedicated lines between them. Recent technologies allow IB to extend up to 20,000 kilometers between two IB gateway devices over a dark fiber line.

There are known drawbacks in the conventional techniques of Ethernet's IP protocol especially over long distance. IP's problems are inherently caused by how packets are sent. IP communications using its most popular protocol TCP/IP entail roundtrips and verbosity resulting in higher than necessary RTT.

IP transmits packetized data. Each packet includes headers, data payload, and possibly other information. The size of a packet allowed by an IP network fabric is defined as maximum transmission unit (MTU) and may be limited to hundreds of bytes to 4 KB or more but if the payload is larger than that set packet limit allows, to transport that data payload from point A to point B, the payload will need to be split into multiple-parts with two or more packets and subsequent roundtrips required per transmission and confirmation. Packet size also has an impact on whether or not a packet experiences fragmentation. It is common for a fragmented packet to get mangled if the fragmentation is forced by a middle-device which has a lower MTU than the other devices between network segments in a transmission path through a chain of devices. This drawback of IP can lead to dropped packets which have to be resent. Even if all packets arrive, fragmentation adds to congestion in the middle and can also flood receiving devices with more packets than expected. For example—if a sending device uses a common setting of 1500 bytes MTU, and breaks a payload into a stream of packets which are each 1500 bytes, the sending device will stream them out at the speed that the stack and NIC can handle up to the available bandwidth of the "last-mile" connection. And if a device in the middle on the internet has an MTU setting of 1492, then each packet flowing through this device will be fragmented or split into multiple packets. The result is that the receiving device is receiving double the number of packets that the sending device streamed. This can saturate and flood the receiving device leading to congestion and potential loss, or at least a slowdown. Furthermore, network devices are rated to send so many packets per second, regardless of how "full" a packet is. Fragmented packets are typically not full to capacity further lowering potential bandwidth potential with the knock-on effect of having a drag on network performance.

The reliability and verification of TCP/IP packets offer peace of mind but at great cost to speed and a forced rigidity because some disadvantages to IP over distance conventional techniques are that there are limits due to physical limitations and the nature of network protocol(s).

Specifically, packetized transport such as multipart packet transfer splitting up a larger payload risks being fragmented by a device in the middle which may not be able to or configured to handle a large payload.

Roundtrip transport of Ethernet/IP is known to have QoS degradation over distance with delays, known problems such as congestion which leads to delays, especially over distance. TCP/IP may catch a lost packet and will retransmit. While this is good from a reliability standpoint, it adds latency and congestion to networks.

It is important to also note how a data packet is handled by Ethernet because it has a store and forward model where a packet is received, examined and then forwarded only after the entire packet including full payload has been completely received and examined. Latency for this operation within a computer/router/network device to handle a packet of Ethernet traffic is approximately 100 microseconds (μs) per device. This drag of 100 μs delay per middle device for a packet to be received and passed on may seem miniscule but over a long distance pathway, this delay can be multiplied by passing through many devices. NAT also adds another small but still measurable friction point of resistance. Delay due to client-server methodology—prepare packet, send, transport, receive, combine packets, use—add bloat and unnecessary steps to a communication flow within the stack of an O/S of that device.

There is room for improvement in current IP protocols including need to lower latency, eliminate packet loss, and to solve other problems such as inefficiencies in packetization and bi-directional transfers, to address Bandwidth Delay Product (BDP) and related algorithms governing file transfers, and more.

While current trading methodologies have been engineered to be as efficient as possible with market information broadcast via UDP/IP multi-cast and trade orders & confirmations sent in the smallest possible packets via TCP/IP at the lowest latency, problems still exist. UPD/IP does not have the same error correction mechanism of TCP/IP and as such, neither the receiver nor the sender know if a packet is lost. And it is during times of heavy traffic where loss of packets is more likely, and this is precisely the time when it is imperative for traders to have the most complete information as possible.

There are also changes to computing which incumbent network protocols are going to have trouble addressing the need to move large amounts of data.

A new paradigm is required due to emerging technologies such as blockchain (and other distributed register technologies), industrial internet of things (HOT), remote medicine, and others where there exists a requirement for fast, reliable transmission of ever growing data payloads. Slingshot is a mechanism for information to be sent in one direction as a single file of virtually any size.

An Information Slingshot uses RDMA over IB or similar base network type to save a data file of unlimited size on to a remote storage device such as a PFS, and for a File Queue Manager (FQM) or similar mechanism on a device in that target remote region to pull the file from the PFS. Error correction is built into the storage device and subsequently governs the process writing of the file, just as a storage device connected locally interacts with an O/S within a host device. Slingshot is in a sense distributing what was an internal process to a globally distributed one. One-way transport is another feature of Slingshot realizing the efficiency of UDP/IP while achieving the reliability of TCP/IP addressing the need for confirmation of packets sent. Slingshot uses parallel stream file saves which have the effect of last byte arrival at or near the same time as the arrival of the first byte transmitted.

Slingshot can utilize any base network which can support RDMA and which has attributes similar to IB. Principals of high performance computing (HPC) such as RDMA, IB and other attributes provide foundation on top of which to build for a novel approach. Noting storage on a PFS device can be physical or virtual, or an HDD, SAS, SSD, RAM disk, or any other device which can provide fast storage medium and allows RDMA or equivalent type of direct remote access.

For this disclosure's demonstration, IB is utilized as an example network to run Slingshot on top of IB bandwidth under load can achieve 90 to 95 percent of theoretical BW maximum. IB features cut through switching where IB devices receive the headers of a packet, use logic for forwarding decision and pipe the payload onwards, even before the complete payload is received. IB therefore has extremely low latency compared with Ethernet. It is also much less verbose than TCP/IP or UDP/IP. It runs on top of dark fiber connections. Compared with Ethernet over dark fiber it still is relatively faster and if native RDMA is utilized, latency can be measured as one-way for effective transmission rather than two-way as RTT is for Ethernet TCP/IP.

In the scope of financial data transmission, this disclosure is a framework to harness tapestry and utilize advanced connectivity approaches to address the need to speed up global transaction execution and other demanding communications needs.

An important distinction is that Slingshot does not make a traditional file transfer but rather executes a file saved to remote storage. As a transport for a clump of various data payload "files", this slingshot method moves a larger block of data faster from one region to another region in a very efficient manner.

Significant gains across long distances. See enclosed Example Embodiments Figures and their explanations for more features.

Information slingshot can be integrated into a tapestry in a network type such as a GVN via egress ingress points (EIP) at the edges between fabrics such as EIP 2970 in FIG. 29 herein. Furthermore, using information slingshot mechanism as a base, other features can be supported such as Sling Hop (U.S. Provisional Patent Application No. 62/327,907), Information Data Beacon (U.S. Provisional Patent Application No. 62/327,846), Sling Route (U.S. Provisional Patent Application No. 62/327,911), and others.

HPC cluster with all nodes able to act as a control node putting files onto PFS storage locations for other nodes to retrieve. While it is possible for a node to pull files from a PFS in a remote region, the added latency for pulling and marking and moving files does not make sense. It is best for a sender to save the file into a PFS as close to the target as possible. A feature of this disclosure is for nodes to be aware of each other, of PFS storage instances, as well as the proximity of the PFS storage instance to the target device the sender wishes to have read the saved file.

Any file presented to the information slingshot mechanism, from any source, will be saved remotely in target region as a complete file. The File Queue Manager will retrieve the file from the queue on the PFS or from RAM or any other substitute storage medium. It will process the file, checking that it is complete at process time. Complete files will be available for the next computing chain.

An information slingshot overcomes the drawbacks of conventional techniques as it provides an efficient, fast viable framework for the sharing of large volumes of information between devices over large distances.

Transaction latency is significantly reduced. Long distance transmission is at near wire speed, without the need to split file into multiple parts nor to packetize at send or to have to reassemble packets. This disclosure also eliminates packet bloat of headers and multipart delimiter boundaries. Cut through transfer is vastly more efficient than store and forward of IP packet handling. Advanced error detection and correction on file write further provides higher efficiency.

The nature of information exchange transforms from sequential packet transfer to parallel multi-thread file transfer over distance and the parallel file save to storage in the remote region is more efficient.

There is also an added benefit of higher availability of files accessible via RDMA containing structure and extended payload facilitating much larger data transfers. RDMA has superfast read and write to/from storage devices without having to go through the host as this bypasses the stack both at origin and at destination.

Bottlenecks and points of resistance due to the nature of IP protocols are also avoided by this disclosure. No more need for packetization by saving complete files to a remote PFS for another device to pull and use.

Decoupling of roundtrip RTT nature of packetized communication to the one-way sending file put reduces transmission time. Another subtle advantage is that body data can be variable in file size.

For conventional technologies, if data to transport is larger than specified by the payload size of a packet, it will be split up into multi-parts and thus will require multiple roundtrips for transmission. This adds significant time to completion of transmission and more processing to create and then validate and re-assemble a multiple part message. Information slingshot offers a known and consistent transmission time between points without need of the sending device to split up the file nor for the receiving device to have to reassemble it.

It overcomes the delays due to cumulative total of various transmission times and processing times for a chain of packets. Where packetized Ethernet IP packet transmission time is calculated as RTT time*total number of packets, Information Slingshot gives a more precise timing mechanism.

Information Slingshot can send a file whole without the need to break data into multi-part payloads sent by a stream of packets as is done by Ethernet IP. This also has the positive effect of keeping data movement at a very low level, without having to task the CPU, RAM, or other elements of the stack of a device.

Information Slingshot further avoids the need to receive a stream of packets. Ethernet consumes valuable time and resources when it has to receive a stream of packets and then validates each one, makes sure that they are in the correct order, and then reassembles the data file.

The core advantages of Information Slingshot (RDMA OTT IB) are parallel streams when transferring, low latency, lossless transfer, zero-copy networking, reduced load on hardware via cut through switching, RDMA bypassing the stack of the host devices at both ends, native utilization of parallel file system (PFS), one-way transfer without need for confirmation packets, no RTT, just one way transfer, no "packet size limit".

The nature of a transfer via Slingshot can change how the composition of the transmission is approached. Data file header and body data can be more verbose, and can also include a file header and distinctive end-of-file (EOF) marker. Body Data including parameters, info array, algorithmic logic framework, and more can permit more feature rich data transmission. Data File Footer w/checksums, security and other integrity related items can also be included within the transmitted file.

This present disclosure may offer communications advantages. At long distance—near real time, with near wire-line speed may be achieved. At short distance can save μs (microseconds) from prior methods and the result is fast availability of data in as remote region. Information Slingshot changes how transactions are executed by speeding up transmission, simplifying addressing, allowing larger file payloads, and offering other advantages.

The enclosed figures and example embodiments describe more about the conventional techniques, the drawbacks of the conventional techniques and the features of this disclosure as well as how these features overcome the drawbacks of the conventional techniques.

The network slingshot and derivative technologies may provide benefits, such as, but not limited to: a) The network slingshot is a one-way fast delivery of data in one shot; b) There may be no need to packetize traffic, unlimited file size, arrival of first byte transmitted at near wire speed, with last bit arrival Δtime as fast as possible via dynamic parallel transmission streams scaled based on available BW headroom; c) High performance networking (HPN) based on Sling offers numerous advantages; and d) Other sling related tech can be discussed during meeting in a more formal disclosure.

Financial and other Network Technologies Based on Information Slingshot may provide benefits, such as, but not limited to:

1. Information conveyance via Data Beacon Pulser—Addresses issues with the feed of data from markets—among other advantages, there is no loss due to congestion or dropped packets, data is sent as files with unlimited file size. There is 100% reliability, point-to-point at near wire speed, regardless of distance between source and target.
2. Trade order to execution—occurs at near wire speed, enabling larger message types which can allow for the sending of complex algorithms from source host to a target host at edge of a market where a series of instructions can be carried out with bulk of logic sent at once as an integral data block versus the need for individual data packets.
3. Blockchain—while a lot of interest and attention has been paid to this technology, one issue not sufficiently addressed is that the height of the related data results in fairly large file size and that current IP protocols are not the most efficient transport. Slingshot and corresponding tech allow for the conveyance of the entire blockchain file at close to wire speed, with 100% reliability.
4. Integration of enhancements must also fit into the workflow of existing legacy networks at least locally within regions from the client/server devices to and from the sling mechanism. Information Slingshot's network components are designed to enhance the long distances between various networks in regions or areas and speed up the data flow between them.
5. Sling Hop may also be integrated as seamless & transparent segment into Existing IP Frameworks, such that: a) Permits integration into existing legacy IP path workflows; and b) optimization in the middle leverages sling advantages seamlessly yet transparently for client traffic through the sling hop.

TABLE 3

Comparing Ethernet IP Round-Trip-Time (RTT) versus Fiber Backbone (FBB) Latency:

| | | | Ethernet Internet IP RTT | Point-to-Point | FBB - one way Latency | |
|---|---|---|---|---|---|---|
| | | Locations | min./avg. | Distance | Milliseconds | Microseconds |
| # | From | To | (ms) | (miles) | (ms) | (μs) |
| 1 | New York | London | 65/73 | 3,465 | 27.3 | 27,335 |
| 2 | Hong Kong | London | 174/217 | 5,969 | 47.1 | 47,089 |
| 3 | New York | Singapore | 209.7/241 | 9,538 | 75.2 | 75,245 |
| 4 | New York | Los Angeles | 67/69 | 2,448 | 19.3 | 19,312 |
| 5 | New York | Tokyo | 142/172 | 6,737 | 53.1 | 53,148 |
| 6 | New York | Frankfurt | 73.4/87 | 3,858 | 30.4 | 30,435 |
| 7 | New York | Hong Kong | 191.6/253 | 8,058 | 63.6 | 63,569 |
| 8 | New York | Paris | 82/85 | 3,631 | 28.6 | 28,645 |
| 9 | New York | Sydney | 233/261 | 9,946 | 78.5 | 78,463 |
| 10 | Los Angeles | London | 131/144 | 5,447 | 43.0 | 42,971 |
| 11 | Los Angeles | Hong Kong | 168/168 | 7,245 | 57.2 | 57,155 |
| 12 | Los Angeles | Singapore | 193/215 | 8,788 | 69.3 | 69,328 |
| 13 | Los Angeles | Sydney | 163/166 | 7,497 | 59.1 | 59,143 |
| 14 | London | Sydney | 294/298 | 10,571 | 83.4 | 83,394 |
| 15 | London | Singapore | 172/188 | 6,748 | 53.2 | 53,235 |
| 16 | London | Frankfurt | 9/20 | 396 | 3.1 | 3,124 |
| 17 | Tokyo | Hong Kong | 43/55 | 1,788 | 14.1 | 14,105 |
| 18 | Hong Kong | Singapore | 30/31 | 1,609 | 12.7 | 12,693 |
| 19 | Point A | A + 100 miles | — ms | 100 | 0.8 | 789 |
| 20 | Point A | A + 1000 miles | — ms | 1,000 | 7.9 | 7,889 |
| 21 | Point A | A + 12000 miles | — ms | 12,000 | 94.7 | 94,667 |

Sources for Data:

https://www.sprint.net/lg/lg_start.php - ping tests between points http://www.verizonenterprise.com/about/network/latency/#latency - static tables for reference https://wondernetwork.com/pings/Hong+Kong - dynamic tables - can set base city and retrieve stats https://ipnetwork.bgtmo.ip.att.net/pws/network_delay.html - tables *(US)

https://ipnetwork.bgtmo.ip.att.net/pws/global_network_avgs.html - tables - global averages Sources for FBB latency figures:

FBB one-way latency calculated specifically for this disclosure.

The Granularity of a Tick

This disclosure describes the methodology to utilize very fine grained granularity for ticks of time to govern either fixed or variable data processing cycles. The time allotted for a cycle can be calculated dynamically based on a number of factors including the time required to process an item during a cycle. This information can be utilized to algorithmically calculate the limit of the maximum number of items which can be processed taking into account post-processed during a cycle of time. Information is available both to and from the application layer.

Software in the form of scripts or programs or routines or other types of blocks of code (SW) may be executed with a one-time trigger. In some instances, this is sufficient. However, there are types of SW which need to be run at regular and repeating time intervals.

Built into the UNIX and LINUX system is a scheduler called Command Run On (CRON) which will execute SW to run at a specific point in time. It can also set interval times. An alternative to a CRON job would be to have a Daemon running as a background process which has an internal clock with set time or other triggers at which point other SW jobs may be launched. In theory, these would operate like a CRON but could be set up in a more customizable manner.

A script may also be crafted in such a way that once executed, it keeps looping based on a condition that never becomes true to force an exit, or is based on a very large number of times which it is allowed to loop with a decreasing number every time it loops.

A combination of CRON launch and internal loop may be deployed in an instance when granularity of loop time is less than the minimum one minute required by a CRON tab set up. For example, if a certain event should occur every five seconds, a one minute CRON can be triggered and within that SW script, a loop which iterates twelve times (60 seconds/12 loops=5 second intervals).

A script may also run and then at the end of its execution, may call a new instance of itself to run again. This may have a sleep function at end to pause between its next runtime or can be set with a sleep of zero seconds implying a new call to itself to begin immediately at the end.

A related manager may be acting as a watchdog by doing something like monitoring a directory and when its file list is populated by a certain number of files, this may trigger the launch of another script for processing of the files. Therefore, the conditional launch of a SW script is based on a non-time based factor to be reached. A variation of this can be based on when a queue is full by quantity of items in the queue, by total memory size in RAM or in storage of the queue, or based on remaining free space, or other factors.

With regards to loops or execution of a SW script, there can be both internal and external conditions set such as a maximum execution time or a mechanism to try and make sure that a script or function or other routine is only run once. This checking to make sure that no duplicate instances are running is done to avoid two overlapping operations running at the same time which may interfere with one another.

A key HW operation is the internal system clock upon which many functions rely. Internal clocks are subject to drift over time, other running slower or faster than they should and therefore, updating them via regular running SW script.

Set execution time and intervals either hard coded into a script or as dynamic variables so that codependent scripts/routines/managers/modules or other software can utilize the same ticks parameters. These dynamic variables for ticks may either be set in a database, in an included flat file, may be calculated or otherwise generated.

One time triggers may have their uses but at times need to keep running, re-running code, scripts or routines and therefore the triggers need to be automated. In order to preserve system resources and also to have more control over these triggers, a framework tied to time to allow scheduling is required.

CRONs can be run at a specific time on a specific day or every X time unit or by various other calendar related timeframes. The smallest unit of time specified by a CRON is one minute. This is acceptable for certain system related tasks like log rotation, scheduled backups, or other routine procedures which can and should be automated. However, some tasks require granularity which is much finer than one minute as well as requiring more monitoring or control at the userland or user space software application layer.

In the instances of counting or conditional looping scripts or scripts which call themselves at termination of current cycle, there exist a few problems but one of the prime issues is that the next call is made at an indeterminate time. There are ways to keep track of run time and adding a sleep function to try to fire the next loop or call iteration at a regular interval. However, this is only applicable to a cycle which runs in less time that the interval time. In the instance that the cycle takes longer than the intended interval time, the next tick will be late and therefore may throw off the next cycles timing. Managing this process can become complicated very quickly. This therefore creates issues with regularity and dependability.

A daemon running a background process is very similar to a CRON but requires its own scheduler and manager to govern run times.

Conditional execution based on factors such as a list length, queue item quantity, free disk space or other factors may be efficient in some instances, are inefficient and inconsistent in other instances. Some items can get stuck in a queue for an inordinate amount of time. Also this does not take into account other factors so at times server resources are under-utilized and then at other times pounded by overutilization potentially causing other negative knock-on issues.

Loops within a script triggered per minute by a CRON are sequential and so if 12 loops in 60 seconds are prescribed then five seconds are allocated per loop. As noted above, if a loop only takes 3 seconds, a 2 second sleep can be issued at the end of the loop to keep it to 5 seconds regularity. The real problems arise when one or more loops is greater than 5 seconds which can push the script time to longer than 60 seconds. At the next minute, the CRON scheduler will call the next instance of the script which will begin its 12 loop cycles. Negative issues of concurrently running scripts can cause significant problems due to overlap handling of files, or in the case of transaction processing, if two scripts are executing a transaction, there can be unintended duplicates, or orphaned steps belonging to separate processes or other issues.

There are other negatives to the conventional techniques and these mainly deal with granularity in milliseconds (ms) or even finer granularity of time such as microseconds (µs). In computing, the current main or standard measures of time for networking are milliseconds (ms) and for some processing are microseconds (µs). The granularity of a tick of time can for example be measured either as a fraction (Every $\frac{1}{20}$th or $\frac{1}{10}$th or $\frac{1}{100}$th) or as decimals (0.05, 0.1, 0.01) of a millisecond.

In scheduling the running of software scripts, routines, etc. there exists a need for greater control over when it is triggered to run. For very fine granularity of time such as in the case when interval times are measured in ms or µs, an intelligent manager is required to regulate the granularity of ticks of time.

This manager requires an accurate and up-to-date system clock. Built into the manager are time updaters to keep the system clock as synchronized as possible to actual time. Utilization of best of breed agreement algorithms such as intersection algorithm or Marzullo's algorithm can be utilized.

This tick manager also relies on system resources monitors, on understanding system processing tasks, and other physical capabilities (and constraints), as well as other factors to base its estimation on how much time it should take for a cycle of a script or routine or other software call to complete its run.

By also looking at the items to process prior to processing, a more reasoned time estimate can be made. In the algorithmic calculation of how long a tick should take there are three main factors utilized in calculating the delta t or the amount of time from start of tick to the end.

The Granularity of a Tick $\Delta t = P + Q + R$ t=Delta time from the start of tick to end of the tick
P=Time for batch processing of items for this tick in the cycle.
Q=Time for post batch processing computing.
R=Time for delay to ensure no overlap between batch items and/or to set offset between ticks.

This granularity of a tick is based on a number of factors. The start time of a tick is either based on completion of last cycle called by a tick or according to a fixed time interval scheduled. There may be two types of cycles:

A fixed time cycle is based on an estimate for time per item to process (P) and then handle post processing (Q), a limited quantity of items is set. This limit ensures that each cycle does not run over time.

A variable time cycle allows for all items to be processed in that batch. The R delay time ensures that next cycle pulls a fresh batch and that all items in the last processed batch have been processed (P) and that post processing (Q) has been completed. For example, for files in a queue—a list can be processed at the P stage and then the files can be marked, moved, deleted or otherwise touched so that they do not get pulled in the next batch. The time delay (R) ensures that there is enough delay between last item processed and post-processed in last batch and the first item to be processed in next batch.

A component part of this tick manager is to maintain historical records of runtime data for each cycle. These logged records can be used to analyze periods of under usage and peak usage. It can also detect delays due to unprocessed items cut off because of limited time to deal with quantities per cycle. If this occurs too often, then it is an indicator that either more processing power is required, that the software is not efficient, or may indicate other issues such as database slowdowns or other needs for software refactoring, or other remedies to fix issues.

The tick can have granularity as fine as required by the application, can be set to run at a fixed interval, at variable intervals based on cycle length or other factors. The granularity of a tick allows for consistent network beacon flashes, slingshot related functionality, and other time reliant functionality.

For more features, see example embodiments as presented in the enclosed figures and their descriptions. Granularity of a Tick relies on timers, time circuits, time-keeping software, logic, time updaters and other time keeping and synchronization technologies, to be working properly in order that they provide accurate system time for internal clocks and other mechanisms. Granularity of a Tick is built on top of these time mechanisms.

Fixed time cycle tick granularity is set by dynamic variables and based on ever changing conditions. The number of items in a queue can also be set by dynamic variable or other factors. Constant testing, monitoring of resources, logging of current performance, comparison against past performances, determination of system load requirements, and other intelligent approaches offers significant power to determine how long each tick should take for processing (P), post processing (Q), and delay (R). And knowing how long each item should take to be processed during a cycle called by a tick permits for the setting of a limit of items to be processed during subsequent tick cycles.

The adjustable on-the-fly tick manager and metrics can indicate system health, identify need to upgrade, and also can be worked into a distributed processing configuration to pull resources on demand as required and as available. Algorithmic analysis on the fly governs how many items can be processed balancing available resources with how much those resources can physically process. Predictability and reliability are the result.

The intervals between ticks can also be adjusted accordingly based on both dynamic user requirements and the contextual reality of the situation.

This highly controlled tick manager at very fine time granularities such as ms or µs is advantageous for a number of reasons such as;

It prevents overlaps in batch processing during fixed tick calls

Runaway processes can be detected and controlled

Code inefficiencies can be identified allowing developers a framework to utilize as a basis from which to investigate and diagnose and more importantly to fix issues.

This offers a method for utilizing hardware (HW) more efficiently.

And more advantages are obvious to those skilled in the art.

The granularity of a tick forms the basis of reliable time intervals over top of which other software applications can be built. Such as for a network information beacon set to pulse at X ms regularity, or a slinghop, or other type of time sensitive application.

The monitoring data can also be made available at the software layer so that it can adapt its operations to current conditions and have time related information to utilize at a very high level.

Option of fixed time cycles or time adjustable cycles can benefit different scenarios. By having a manager running and monitoring cycles, during peak use where cycles run longer than intended, during less demanding times, those subsequent cycles can be run shorter to bring the cycles back into a regular interval to catch up with the schedule where it was previously delayed.

This manager and its data are easy to integrate as a flow manager into existing architecture to realize benefits. There also exist other applications and benefits which can be realized by having more control over the granularity of a tick.

SUMMARY OF THE DISCLOSURE

Systems and methods for file transfer and processing in a network environment are disclosed. In one embodiment, the system may comprise one or more processors. The one or more processors may be coupled to a first device. The one or more processors may be configured to retrieve a file from a file queue. The file may be stored in a local store of the first device. The file may be transferred from a second remote device via Remote Direct Memory Access. The one or more processors may further be configured to determine if the file is complete. The one or more processors may further be configured to remove the file from the file queue, if the file is determined to be complete.

In accordance with other aspects of this embodiment, the second remote device may be a backbone exchange server.

In accordance with other aspects of this embodiment, the system may further comprise a dedicated link between the first device and the second remote device.

In accordance with other aspects of this embodiment, the file may comprise a header, a body, and a footer.

In accordance with other aspects of this embodiment, the footer may comprise a marker that indicates an end of the file.

In accordance with other aspects of this embodiment, the file may comprise a key value pair.

In accordance with other aspects of this embodiment, the footer may comprise checksum to validate integrity of the body.

In accordance with other aspects of this embodiment, the Remote Direct Memory Access may be implemented based on at least one of Infiniband or fibre channel, or an alternative and equivalent network type.

In accordance with other aspects of this embodiment, the file may comprise executable code.

In accordance with other aspects of this embodiment, the one or more processors may further be configured to: if the file is determined to be complete, at least one of set a flag on the file, move the file to a folder or delete the file from the local store.

In another embodiment, systems and methods for governing granularity of time allocated to process a task are disclosed. In one embodiment, the system may comprise one or more processors. The one or more processors may be configured to determine a time duration needed to process a task. The time duration may be calculated based on a first duration to process the task, a second duration for post-processing related to the task, and a third duration as a delay.

In accordance with other aspects of this embodiment, the task may comprise a batch processing.

In accordance with other aspects of this embodiment, the time duration may be at least in one of microsecond or millisecond.

In accordance with other aspects of this embodiment, the time duration may be adjusted based on a historical record of runtime data for the time duration.

In accordance with other aspects of this embodiment, the second duration may comprise time needed for updating a status of the task.

BRIEF DESCRIPTION OF THE DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

FIG. 35 illustrates Delta Time=P+Q+R.

FIG. 36 illustrates timing of various cycles where X≠Y.

FIG. 37 illustrates timing of various cycles where X is consistent.

DETAILED DESCRIPTION

Figure 1:
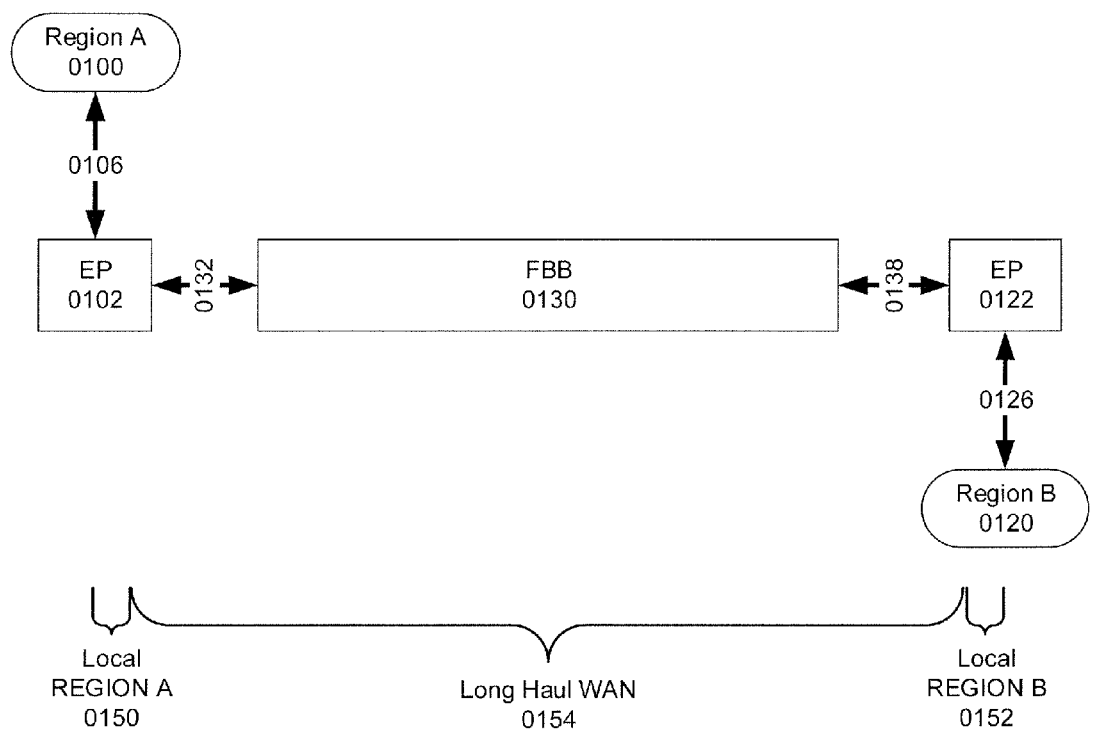
FIG. 1 shows comparison of distances for segments of a data path over long distance.

FIG. 1 shows comparison of distances for segments of a data path over long distance. This example embodiment describes a dedicated line between two end points connecting networks at either end. It is a common misconception that communications over long distance through optical fiber travels at the speed of light however, the true wire speed is at best 68% efficient (see Table 2 herein) as compared to light speed. For communications data transfer over distance in for example the passing of financial information, making a trade request, receiving a confirmation or some equivalent type of information exchange, a lot of effort has been expended to make the path as efficient as possible. While enhancements may be possible through continued innovation at either local regional zones, the relative amount of time (delta time (Δt)) saved in one or both of these local regional zones is much smaller compared to the time over the Long Haul WAN 0154.

This example embodiment demonstrates a linking of a network in Region A 0100 to a network in Region B 0120, connected by a dedicated path over a fiber backbone connection FBB 0130. The FBB 0130 is connected at both ends by end point devices (EP) 0102 and EP 0122 that act as anchors at either end 0132 and 0138 of the bridge over the FBB 0130.

The shortest distances are within each region Local Region A 0150 and Local Region B 0152. The longest distance is over the Long Haul WAN segment 0154 and it is over this segment where the greatest improvements can be realized (e.g., method of transport—most significant distance over the longest segment—FBB 0130) Per the timing of end to end transfer of data from a device in network in Region A 0100 to devices in a network in Region B 0120 consists of three blocks of network segments. Local Region A 0100 from devices in 0100 to end point 0102 via communications path 0106.

The long haul between regions is from EP 0102 to FBB 0130 via communications path 0132 and at the other end via 0138 to EP 0122. Finally, the local network segment 0126 from EP 0122 to devices in Region B 0120.

In a scenario such as financial trade instruction or information transmission, Long Haul WAN 0154 segment could represent a significant and major portion of time required for end-to-end 0100 to 0120. Therefore, it is essential to improve the connectivity of the Long Haul WAN 0154 segment.

Figure 2:
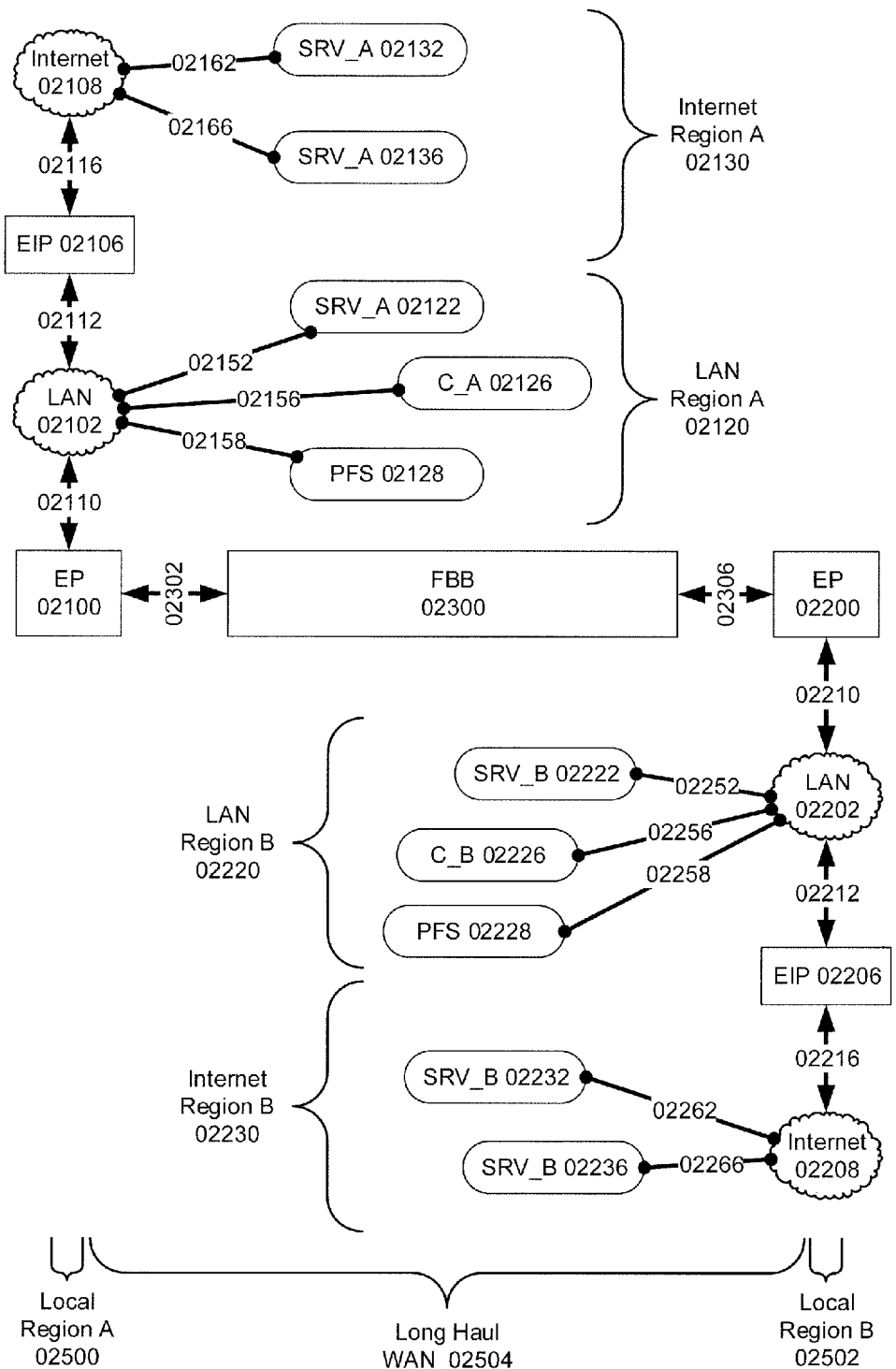
FIG. 2 illustrates exemplary problem with long distance transactions.

FIG. 2 illustrates exemplary problem with long distance transactions. This figure is an example embodiment based on Figure #1, extending the path on both ends of the network out of EP 02100 and EP 02200 via paths 02302 and 02306.

At each end in Region A where EP 02100 is located and Region B where EP 02200 is located, it links EP to a LAN 02102/02202 and also illustrates an egress ingress point (EIP) 02106/02206 on each LAN to the open internet 02108/02208 at EIP 02106 and EIP 02206 via connecting paths such as 02116 and 02216, following standard gateway to point of presence (POP) to Internet methodology used in widespread practice today.

For example, each LAN 02102/02202 and Internet zone 02108/02208 illustrated has various devices connected to those networks. In the case of each LAN for example LAN 02102, devices are connected to it such as a server SRV_A 02122, a client C A 02126, and a parallel file system node (PFS) PFS 02128 via paths 02152, 02156 and 02158 respectively. The internet for example Internet 02108 has two servers SRV_A 02132 and SRV_A 02136 connected to it via communications paths 02162 and 02166.

In an actual use case, there may be the same quantity of or more or less devices connected to each network zone LAN 02102, Internet 02108, LAN 02202, Internet 02208 than what is described herein. The quantity and types of these connected devices are only for illustrative purposes.

Other devices can be utilized such as routers, firewalls, managed switches, servers and other types of devices can govern how the traffic can flow within and between various networks.

Figure 3:
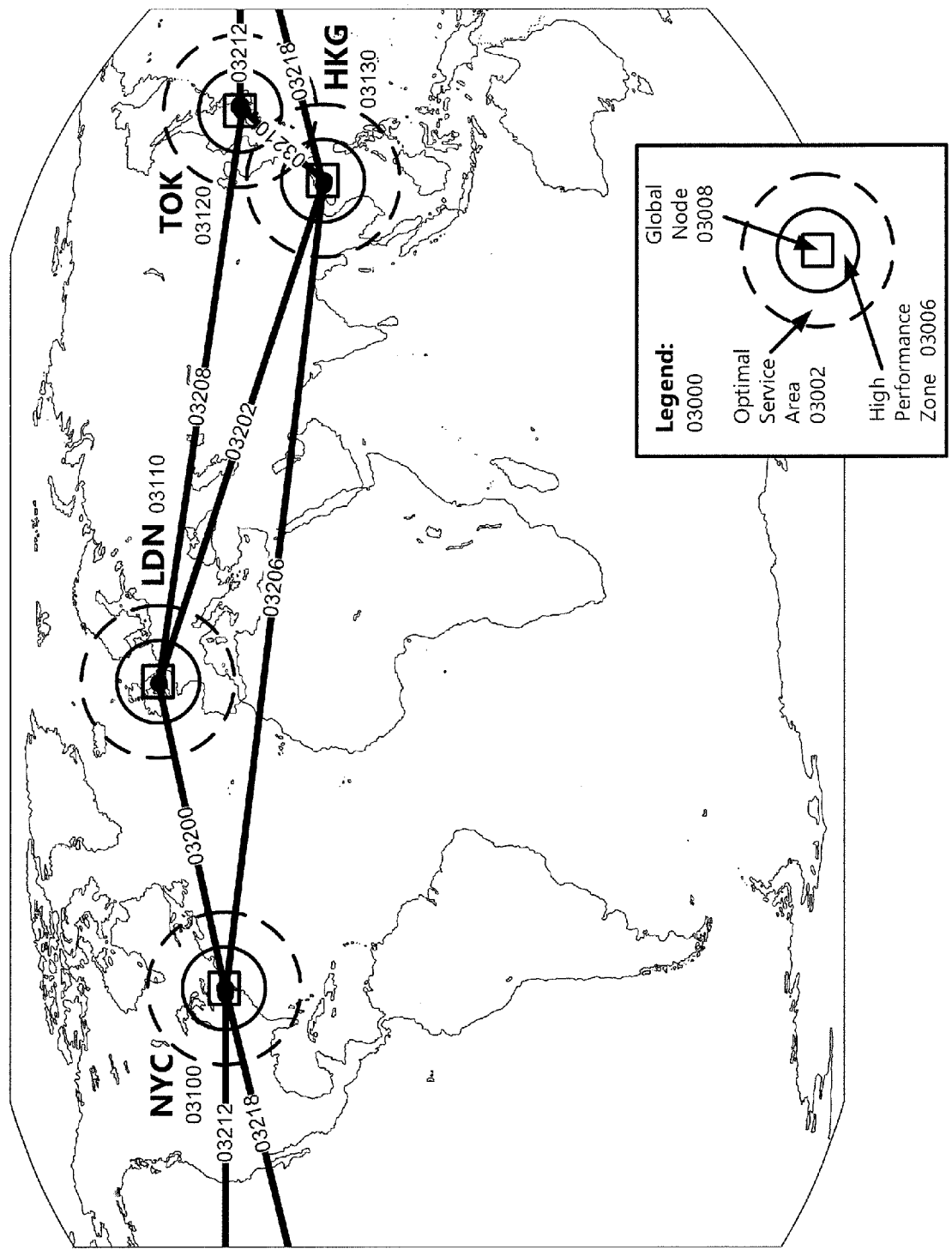
FIG. 3 illustrates exemplary conventional technique execution in the real world.

FIG. 3 illustrates exemplary conventional technique execution in the real world. This example embodiment describes the placement of and connections between slingshot nodes located in some of the world's major financial markets, in three regions—North America, Europe and Asia.

As described in the Legend box 03000 at the bottom right, each financial market noted herein is from a networking perspective described as a Global Node 03008. Around the Global Node two rings denote the type of connectivity quality zone in for example purposes a radius from the center where the market or exchange is located. This is for simplification only as many factors determine the size and shape of these zones. However, the two zones can be differentiated from each other as the closest one being a High Performance Zone 03006 and the other being an Optimal Service Area 03002.

Markets are connected to each other via High Performance Network links to share pricing information and also to facilitate the processing of trade orders and to provide transaction confirmation of trades, and other information from remote locations to a market in another location.

The further away a market is from a querying client or server or other type of device, the longer it takes for information to flow, including pricing, volume or other real-time market information, transactional requests, fulfillment confirmations whether order filled or not, or other types of data exchange.

Zones indicated herein are:

NYC 03100 for New York, N.Y., USA

LDN 03110 for London, England UK

TOK 03120 for Tokyo, Japan

HKG 03130 for Hong Kong, SAR, China

There are many other markets around the world which are significant but those noted were indicated for illustrative purposes. There are also paths indicated between each market such as 03200 between NYC 03100 and LDN 03110. In reality, there are a multitude of paths representing undersea cables between the two points. This was meant to simplify the example illustrated herein.

The lower the latency between the points, the faster market information can be known and more rapid transactional related information can be executed and processed.

Figure 4:
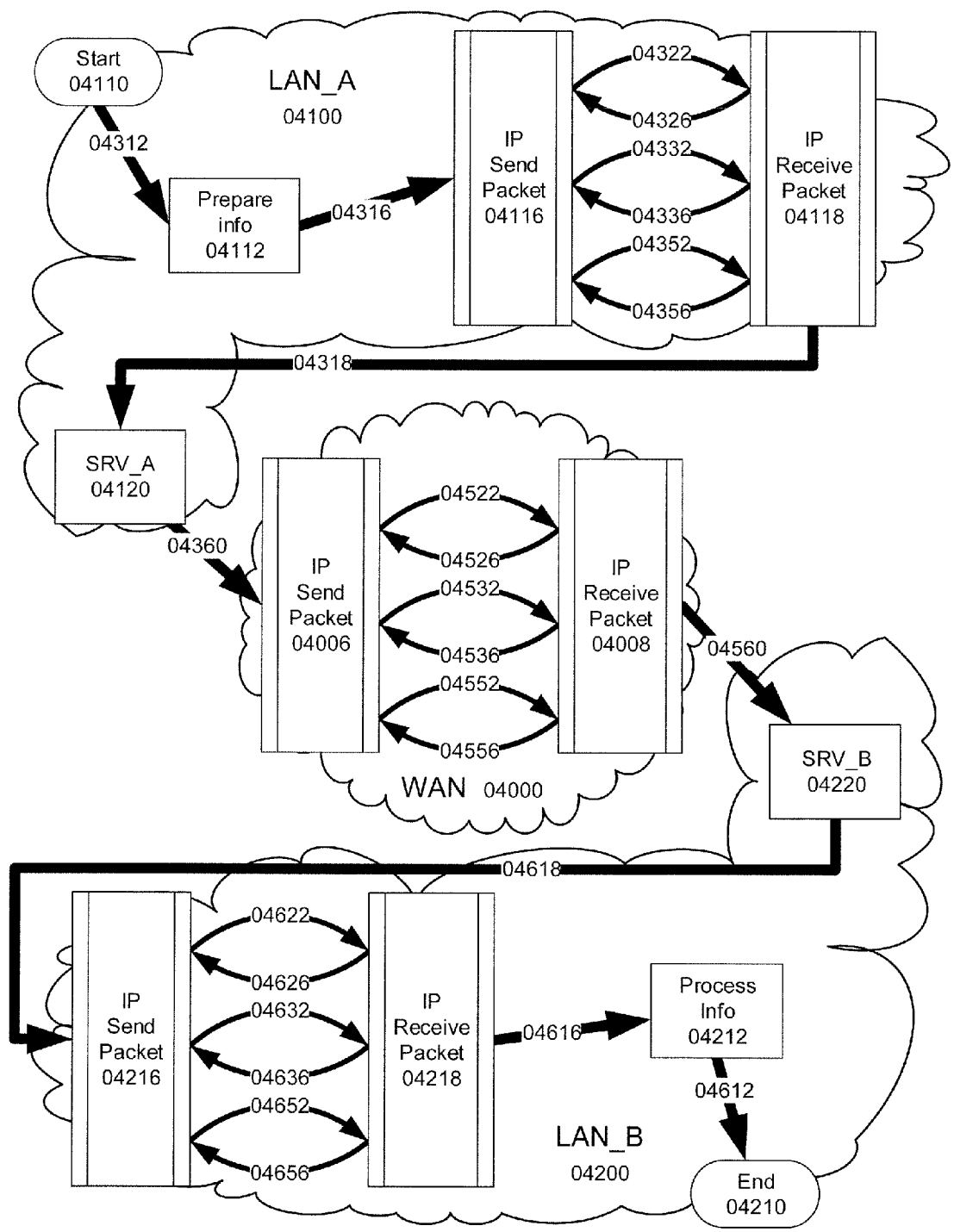
FIG. 4 illustrates current tech inefficiencies.

FIG. 4 illustrates current tech inefficiencies. This figure describes the conventional techniques of packetization of data transmitted over an IP network.

The communications path described herein is from Start 04110 to End 04210.

LAN_A 04100 is connected to WAN 04000 to LAN_B 04200 as a process flow illustrating packetized information flow. The information is prepared on a device at step 04112 and sent to a server or via a server 04120. This figure demonstrates the sending of a stream of packets in an IP-send/IP-receive process.

Paths 04322, 04332, 04352, 04522, 04532, 04552, 04622, 04632, 04652 are the send of one of a multiple number of multi-packet transmit packets. Paths 04326, 04336, 04356, 04526, 04536, 04556, 04626, 04636, 04656 are the packet confirmation denoting that it was received. A lost packet will not arrive at destination device and therefore this confirmation will not be sent back to the origin device. It is also possible for a packet to arrive at destination but for the confirmation to be lost in transit.

Take total packet size allowed minus header(s) size, minus footer(s) size, and that equals the largest size allowed for the payload of a single packet.

To calculate the total payload size:

payload size=allowed payload size−header size−footer size

The total number of packets needed to send a data file sized X is:

$$\text{Number of Packets} = INT \cdot \text{rounded} \cdot \text{up}\left(\frac{\text{size of data to send}}{\text{calculated payload size}}\right)$$

Therefore, a larger data size needs to be packetized into a stream of packets.

This figure illustrates an example where the packet may be relayed between devices rather than just having packets simply just passed on where at more than one stages, the data is broken into various packets and then reassembled into a data file once all packets are received at process as illustrated in IP Send Packet 04116 to IP receive packet 04118.

For example, SRV_A 04120 can query a market or other data source for information and will buffer that locally before replicating that information via IP Send Packet 04006 to IP Receive Packet 04008 to SRV_B 04220.

And further down the line, a client may Process Info 04212 by querying SRV_B 04220 via IP Send Packet 04216 to IP Receive Packet 04218.

The key point is that packetizing of data into packet allowed sized payloads and then re-combination at destination or source can occur at multiple times along a communications path.

Figure 5:
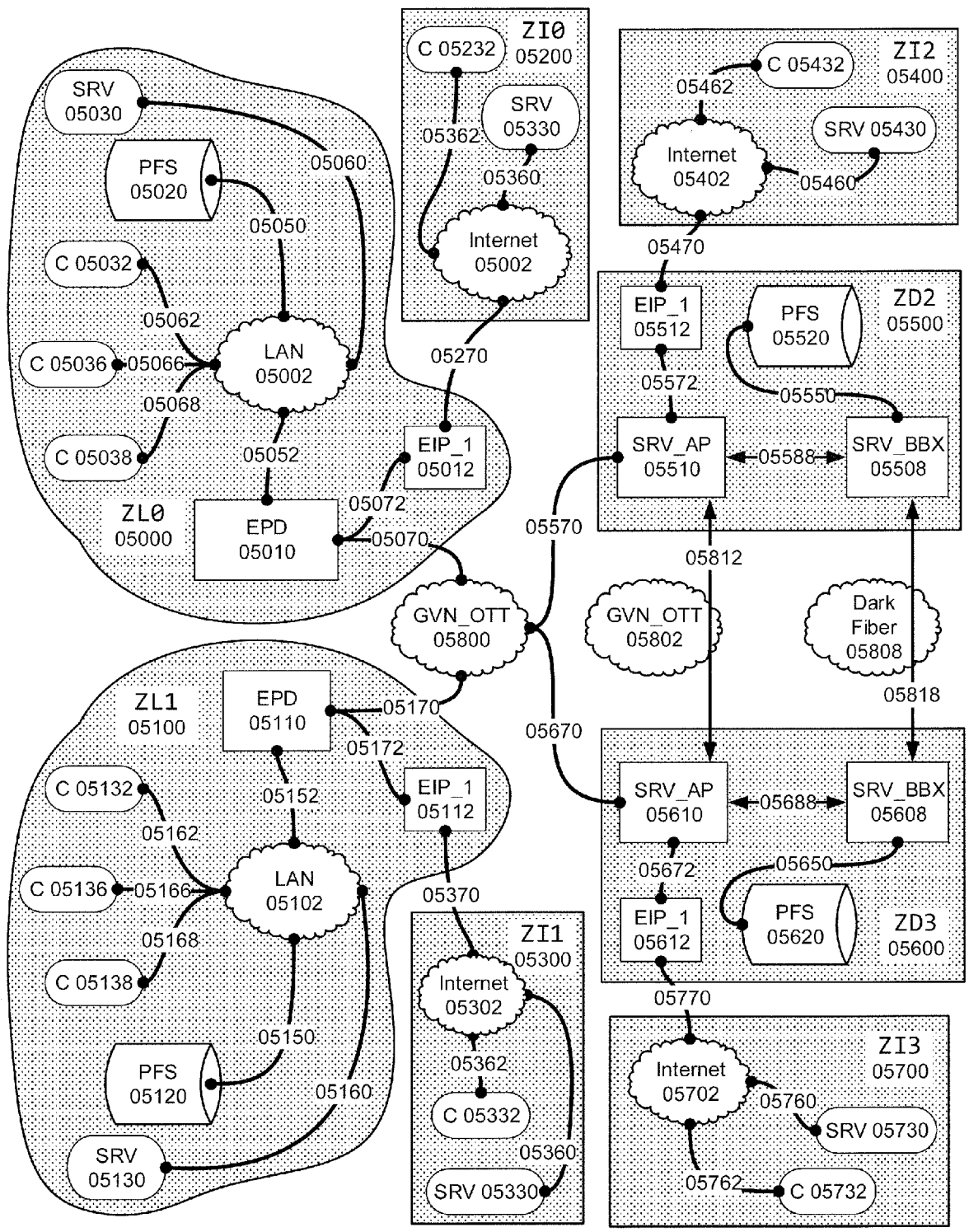
FIG. 5 illustrates GVN Topology, including backbone segment over internet or dark fiber.

FIG. 5 illustrates GVN Topology, including backbone segment over internet or dark fiber. In International Patent Application No. PCT/US15/64242 SYSTEM AND METHOD FOR CONTENT RETRIEVAL FROM REMOTE NETWORK REGIONS, there is a feature where more than one files are clumped together into a larger file to be sent by a file transfer via "chained cache" from one geographic region to another geographic region. For this feature to be advantageous, the file transfer needs to be as fast as possible. As a transport for a clump of various data payload "files", the information slingshot method of this disclosure moves a larger block of data faster from one end of the world to the other than methods of conventional techniques.

This disclosure can be utilized within the topology as described in FIG. 5 as follows:

SRV_BBX 05508 in region or zone ZD2 05500 can be connected to SRV_BBX 05608 in other region or zone ZD3 05600 via a dark fiber connection 05818 over dark fiber fabric 05808.

SRV_BBX 05508 uses this disclosure to directly write a file to parallel file storage PFS 05620 via remote direct memory access (RDMA) over 05818 bypassing the stack of SRV_BBX 05608 via path 05650.

SRV_IBX 05608 uses this disclosure to directly write a file to parallel file storage PFS 05520 via remote direct memory access (RDMA) over 05818 bypassing the stack of SRV_IBX 05508 via path 05550.

Path 05812 can be IPv4 or some kind of standardized internet protocol over which traffic flows from SRV_AP 05510 to and or from SRV_AP 05610 via path 05812 over-the-top of the GVN 05802 via a tunnel or other type of communication path.

This embodiment illustrates that various types of network fabrics can be combined into a greater network tapestry. These fabrics can be seamlessly woven together as described in U.S. Provisional Patent Application No. 62/174,394. The information slingshot can be either a stand-alone method or can be integrated as a network segment within a greater network path comprised of various network segments.

This example embodiment illustrates the topology of a global virtual network (GVN), its various devices, communications paths, and other embodiments. It shows how various geographic regions or zones or territory are linked together over various types of paths.

| Legend | | |
|---|---|---|
| ZL0 - LAN zone zero | ZL1 - LAN zone one | ZI0 - Internet zone zero |
| ZI1 - Internet zone one | ZI2 - Internet zone two | ZI3 - Internet zone three |
| ZD2 - Internet data center zone two | ZD3 - Internet data center zone three | |

Figure 6:
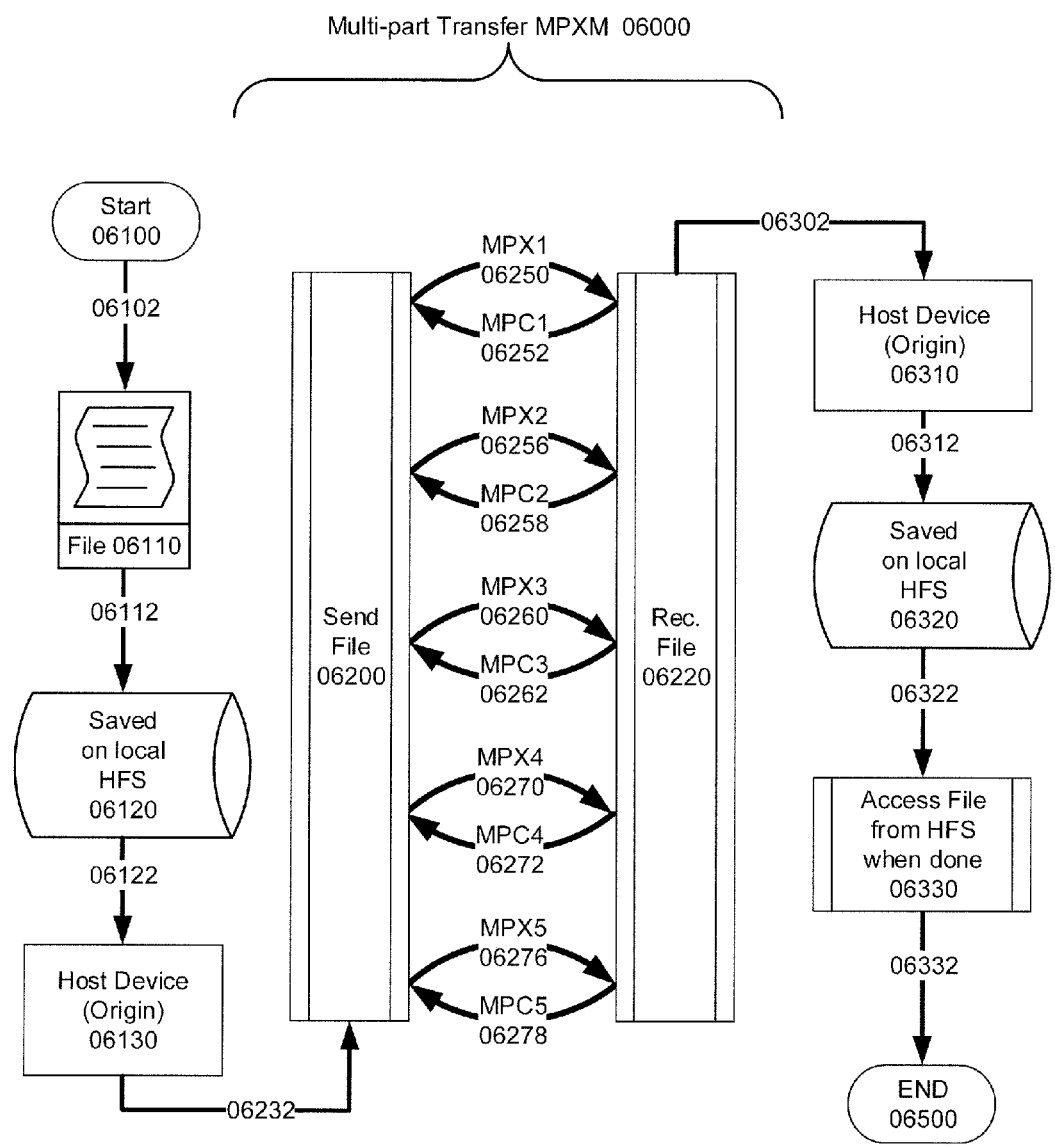
FIG. 6 illustrates conventional techniques—file sent as multi-part transfer via packetized transport over TCP/IP.

FIG. 6 illustrates conventional techniques—file sent as multi-part transfer via packetized transport over TCP/IP. As an extension of FIG. 4, when a data payload contains a structured data file which is larger than the allowed size of the payload, it can be sent via IP multi-part file transfer.

In this case, additional header and possibly more footer information is required to denote which piece of the multi-part file is contained in the payload section of the packet. When a file is "saved" it is to a hierarchical file system (HFS) 06120, 06320 and the send is from reading saved local file from this HFS and packetizing a multi-part file transfer across as many packets are required via Send File 06200. As the file is being received, process Rec. File 06220 will read each packet, make sure they are in order and then will take each part of the multi-part transfer and stitch the file back together part-by-part.

The re-assembled file is saved HFS 06320 in the host device 06310.

Figure 7:
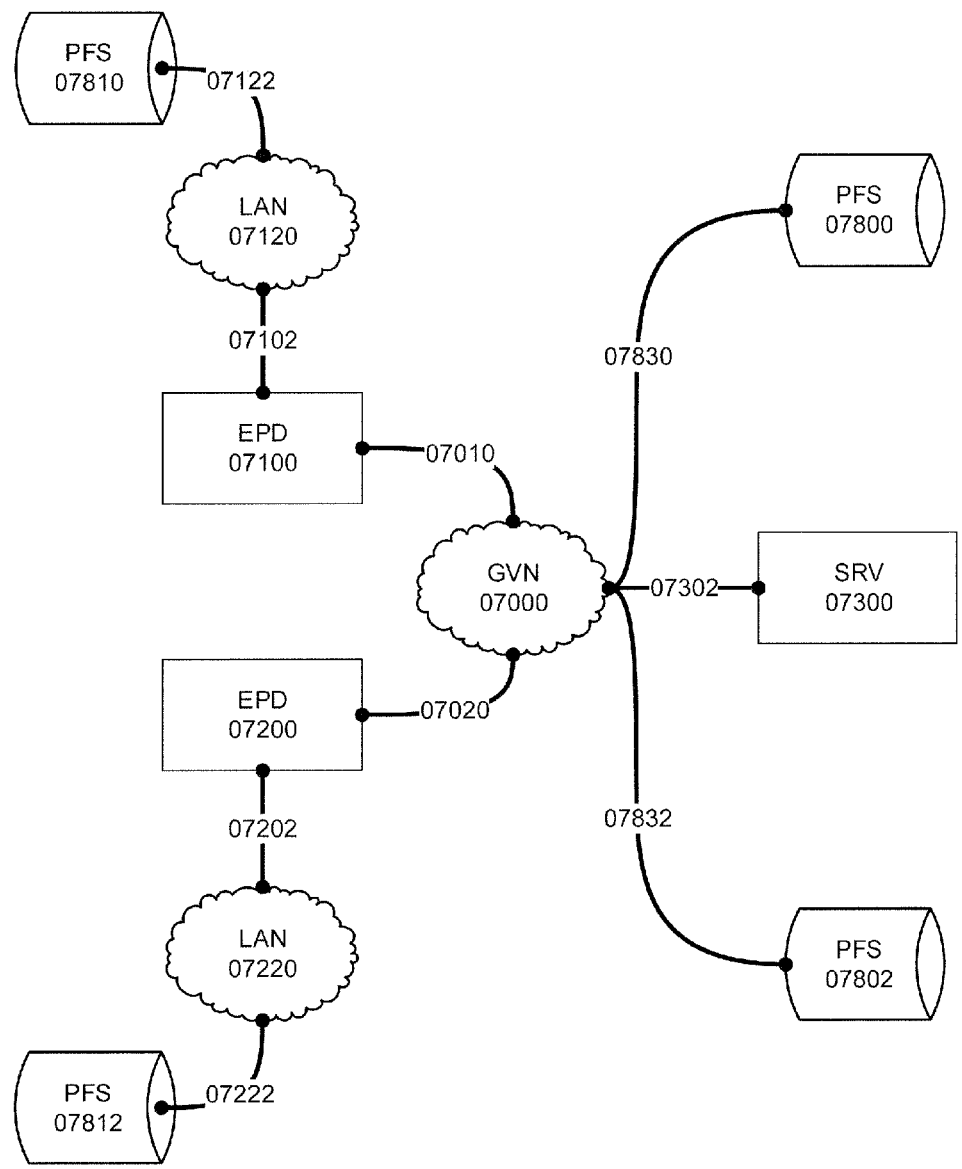
FIG. 7 illustrates topology—power of HPC over a tapestry.

FIG. 7 illustrates topology—power of HPC over a tapestry. This example embodiment describes the connection of two EPD's 07100 and 07200 to a SRV 07300 within a network topology such as a global virtual network (GVN) 07000.

It is a simplification of this network but designed to illustrate how a PFS can distribute storage devices across four various regions.

Each communication path in the tapestry can run various fabric protocols. A file storage on a PFS such as PFS 07810, PFS 07812, inside of a LAN 07120 or LAN 07812, or PFS 07800 or PFS 07802 in the cloud can be accessed via remote direct memory access (RDMA) via a protocol such as InfiniBand (IB) or other protocol which will allow native RDMA access to distributed nodes in a parallel file system (PFS).

The key point is that a cornerstone of high performance computing (HPC) can be achieved through a topology afforded by a GVN.

Figure 8:
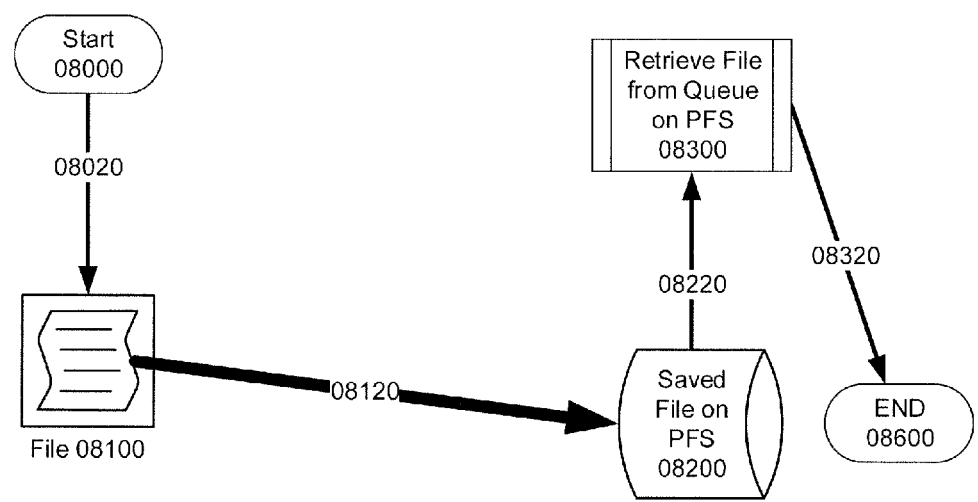
FIG. 8 illustrates an exemplary workflow for file saved to PFS over a long distance.

FIG. 8 illustrates an exemplary workflow for file saved to PFS over a long distance. This figure describes the saving of a file 08100 from one device 08000 to a PFS 08200 in another location via RDMA and the subsequent retrieval of the file off the PFS 08200 by other device 08300.

The steps in the flow from Start 08000 which could be a device generating a file, passing a file, pulling a file or otherwise handling a file such as File 08100. Path 08120 describes the saving a file directly to a PFS device via RDMA with a direct write to the storage node device from one region to another region.

The Retrieve Files from Queue 08300 on PFS 08200 step via path 08220 can be locally or also remotely with respect to the region where the PFS device is located.

End 08600 implies access to the file such as read, load, or otherwise use the file.

Figure 9:
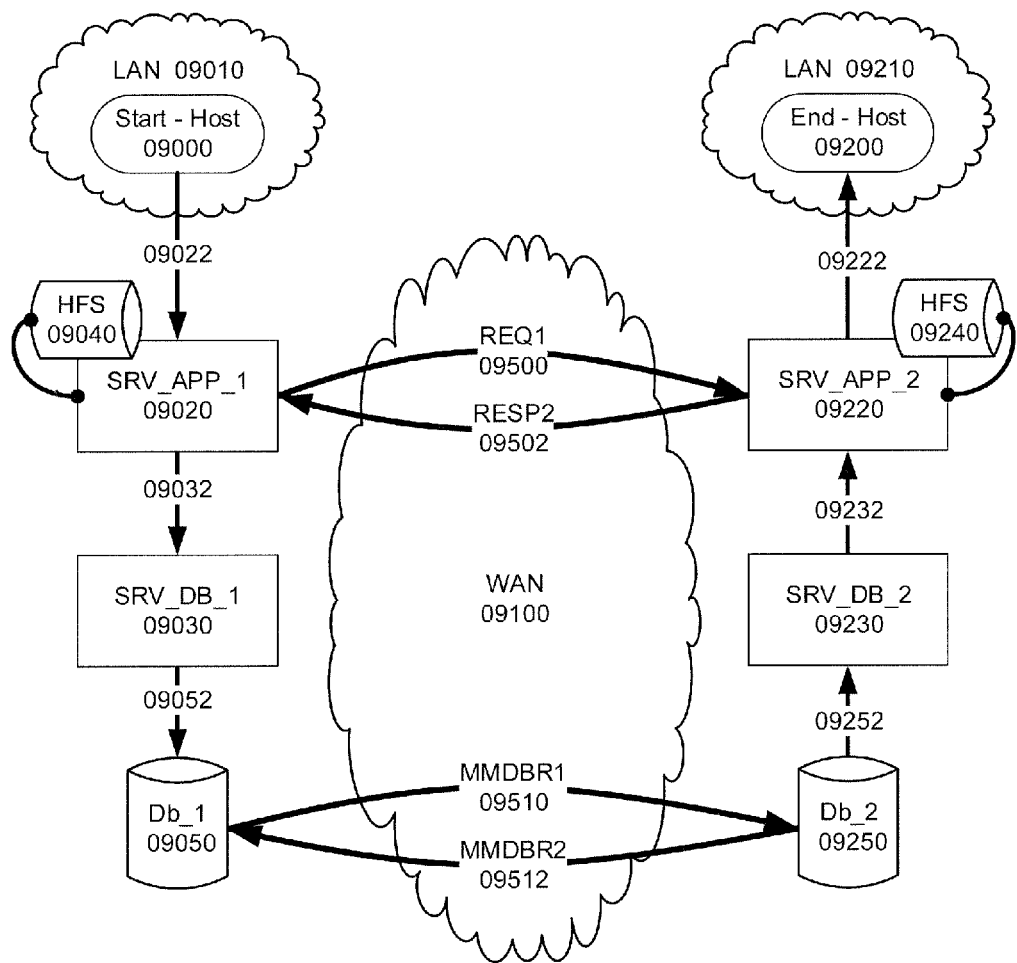
FIG. 9 illustrates traditional client server REQ RESP and backend DB Replication (multi-master).

FIG. 9 illustrates traditional client server REQ RESP and backend DB Replication (multi-master). This example embodiment describes the current IP request/response framework via REQ1 09500 and RESP2 09502 paths.

Files saved on a local HFS such as HFS 09040 by SRV_APP_1 09020 and on HFS 09240 by SRV_APP_2 09220. SRV_APP can represent an application server or other type of device and is labeled for illustrative purposes. WAN 09100 can be LAN/Internet/Dedicated line or other type of network connection.

MMDBR# refers to multiple master database replication. In such a deployment, database table and fields structure definition are equivalent and identical. Each host has a starting number on rows with auto-increment offset value equal to the number of hosts. For example, in the case of only two databases attached to master hosts, DB_1 would have row numbers 1,3,5, and on. And DB_2 would have ID row numbering of 0, 2, 4, 6, 8, 10, etc. Another anti-collision methodology may also be in place.

Database replication can be an automated or manual or other process where contents of each DB_1 09050 and DB_2 09250 are replicated to the other. To protect data from being overwritten, the row offsets accomplish this protection by ensuring no identical row IDs between the two sides.

Figure 10:
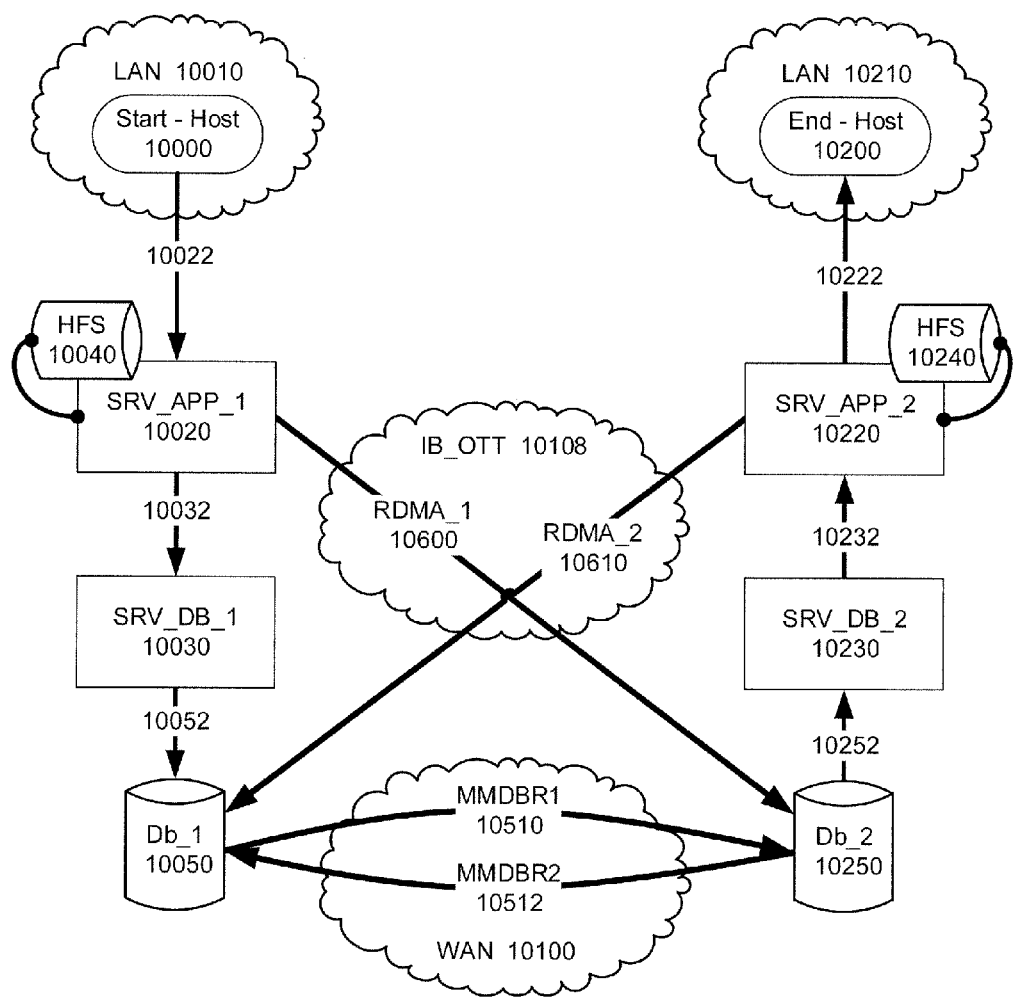
FIG. 10 illustrates information slingshot via RDMA—direct to Db.

FIG. 10 illustrates information slingshot via RDMA—direct to Db. This example embodiment explores one approach to try and speed up communications. This may be to send an entire database table and contents by RDMA directly to the storage media for a database in a remote region. This is good for table structure and all data rows of a static, not-in-use or otherwise locked database. This can be used when doing replication to an offline slave before it is brought (back) online.

However, this approach is not efficient for single or small of rows and can also lead to issues with synchronization.

Therefore, before using this method, a locking of the database during transfer is required at MMDBR1 10510 and MMDBR2 10512 to message between the Db's 10050 and 10250 to make sure that they are in synch. This adds unwanted drag to the system.

This example may not be an ideal utilization of Slingshot.

Figure 11:
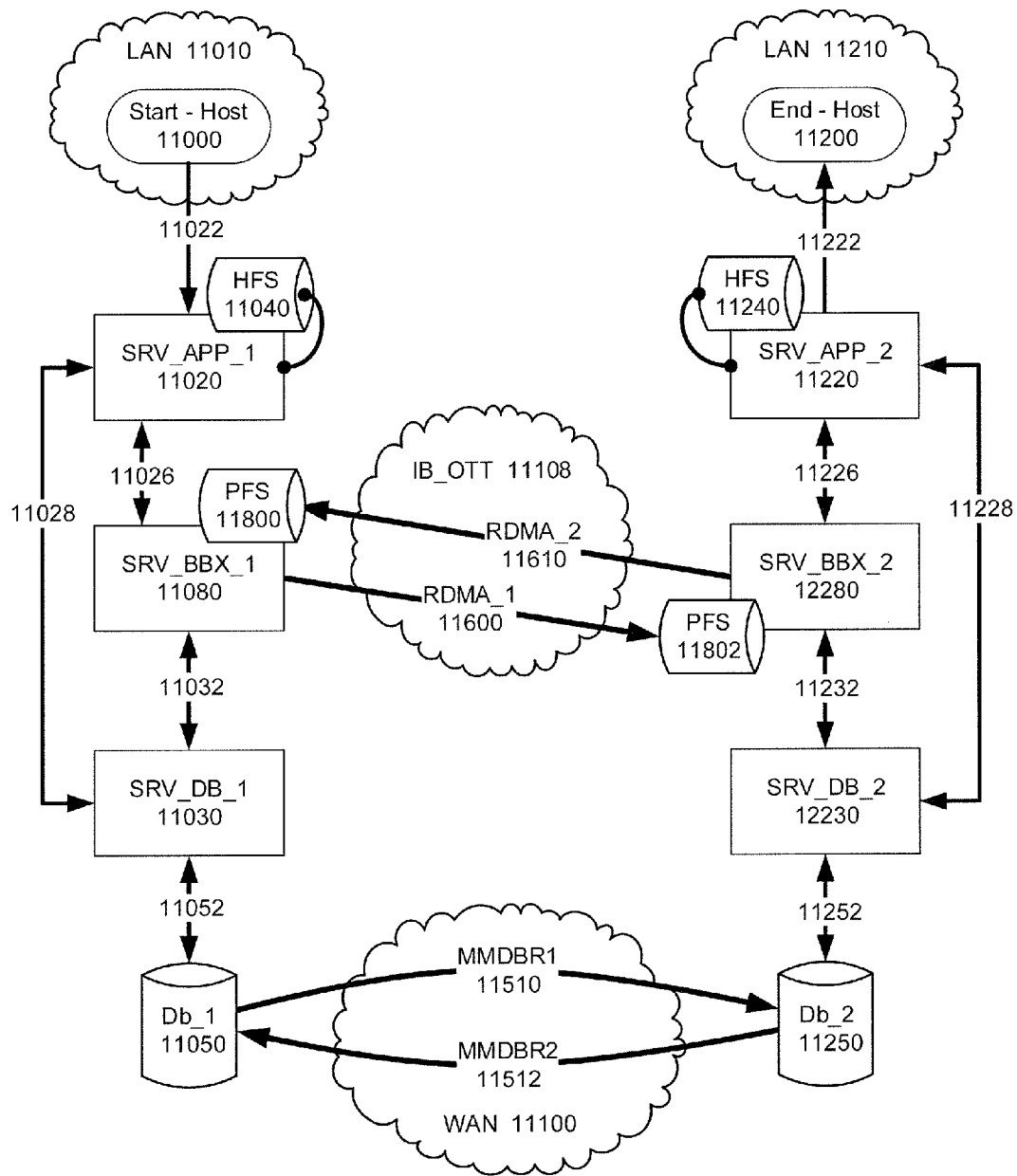
FIG. 11 illustrates information slingshot via RDMA—queued files.

FIG. 11 illustrates information slingshot via RDMA—queued files. A backbone exchange server (SRV_BBX) imbues attributes of very good connectivity on a large pipe and has strong commuting power.

This figure illustrates a SRV_BBX_1 11080 directly writing a file via RDMA_1 11600 to PFS 11802, and SRV_IBX_2 12280 cross-posting a different file via RDMA 2 11610 to PFS 11800.

The data payloads are efficiently transferred. A record of the transfer is kept at each side respectively noting which files were received. Multiple master DB replication with DB_1 11050 using odd rows and DB_2 11250 using even rows. In this example there is a reliance on the database replication mechanism to keep track of multi-master replication events. Synchronization issues can therefore ensue. There is also potential for significant lag between time a remote write can be executed by a device and long delay to get confirmation which itself can be significantly detrimental. There is therefore a speed differential as well as reliability gap to overcome between the coupling of superfast RDMA writes and traditional database replication of information.

This example embodiment does not illustrate the ideal implementation of Slingshot. The save to remote PFS devices is efficient but the making the SRV_APP in the target region aware of the file is not fast enough nor is it reliable.

Figure 12:
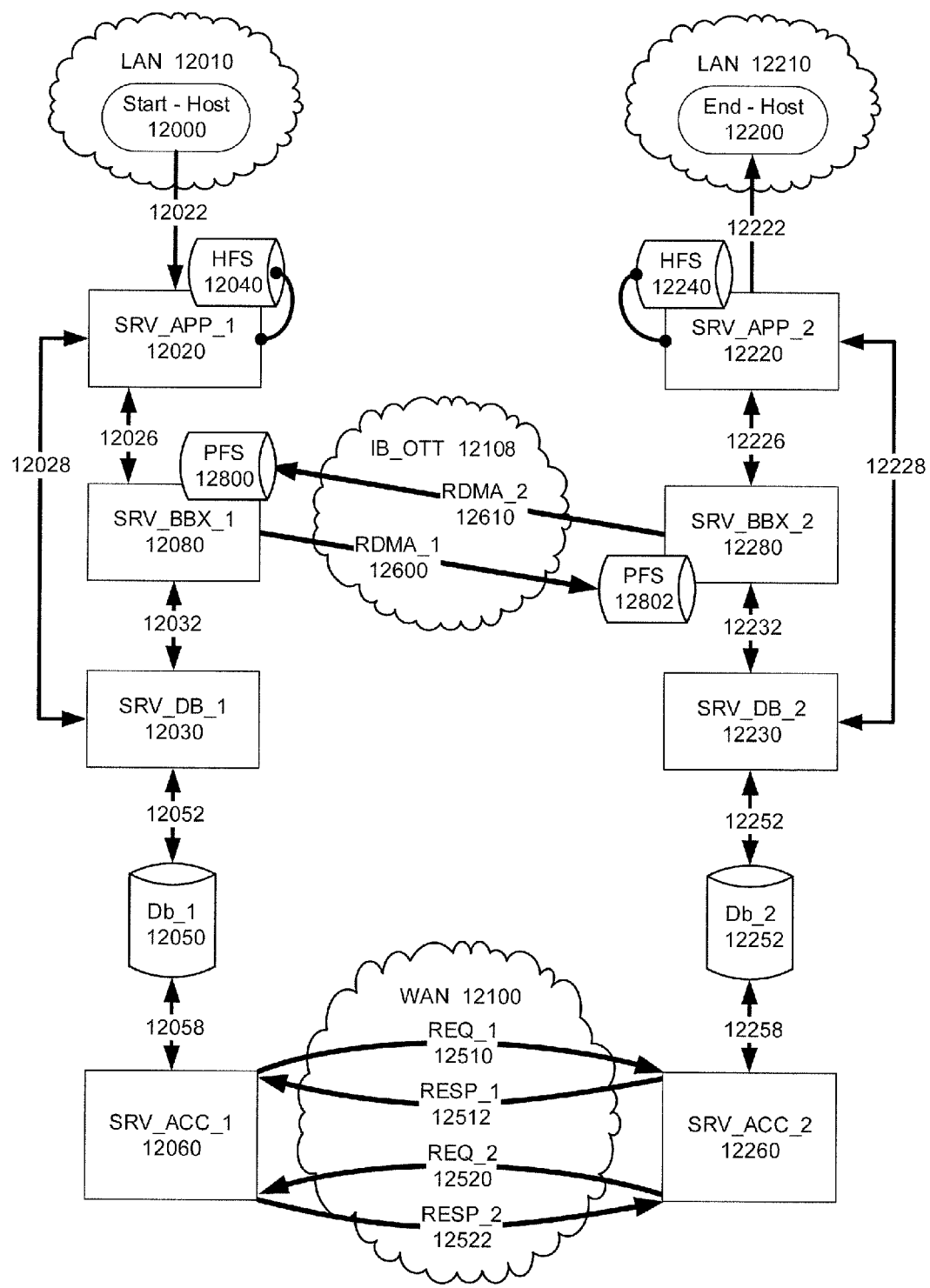
FIG. 12 illustrates information slingshot via RDMA—queued files independency with cross DB verification by SRV_ACC.

FIG. 12 illustrates information slingshot via RDMA—queued files independency with cross DB verification by SRV_ACC. This example figure illustrates the complete decoupling of a need to round trip the database records in an active sense. In this example, a SRV_BBX such as SRV_BBX_1 12080 will send file to PFS 12802 and the record will be stored on SRV_DB_1 12030 into local database Db_1 12050. And it will leave it at that.

Because of the reliability of RDMA, once the file is saved into a PFS storage node there is confidence it is there. Accounting servers (SRV_ACC) such as SRV_ACC_1 12060 and SRV_ACC_2 12260 communicate with each other to catalog received transfers.

This again is not an ideal approach to slingshot and points to the need to completely decouple the Slingshot approach from current methods deployed over IP and to embrace the power of Slingshot.

Figure 13:
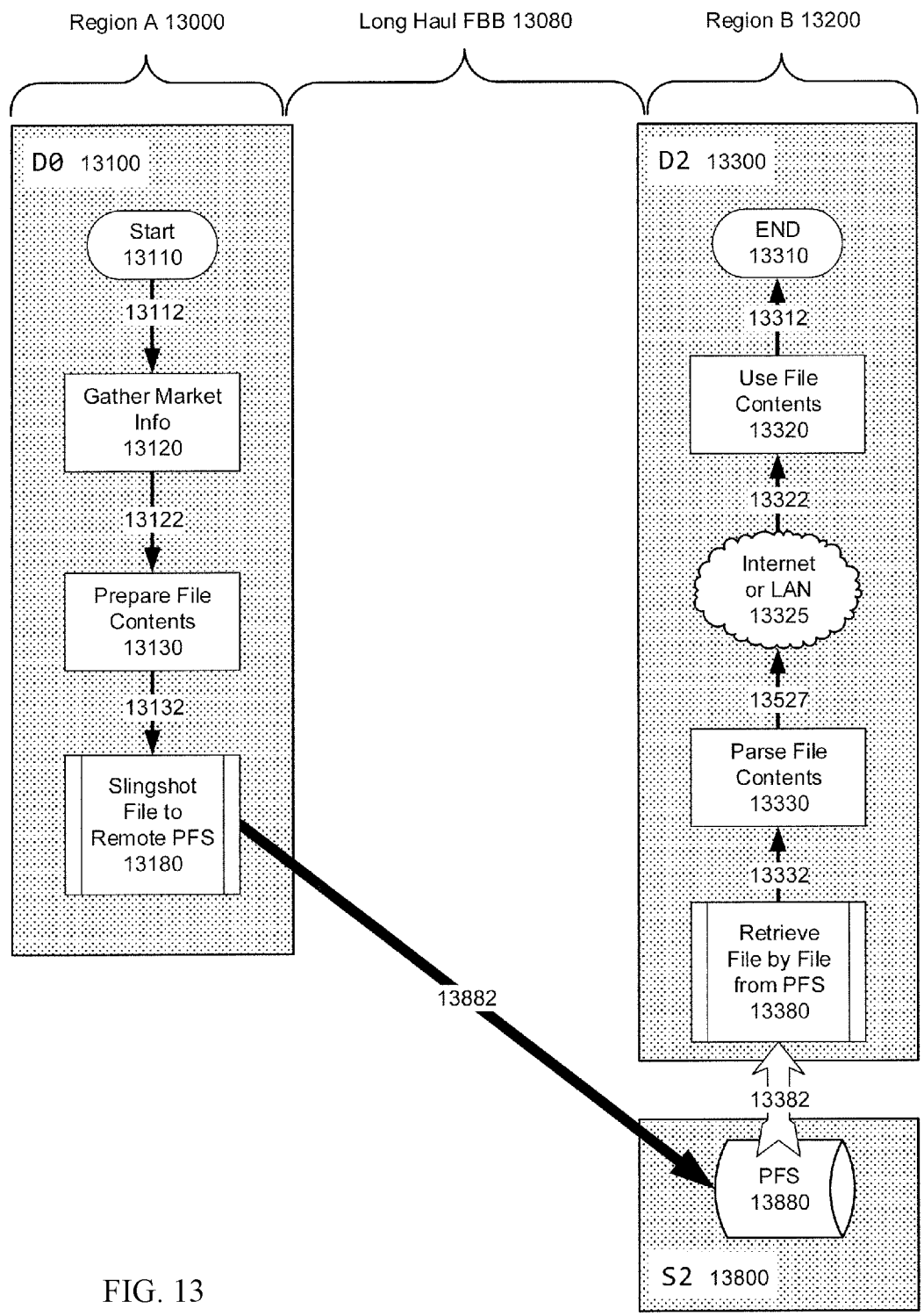
FIG. 13 illustrates an exemplary use case of information slingshot—market information relay from market to trade desk.

FIG. 13 illustrates an exemplary use case of information slingshot—market information relay from market to trade desk. As an example of Slingshot, in the financial industry, market information such as pricing and volume can be requested and retrieved via TCP/IP, or it can be sent by a UDP/IP multicast from source to destination. A round trip RTT time is required for request and retrieval of TCP/IP. A UDP/IP send is only one-way for the information to be useful (confirmation to sender not so important), however, there is still significant drag due to inefficiencies of IP and packetized transfer.

Using current packetized IP technologies, even a UDP/IP multicast approach is not the most efficient.

This figure contains example embodiments describing the gathering of information by a device D0 13100 in one region Region A 13000 and then the onward flow of conveying that info to a device in Region B 13200.

The step Gather Market Info 13120 to Prepare File Contents 13130 to Slingshot File to Remote PFS 13180 are on D0 13100. Slingshot via 13882 to parallel file system (PFS) node PFS 13880 on storage device S2 13800. There are numerous advantages of using RDMA over IB 13882 or equivalent network type versus transferring files by TCP/IP or UPD/IP over Ethernet, mainly due to the fact that the file does not need to be packetized, but also due to how packets are handled, and the efficiency of RDMA over IB.

Saved file on PFS 13880 is retrieved on device D2 13300 by process Retrieve File by File from PFS 13380 via path 13382. A single or batch of multiple files can be retrieved simultaneously.

The follow on steps 13332 to 13325 to 13320 describe using of the file in the remote region from file origin. There is no further need for the devices to D0 13100 and D2 13300 to communicate with each other regarding the scheduling of or the transfer or the use of file itself.

Figure 14:
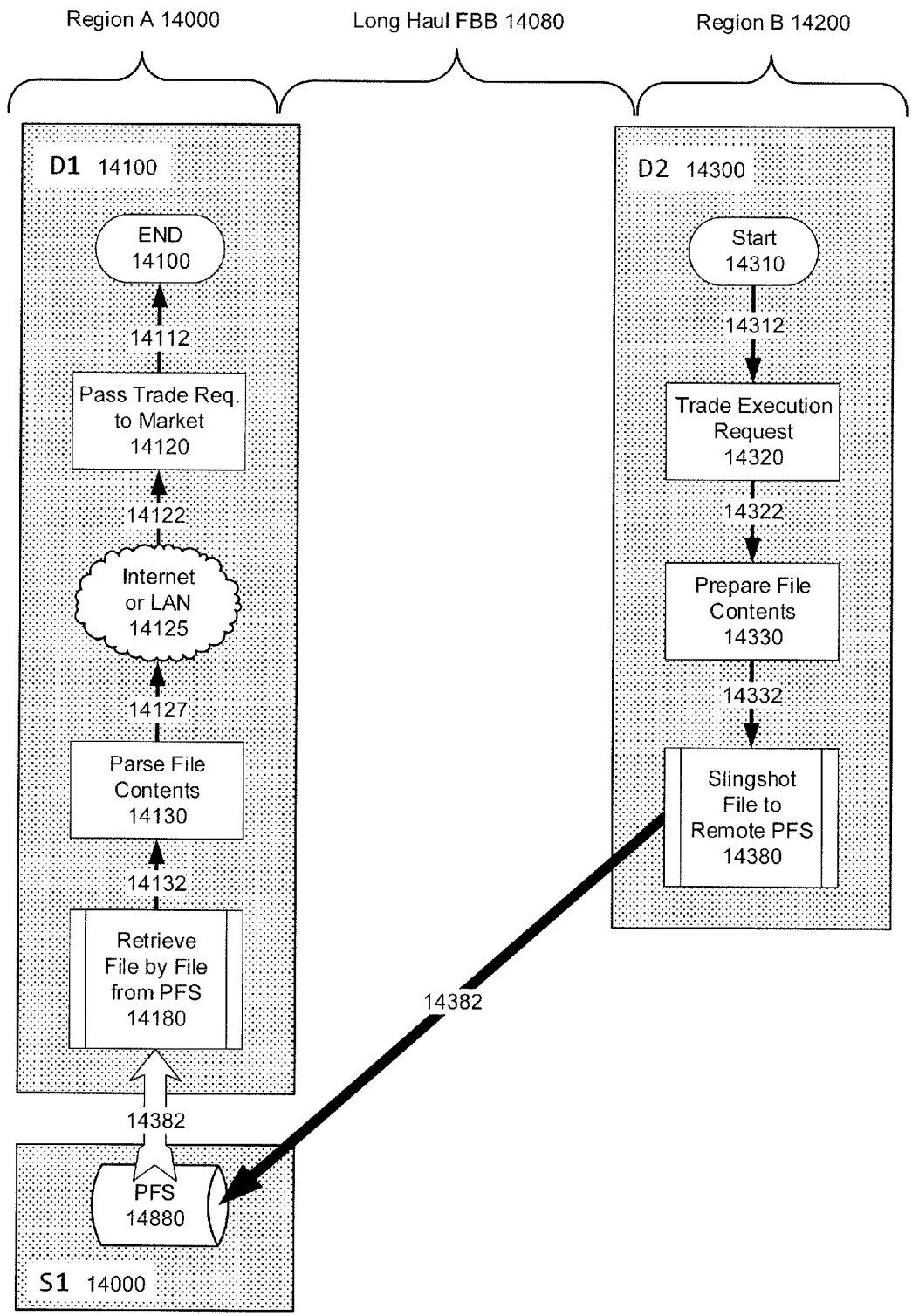
FIG. 14 illustrates an exemplary use case of information slingshot—trade execution request from client source to market.

FIG. 14 illustrates an exemplary use case of information slingshot—trade execution request from client source to market. This example figure further illustrates Slingshot in the context of a financial industry use case demonstrating the simple efficiency of placing a trader order from device D2 14300 ultimately to be used by device D1 14100. It starts from 14310 and ends at 14100. It is a reverse of the path described in FIG. 13.

The key point is that both devices are operating independently of each other. Only when D2 14300 wants to put in an instruction for a trade to be executed on D1 14100 is there a communications event but it too is not directly from D2 14300 to D1 14100 but rather for D2 14300 to save one or more data files on parallel file system (PFS) 14000. Once the file is written, D2 14300 can move on to other things.

D1 14100 has an automated process which runs according to an interval of time. See FIGS. 24 and 25 regarding this interval. This automated process will look on PFS 14880 to check 14180 if there are any new, unmarked (not marked as read) files for it to retrieve and to process.

This approach is efficient for trade orders such as a trade execution request. Device D1 can be as close to the market as possible. Device D2 can be the client terminal or a server which is in very close proximity to clients which access it. The key point is that trade payload can be sent at as close to wire-speed as possible.

This is advantageous and because it is able to send a large file size, this mechanism can be used to send/receive blockchains of ever growing height (data size), algo-bots (smart algorithms to be remotely executed), and other larger than packet size payloads.

Figure 15:
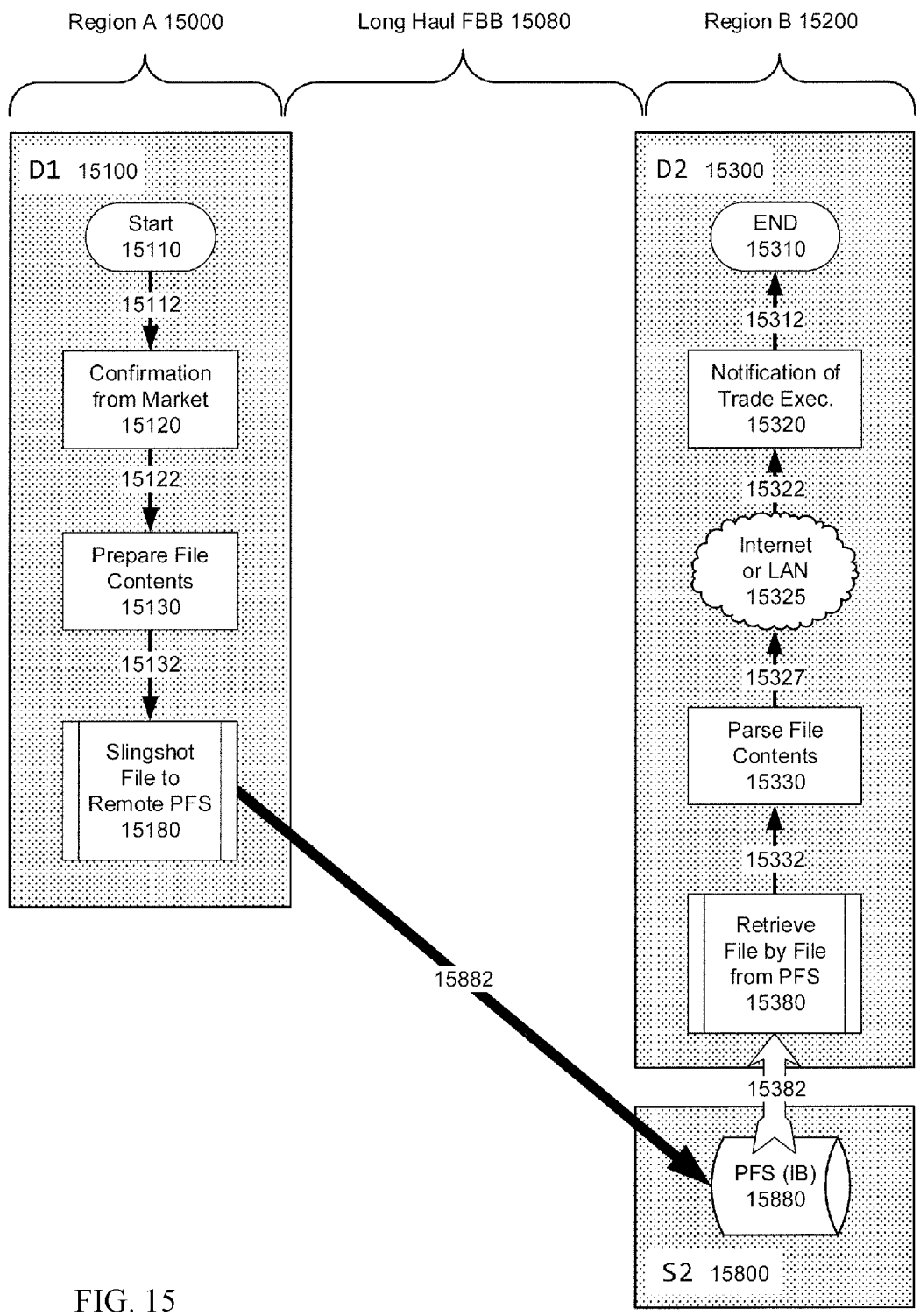
FIG. 15 illustrates an exemplary use case of information slingshot—trade result from market back to client.

FIG. 15 illustrates an exemplary use case of information slingshot—trade result from market back to client. This example is very similar to FIGS. 13 and 14 as both devices D1 15100 and D2 15300 are independently operating. Communications between them is via a posted file 15882 into a PFS 15880 by one device 15100, and for this file to be retrieved by a process running 15380 on the other device 15300. They are communicating but with all bloat cut out of the exchange.

The difference in this figure are example embodiments Confirmation from Market 15120 and Notification of Trade Exec. 15320.

D1 15100 and D2 15300 could all occur within the same device or via distributed operations between different devices in a zone represented by D1 15100 and D2 15300.

Figure 16:
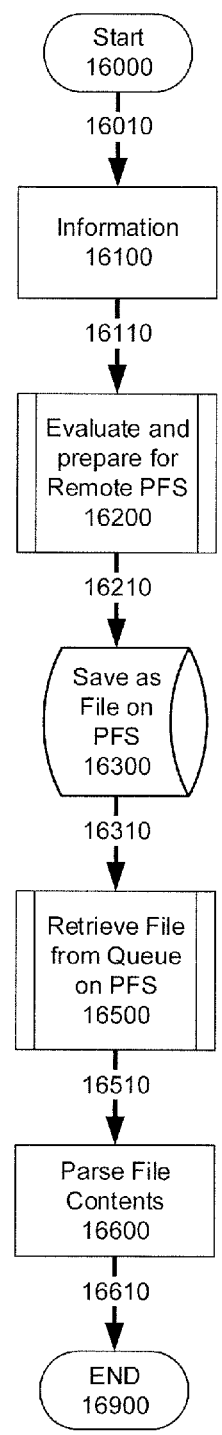
FIG. 16 illustrates an exemplary workflow of information to file write and then read, process, etc.

FIG. 16 illustrates an exemplary workflow of information to file write and then read, process, etc. This figure simplifies Slingshot into a linear process flow and is generic without a specific reference to the financial or any other industry.

This figure starts the process from Start 16000 via path 16010 to Information 16100 step to evaluating and preparing the Information 16200 via 16110 either as a copying of a file or to structure the information into a file specifically designed for saving remotely via RDMA to a PFS 16300 via 16210. This saved file will then be fetched by process Retrieve File from Queue on PFS 16500 via path 16310. The file contents will be parsed by step Parse File Contents 16600 via path 16510. End step 16900 reached via path 16610 implies that the file can be used. The key point is that this process can be simplified into a few key steps.

Figure 17:
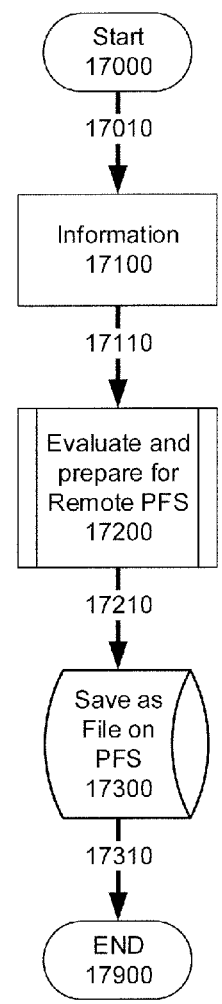
FIG. 17 illustrates an exemplary workflow of information to file write.

FIG. 17 illustrates an exemplary workflow of information to file write. This figure is based on FIG. 16. It further simplifies the flow by only showing the stages from Information 17100 to that file being saved on the PFS 17300.

Figure 18:
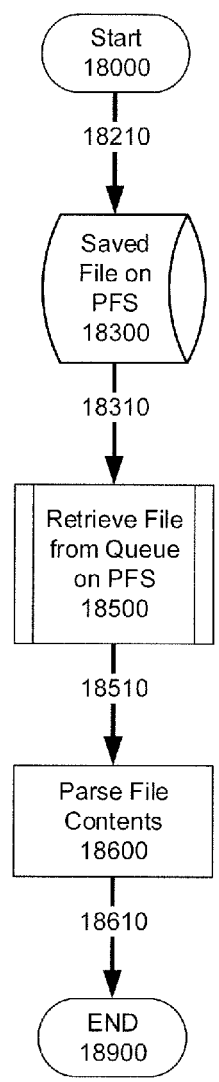
FIG. 18 illustrates an exemplary workflow of read file and process.

FIG. 18 illustrates an exemplary workflow of read file and process. This figure is also based on FIG. 16. It too further simplifies the flow but this time it only shows the stages from file on PFS 18300 being fetched by process Retrieve File from Queue on PFS 18500. The file contents will be parsed by step Parse File Contents 18600 and terminate at End 18900.

Figure 19:
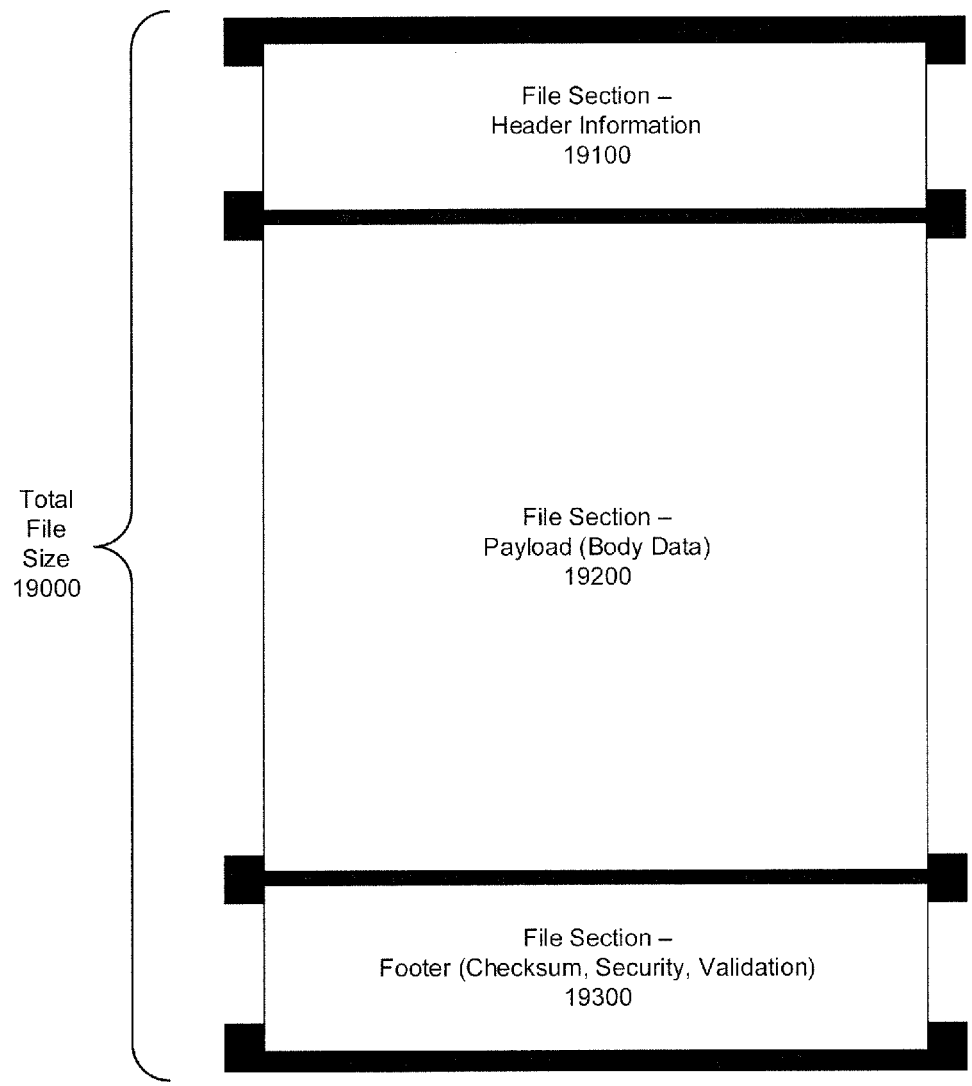
FIG. 19 illustrates an exemplary embodiment of information slingshot, with respect to File Headers/File Sections: Header, Body Data, Footer.

FIG. 19 illustrates an exemplary embodiment of information slingshot, with respect to File Headers/File Sections: Header, Body Data, Footer. This example embodiment of Information Slingshot describes a data file organized in three defined sections; Header Information 19100, Payload 19200 containing Body Data, and a Footer 19300.

This file could be stored in RAM, memory, saved to disk, or otherwise stored in another form of memory or storage on a device or otherwise.

Header 19100 can contain information about host origin, host destination, timestamp, and other info.

Security information can be stored in fields in both the header 19100 and the footer section 19300. This security information may hold references to keys to use for decryption of payload 19200, as well as other information. Payload (Body Data) may be encrypted in whole or in part or sent unencrypted.

Payload checksum(s) in the footer is used to validate the integrity of the body data.

Other features can take advantage of the flexibility offered.

A significant advantage is that there can be an algorithm in payload which gets sent as part of the payload.

EOF notation in the Footer 19300 will indicate that the file has arrived, is complete and ready to be validated/verified for accuracy and then ultimately use.

In the scope of the financial industry, a remotely executed algorithm in payload 19200 for example can contain an exit condition which is instructed to take a prescribed action if market conditions change with algorithmic instructions to evaluate the direction of market change and then modify instructions accordingly, to:

Cancel out

Reverse

Intensify

Or otherwise change the instructions

Figure 20:
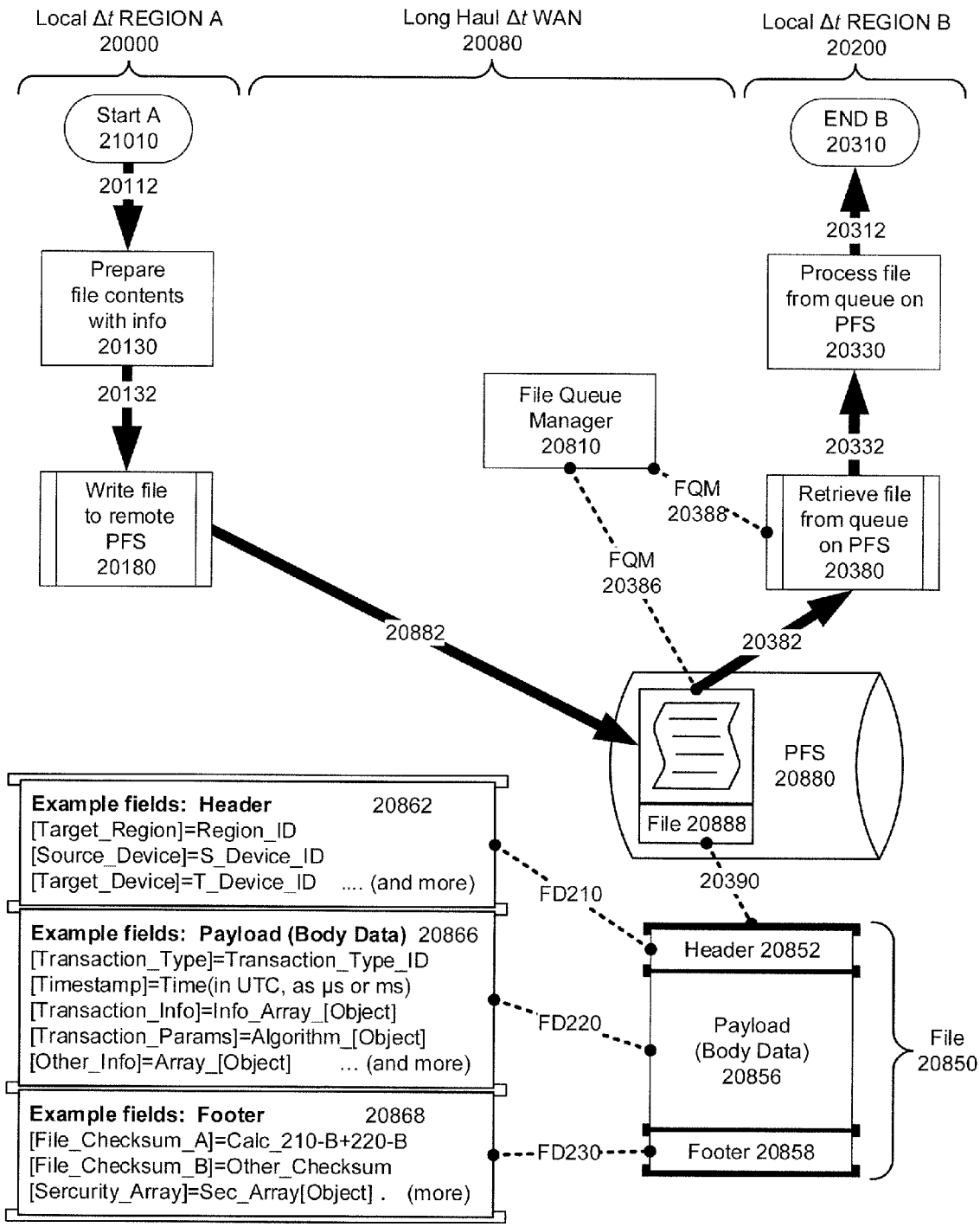
FIG. 20 illustrates an exemplary embodiment of information slingshot, with respect to shooting, storing in PFS and processing files from store.

FIG. 20 illustrates an exemplary embodiment of information slingshot, with respect to shooting, storing in PFS and processing files from store. This figure combines the principals established and illustrated in FIG. 8, and FIGS. 12 through 19. The addition of a File Queue Manager (FQM) 20810 manages the intervals for file batch pulls, checks files for completeness, and does other file related actions.

Connectivity of the FQM to the file 20888 on the PFS 20880 is via path FQM 20386 and coordination between the FQM and Retrieve file from queue on PFS 20380 is via path FQM 20388.

This figure also drills down each section, Header 20852, Payload 20856, and Footer 20858 of a file 20850 to demonstrate example fields. In the Header 20862, Payload 20866, Footer 20868.

These example fields are demonstrated as key=value pairs of information and are for illustrative purposes only. The data may be stored in another data structure, and fields can be different than described in this figure.

Figure 21:
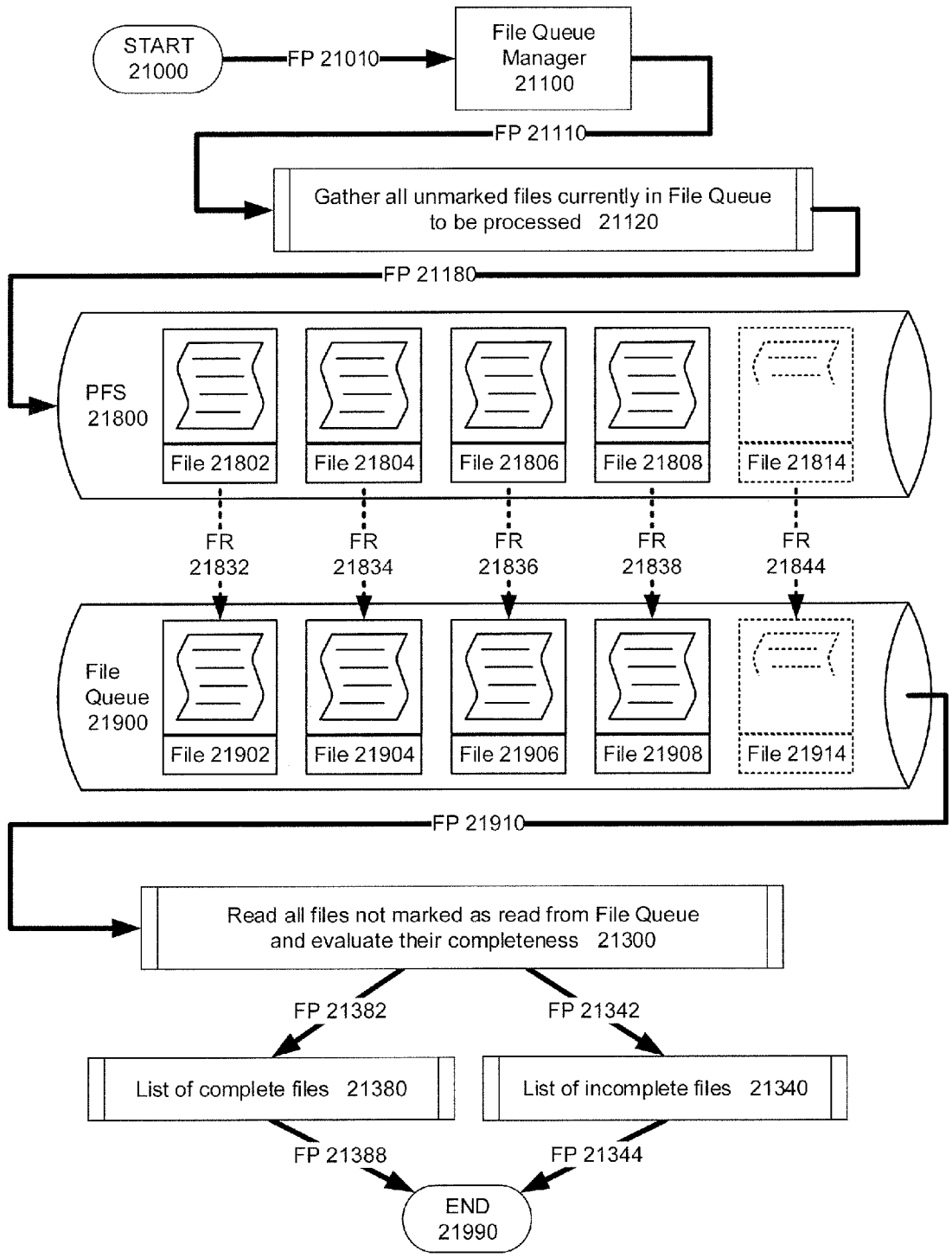
FIG. 21 illustrates an exemplary embodiment of information slingshot, with respect to harvesting file queue to reap body data for analysis and use.

FIG. 21 illustrates an exemplary embodiment of information slingshot, with respect to harvesting file queue to reap body data for analysis and use. This figure starts at 21000 and demonstrates the pulling of a batch of files from PFS 21800 by File Queue Manager 21100 into RAM 21900. The pulled files by the gathering process 21120 are checked for completeness 21300. Complete files 21802, 21804, 21806, 21808 which have arrived are listed in 21380 and incomplete files 21814 are listed in 21340. And this is where the process flow of this figure ends at 21990. The implication is that incomplete files 21340 such as file 21814 will be picked up by a subsequent process when complete.

Figure 22:
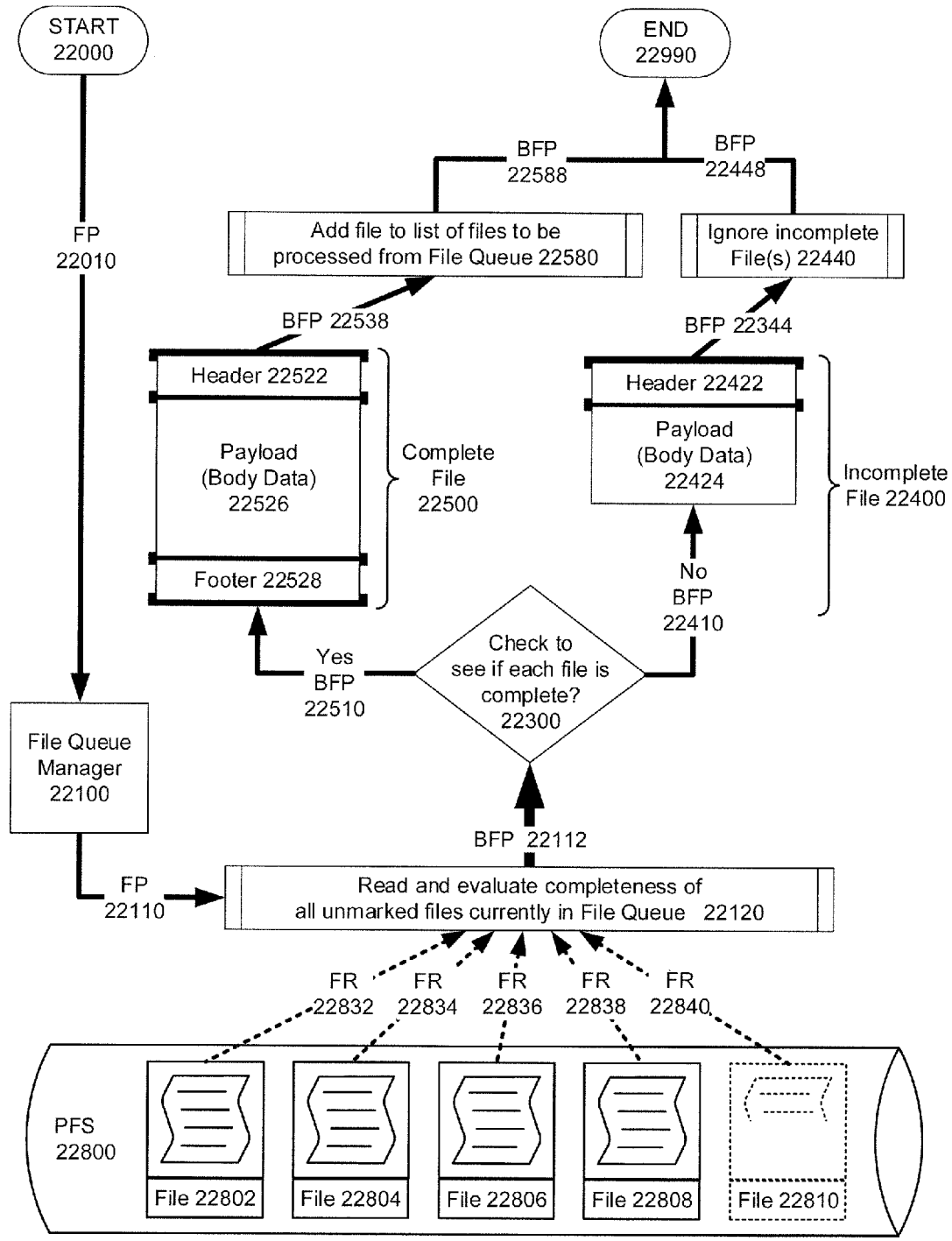
FIG. 22 illustrates an exemplary embodiment of information slingshot, with respect to File Body Data and EOF.

FIG. 22 illustrates an exemplary embodiment of information slingshot, with respect to File Body Data and EOF.

This figure is an algorithmic representation of what has been described in FIGS. 20 and 21.

The decision gate Check to see if each file is complete 22300 implies that it will look at each of the files pulled by File Queue Manager 22100 from PFS 22800. If a file is complete 22802, 22804, 22806, 22806, it will be processed via path Yes BFP 22510 and ultimately used. If it is not complete 22410, then the file will be Ignored 22440 and its process will end via BFP 22448 at END 22990.

End 22990 implies the end of the operations of the File Queue Manager 22100.

Figure 23:
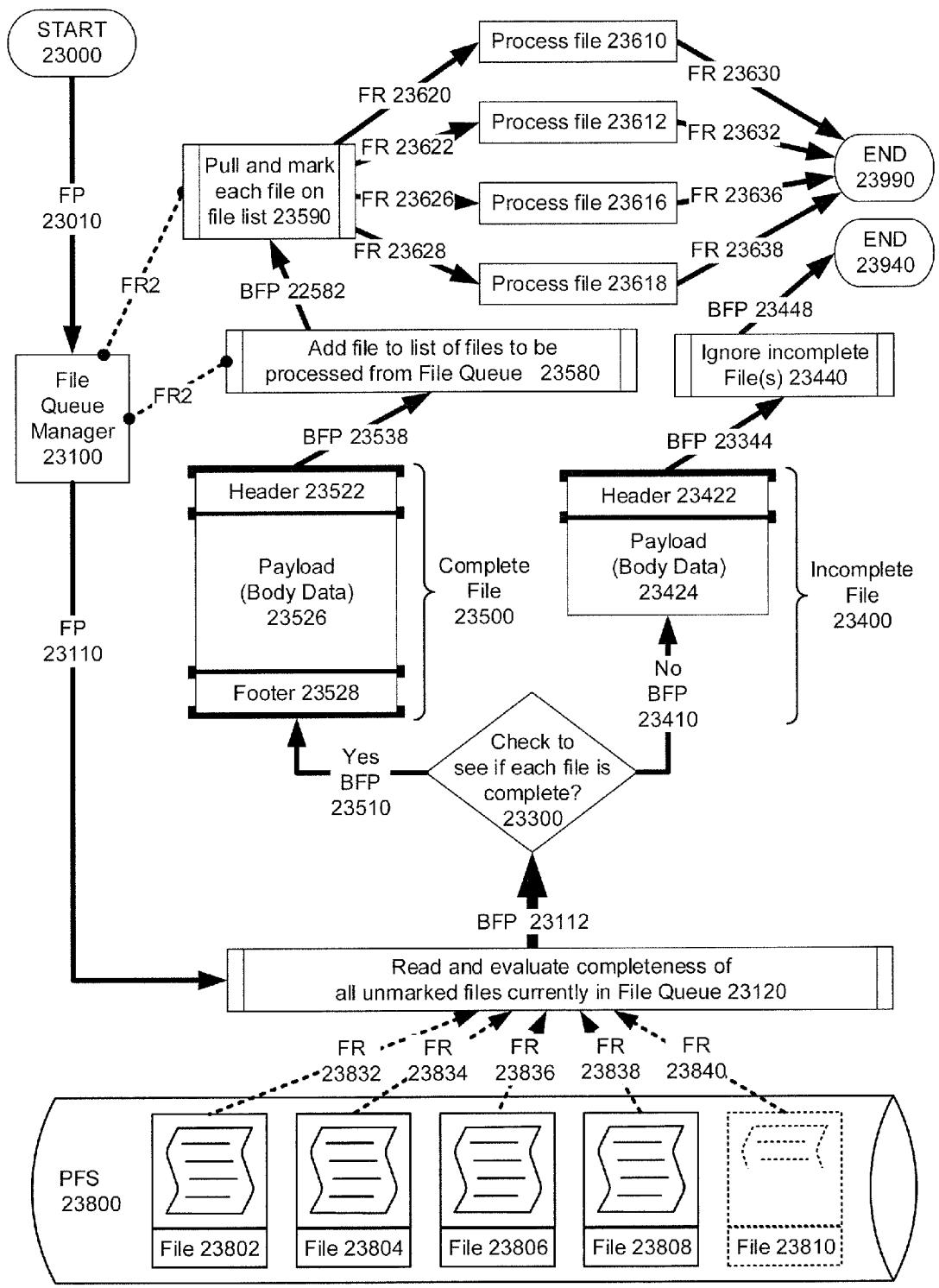
FIG. 23 illustrates an exemplary embodiment of information slingshot, with respect to File process flow.

FIG. 23 illustrates an exemplary embodiment of information slingshot, with respect to File process flow. This figure is a follow on description of what happens in FIG. 22, with added elements such as step Pull and Mark each file on file list 23590 to concurrent processes Process file 23610 via file route FR 23620, Process file 23612 via file route FR 23622, Process file 23616 via file route FR 23626, Process file 23618 via file route FR 23628. There also are two different end points—END 23990 is where complete files end up after being processed via file paths FP 23630, 23632, 23636, 23638, with a read "flag" noting that the file has been read, that it was complete and used. These files will not be pulled by subsequent batch file pulls 23120.

END 23940 implies that a file has been ignored because it is incomplete and 23400 the implication is that it will be read again during subsequent file batch pulls from the PFS 23800.

Figure 24:
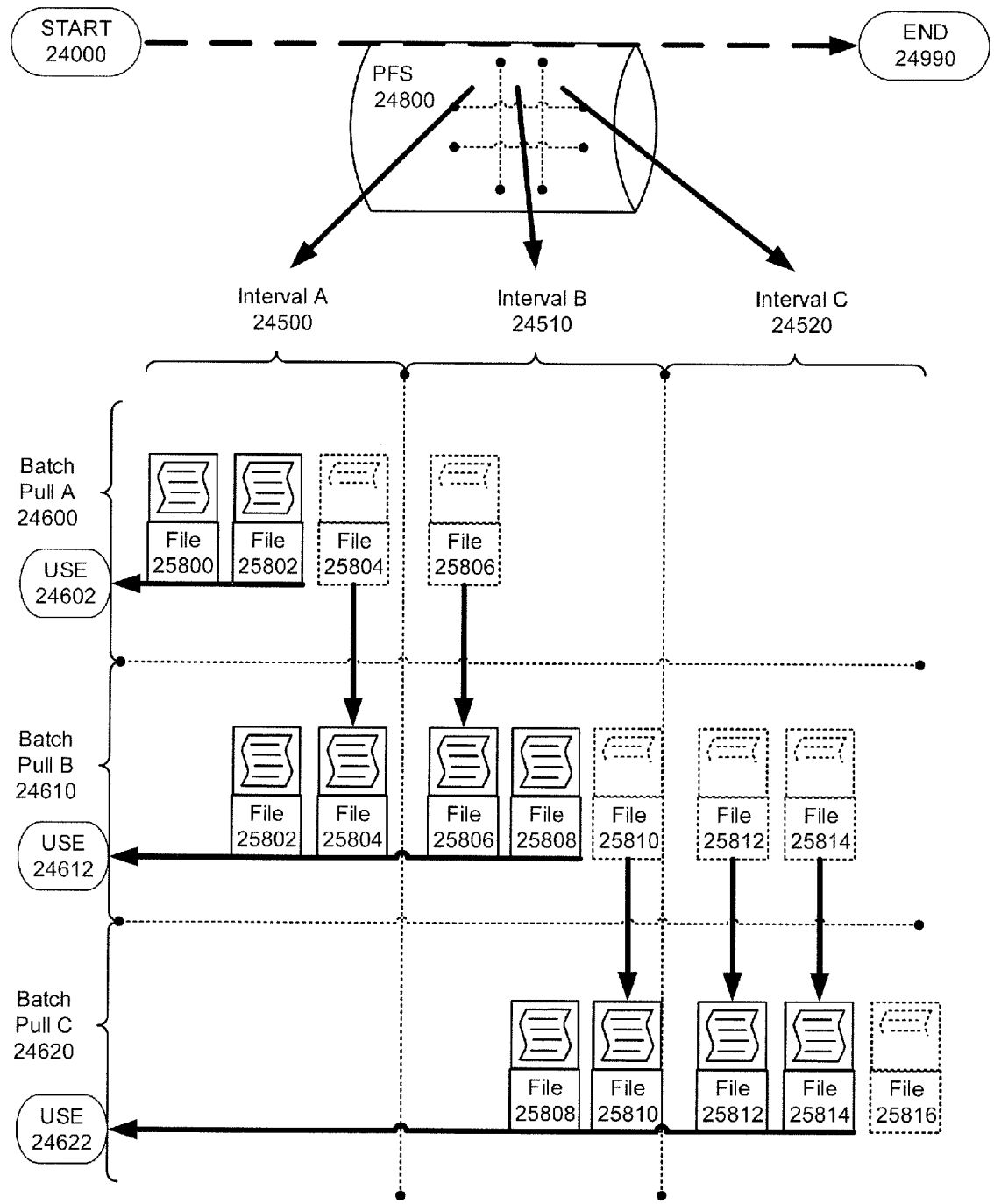
FIG. 24 illustrates potential problems with file pull queue such as duplicate processing, etc.

FIG. 24 illustrates potential problems with file pull queue such as duplicate processing, etc. This figure describes the pulling of batches of files from PFS 24800 over a period of time from START 24000 to END 24990. Time is described on both axis with Intervals across the top and batches along the left side.

Interval A 24500 and Batch Pull A 24600 occur at the same time. USE 24602 happens at the end of this interval. Interval B 24510 and Batch Pull B 24610 occur at the same time. USE 24612 happens at the end of this interval. Interval C 24520 and Batch Pull C 24620 occur at the same time. USE 24622 happens at the end of this interval. There is a problem which exists by having one interval begin right after one has ended because there may not be enough time for a file to be marked as read, even though it has been read by a previous batch process.

For example, File 25802 is pulled by both Batch Pull A 24600 and Batch Pull B 24610. This also occurs again when File 25808 which was read by Batch Pull B 24610 is also pulled by Batch Pull C 24620.

This is a very dangerous flaw as for example, a trade request being executed twice could cause significant financial or other damage due to unintended consequences. Marking as read may involve setting a flag on the file record on the storage device, or moving the file into a different folder, or deleting it from the storage device after it was moved, or other way to "mark" it so that subsequent batches know that the file has been read and "used" by a previous Batch Pull.

Figure 25:
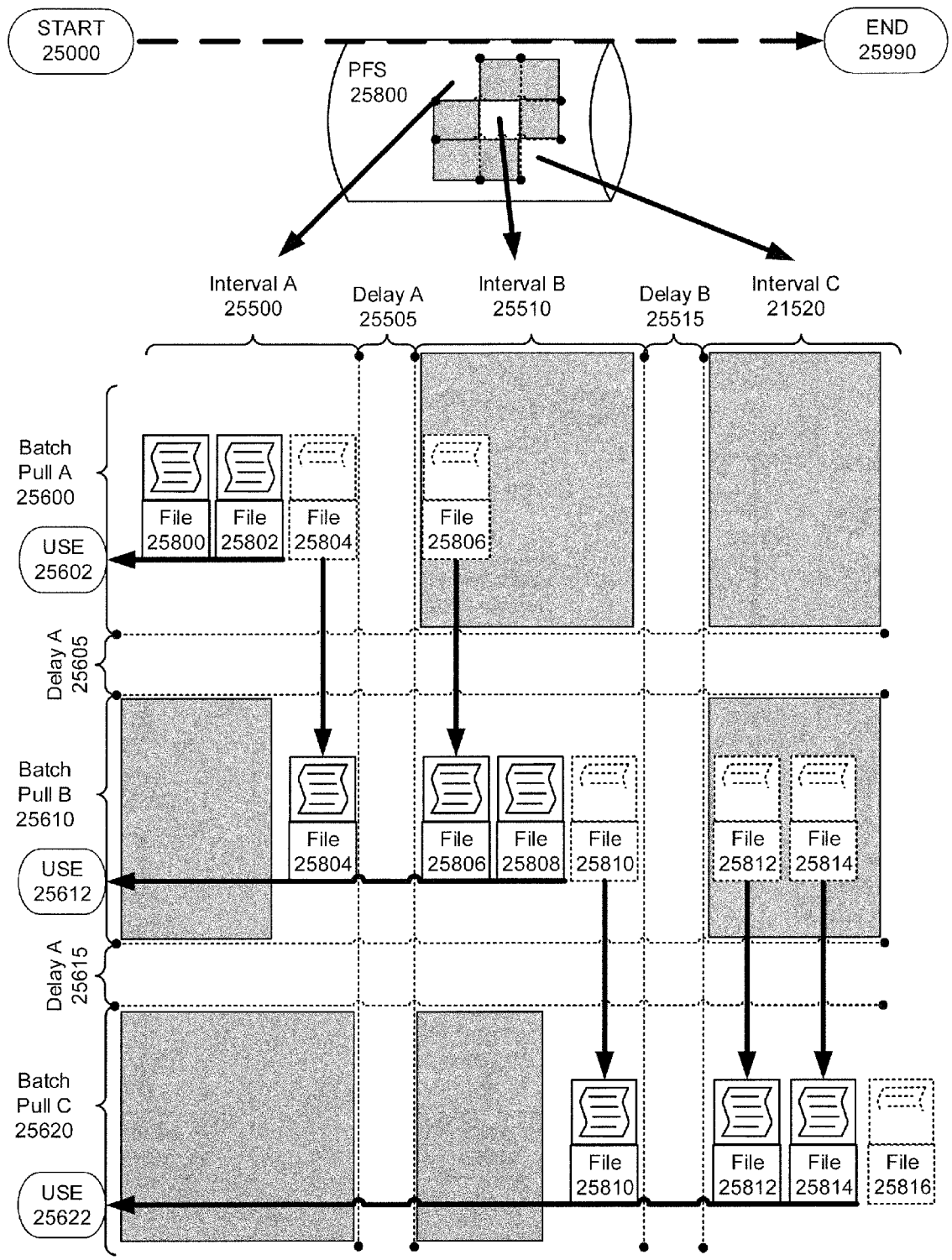
FIG. 25 illustrates an exemplary embodiment of synchronization of batches pulling only files not marked as read during a tick.

FIG. 25 illustrates an exemplary embodiment of synchronization of batches pulling only files not marked as read during a tick. This figure is identical to FIG. 24 in all respects except that FIG. 25 includes Delay A 25505 between Interval A 25500 and Interval B 25510 (and Delay A 25605 between Batch Pull A 25600 and Batch Pull B 25610).

There is a further Delay B 25515 between Interval B 25510 and Interval C 25520 (and 25615 between Batch Pull B 25610 and Batch Pull C 25620).

The key point is that this delay allows for the current batch to evaluate and process all of the files it has pulled and where it has utilized complete files, to mark those files as read.

This delay added to the mechanism is fully dynamic and can be lengthened if more processing time is required for a batch or shortened to a batch processing is completed. The interval times can also be dynamically adjusted based on a number of factors. Granularity of a Tick describes the $\Delta t = P + Q + R$. t=Delta time from the start of tick to end of the tick, P=Time for batch processing of items for this tick in the cycle. Q=Time for post batch processing computing. R=Time for delay to ensure no overlap between batch items and/or to set offset between ticks.

Figure 26:
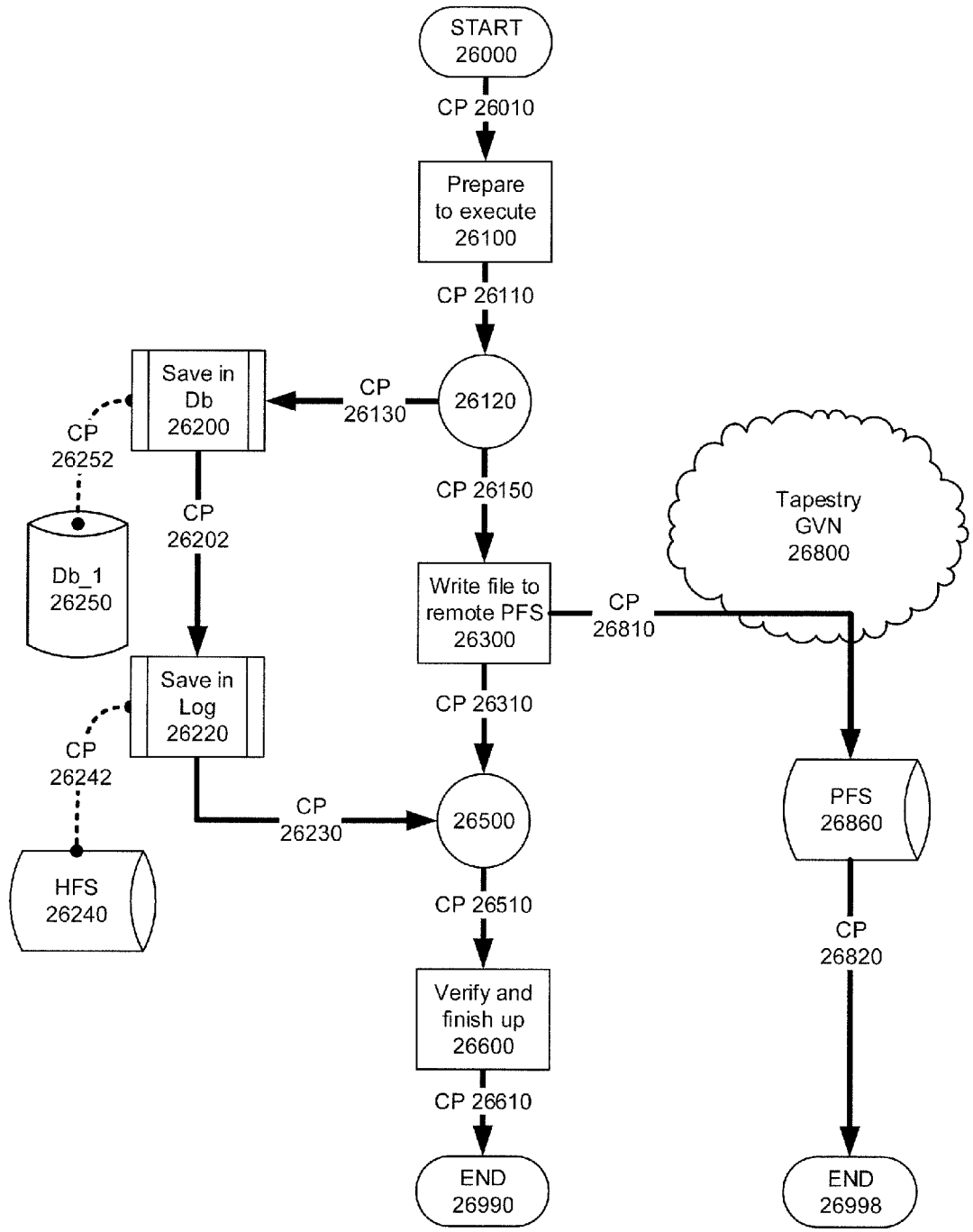
FIG. 26 illustrates an exemplary workflow of backend procedures post critical (to write to remote).

FIG. 26 illustrates an exemplary workflow of backend procedures post critical (to write to remote). This figure describes algorithm logic of the write process to a PFS 26860 in a remote region. It begins at Start 26000 to Prepare to execute 26100 via path CP 26010. The flow then goes to junction point 26120 via path CP 26110. At junction point 26120, the flow is forked into two streams, via paths CP 26130 and CP 26150. These streams run concurrently to each other and are independent.

Path CP 26150 from junction point 26120 to a use process such as Write file to remote PFS 26860. The write is made by Write file to remote PFS 26300 via path CP 26810.

The other path CP 26130 is for database record saving and logging. The Db record is saved locally in Db 26250 via process Save in DB 26200. Log records backups, or other related files are stored in a local HFS 26240 via Save in Log 26220 process. The remote write ends at END 26998. The administrative flow of database and log saves ends at END 26990.

Figure 27:
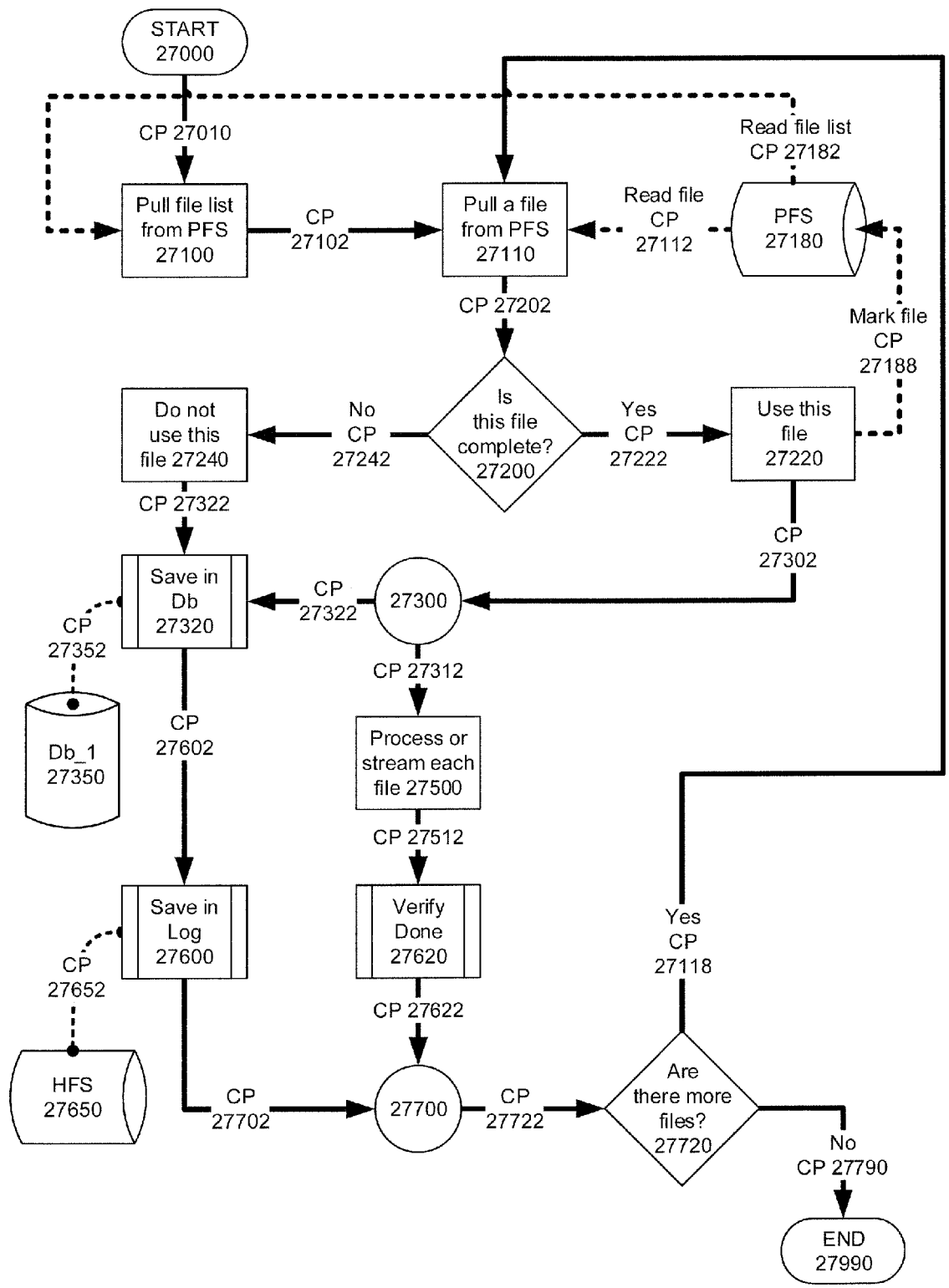
FIG. 27 illustrates an exemplary workflow of backend procedures post critical (to read from PFS and process).

FIG. 27 illustrates an exemplary workflow of backend procedures post critical (to read from PFS and process). This example embodiment describes an algorithm governing the batch pulling 27100 and reading of files from PFS 27180 to be processed locally. When a file is read, it is checked for completeness 27200. If it is indeed complete, it is marked as being pulled 27188 so that a next batch by process 27100 does not repeat the read. See FIG. 25 to see how it addresses the problem of duplicate files being pulled as described in FIG. 24.

Parallel and concurrent to processing, logging via Save in Db 27320 to Db_1 27350 and Save in Log 27600 writing notation records to logs on HFS 27650.

Only if the calculated checksum for the payload of a file at Is the File complete 27200 is equal to the checksum embedded in footer, can the file be marked as read and okay 27188.

Use this file 27220 implies that something will be done with the information or instructions or other data sent within the file structure. If market pricing information displayed or processed to algorithm for processing. If a trade instruction is ordered, then 27220 will feed this to the market for execution. The response can then be remotely written via same methodology. This may be utilized in the financial world or for other applications.

One key point is that each batch of files at a file processing cycle list pulled as a list at the start 27100. And each file is subsequently pulled 27110 and checked for completeness 27200. If a file is complete "yes" 27222, it is used 27220. The stream forks after this step. Mark file CP 27188 marks the file as read on the PFS 27180. Path CP 27302 leads to junction point 27300. The path is forked here to CP 27322 leading to saving in a database 27350 and a log on HFS 27650. The other path CP 27312 is to use the file.

For the sake of simplification this demonstration, the file pulls 27110 are described as a looped pull. The step CP 27102 between Pull file list from PFS 27100 and Pull a file from PFS 27110 can also spawn parallel and concurrent file pulls each running at same time, following this process.

Other variations and possibilities exist and those skilled in this area will be able to make slight variations to this algorithm to achieve the save results.

The key point is that file batches can be pulled, each file individually checked if complete, if not complete 27242, the file is not used 27240 but this is still saved 27320 in Db 27350 and logged 27600 on HFS 27650. If a file is complete 27222, it is used 27220, marked 27188, processed 27512, and a record of its pull, check, use, and other information is saved in database 27350 and files are also logged on HFS 27650.

Figure 28:
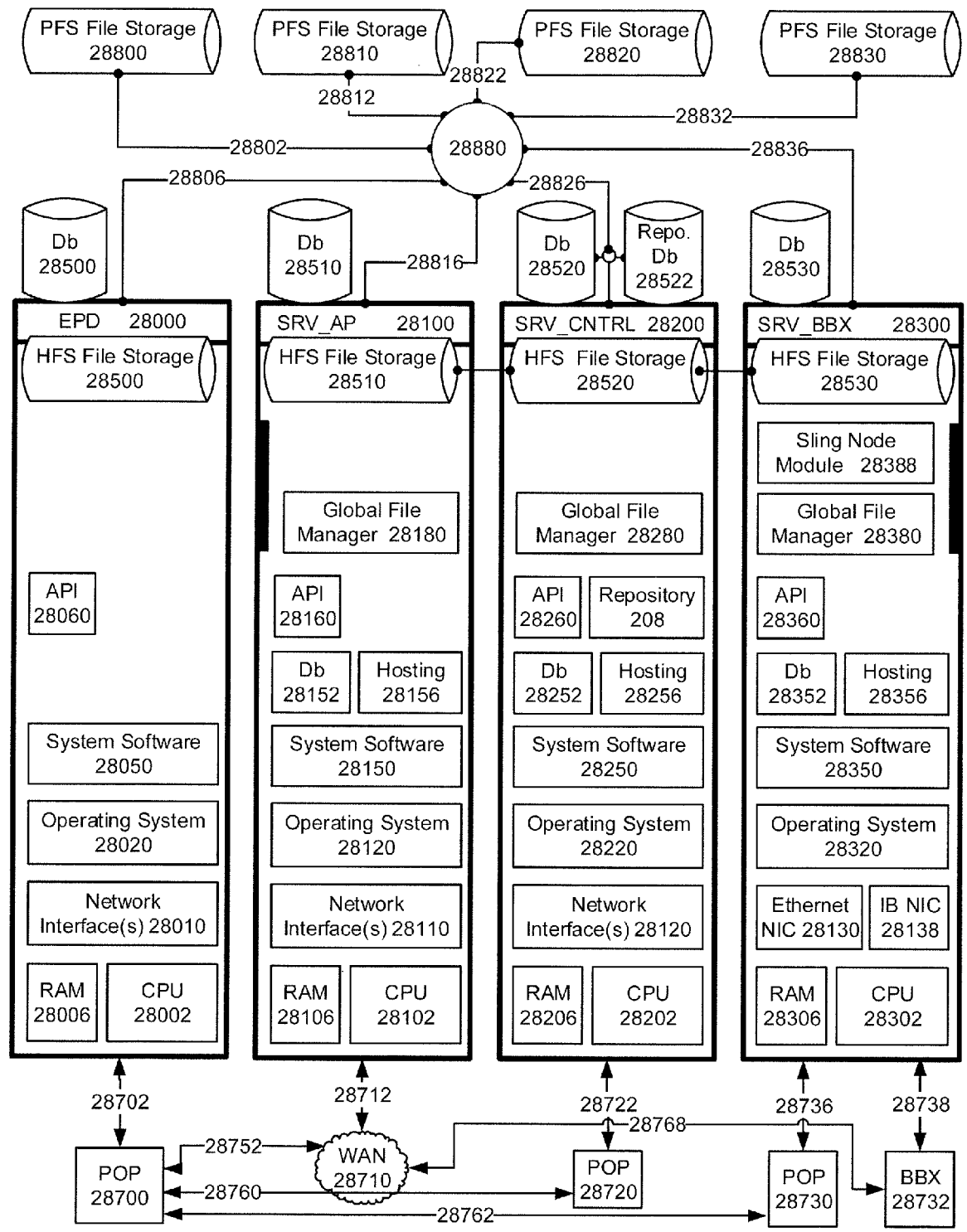
FIG. 28 illustrates an exemplary systems diagram for information slingshot.

FIG. 28 illustrates an exemplary systems diagram for information slingshot. This figure describes the various modules running on various devices which could utilize the information slingshot described herein. Junction point 28880 between devices EPD 28000, SRV_AP 28100, SRV_CNTRL 28200, and SRV_BBX 28300 and PFS devices 28800, 28810, 28820, and 28830.

SRV_BBX servers can also connect to each other such as SRV_BBX 28300 and SRV_BBX 28732 via path 28738. This figure also includes a Sling Node Module 28388 on an SRV_BBX 28300. This sling node can either reside on the SRV_BBX 28300 or a sling node can be an independent device/server working in unison with the SRV_BBX 28300.

Figure 29:
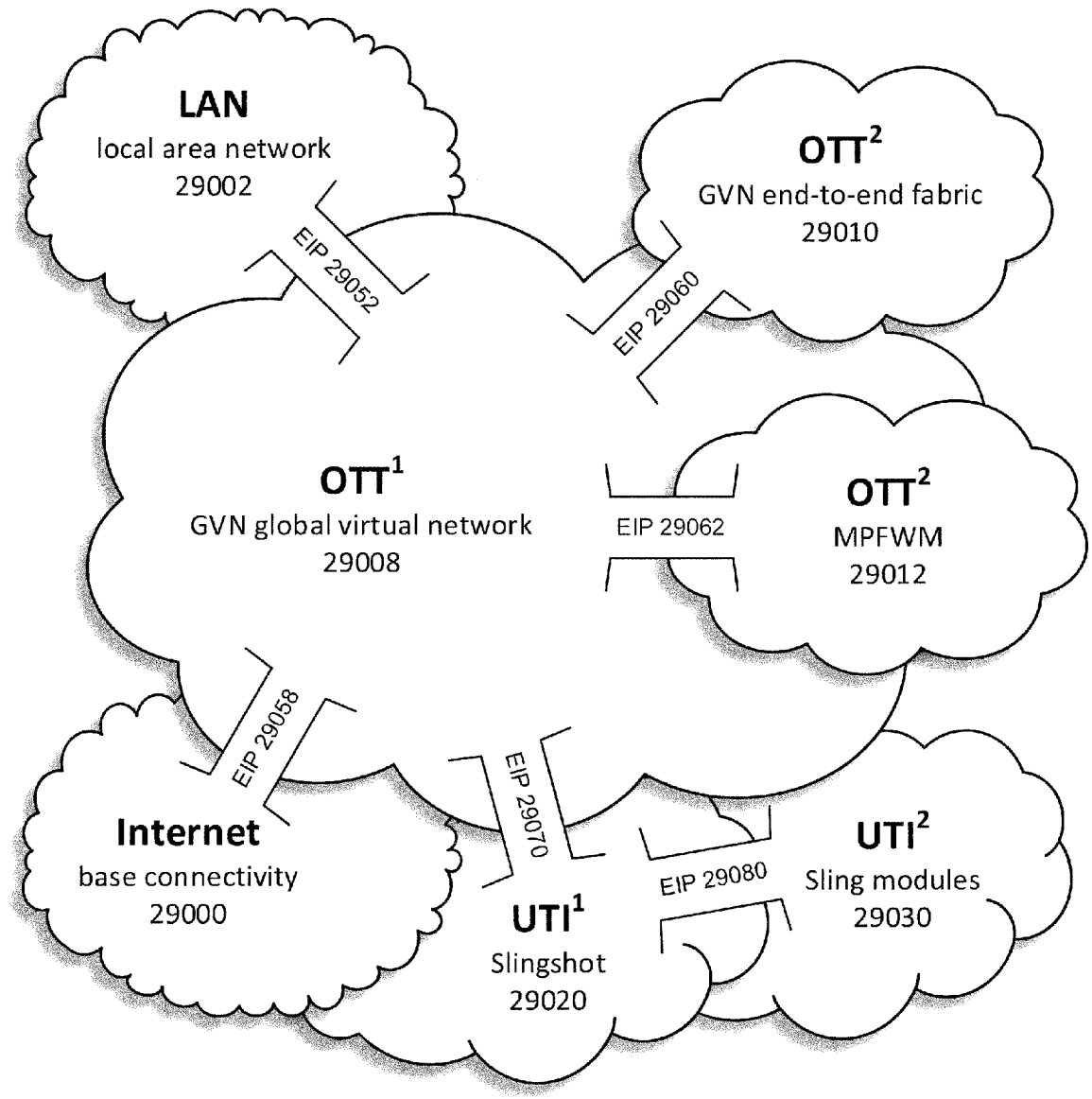
FIG. 29 illustrates structured combination of layered network fabrics into a network tapestry.

FIG. 29 illustrates structured combination of layered network fabrics into a network tapestry. This figure represents various network fabrics illustrated as separate clouds layered at different levels. OTT' represents a first degree layer over-the-top of either a LAN 29002 or Internet 29000 or Slingshot mechanism 29020. A network type such as GVN 29008 exists at OTT'.

$OTT^2$ represents a second degree over-the-top and these modules are built on top of a GVN 29008 such as OTT2 GVN end-to-end fabric 29010 or a OTT2 MPFWM multi-perimeter firewall mechanism 29012.

$UTI^1$ is the Slingshot layer 29020 "under the internet" or in parallel with the internet 29000. $UTI^2$ is where sling modules 29030 exist such as Sling Hop, Sling Route, Information Beacon and other related tech.

At each boundary between one network fabric and another are egress ingress points (EIPs). EIPs such as EIP 29052 imply a bridge between a LAN and a GVN, typically via an end point device (EPD) at the edge of the LAN 29002 building a secure tunnel with an access point server (SRV_AP) in the GVN 29008. An EIP 29058 between the GVN 29008 and the Internet 29000 implies an EIP on an SRV_AP. EIPs between other layers can represent other topologies and involve various other devices.

These various network fabrics when linked by EIPs together constitute a network tapestry.

Figure 30:
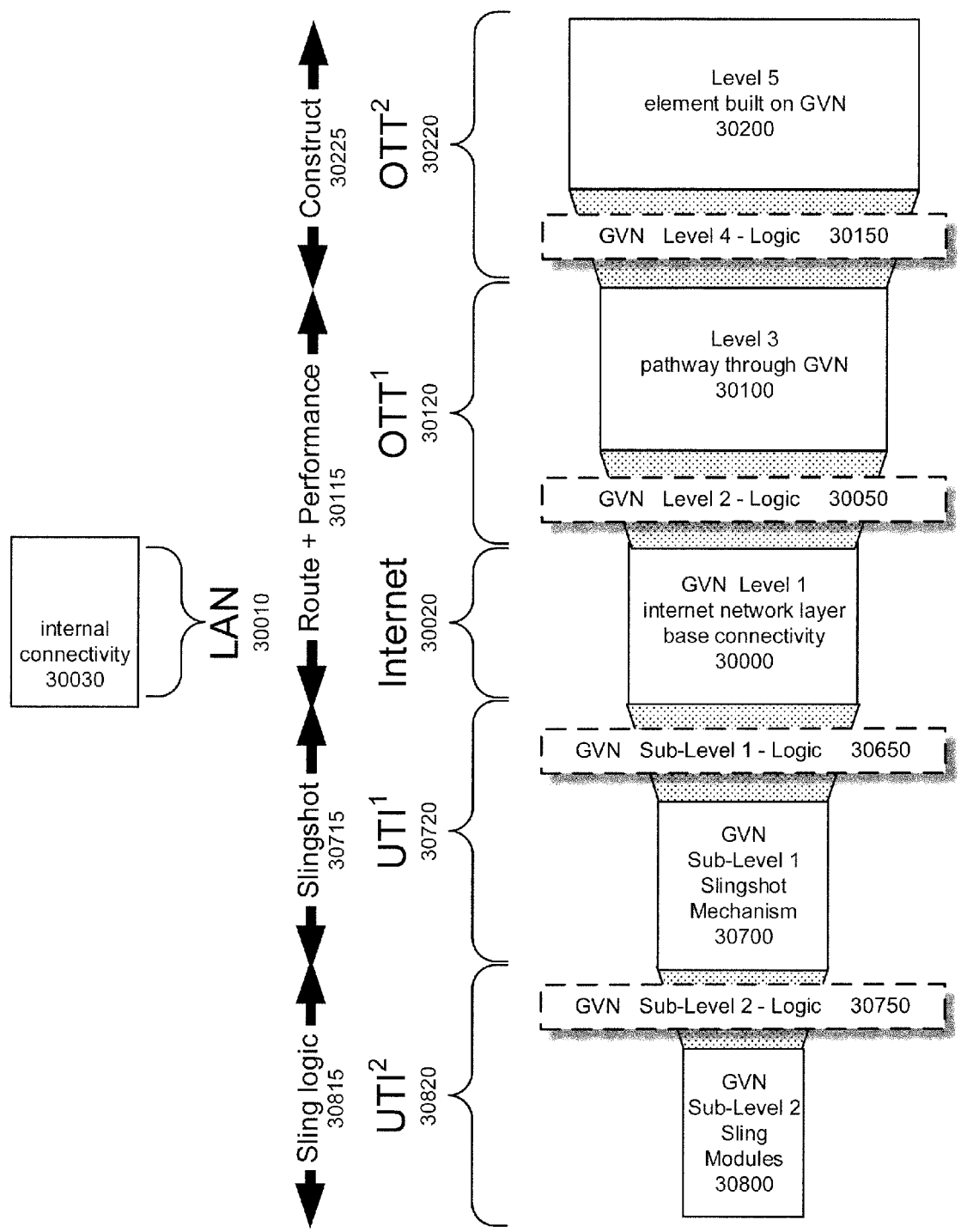
FIG. 30 illustrates exemplary ordered layers of various network fabrics into a tapestry.

FIG. 30 illustrates ordered layers of various network fabrics into a tapestry. This figure is related to FIG. 29 presented as layered blocks. Added elements are Route+ Performance 30115, Construct 30225, Slingshot 30715, and Sling logic 30815.

New elements are also GVN Level 2—Logic 30050, GVN Level 4—Logic 30150, GVN Sub-Level 1—Logic 30650, and GVN Sub-Level 2—Logic 30750. These logic layers are where certain settings, operations, routines, and other methods are utilized to power EIPs between layers.

Figure 31:
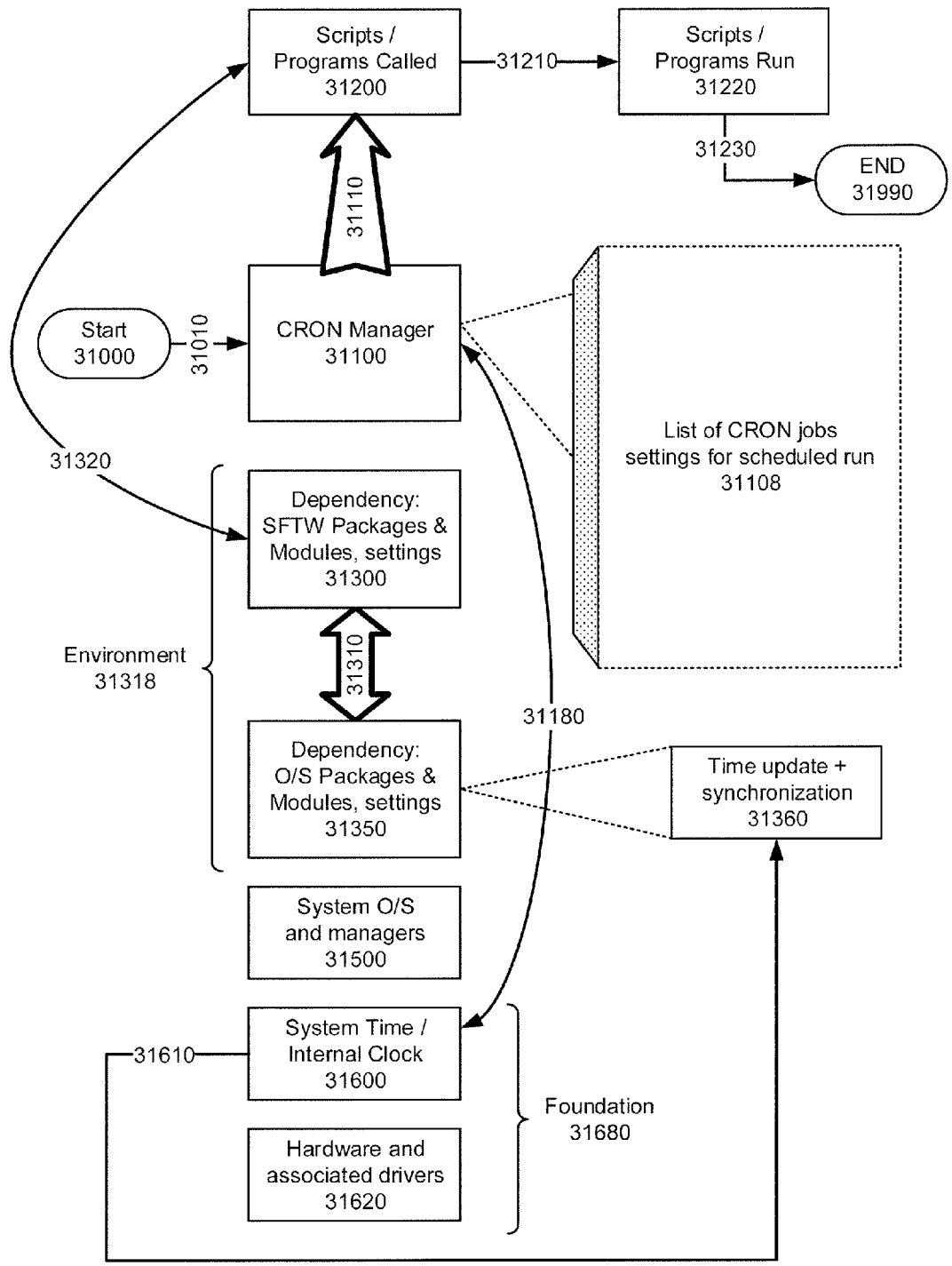
FIG. 31 illustrates conventional techniques—CRONS.

FIG. 31 illustrates conventional techniques—CRONS. This example embodiment describes conventional techniques of a CRON scheduled task. Scripts/Programs Called 31200 are controlled by the CRON manager CRON Manager 31100 process.

CRON jobs may be set either by manually adding items to the CRON list 31108 or this list may be managed by a software manager layer. Some problems exist relating to knowing if this process is running properly or not. And is there only one process running as intended or are there many spawned and unintentional parallel instances running. Environment items 31318 need to be to date and functioning within expected parameters. Foundation items 31680 need to be running optimally and within expected parameters.

System Time/Internal Clock 31600 has to be up-to-date 31360 and accurate to a very fine time granularity. This update regularity needs to be more frequent than the drift that the system is susceptible to. Hardware and associated drivers 31620 have some dependency on available resources.

Figure 32:
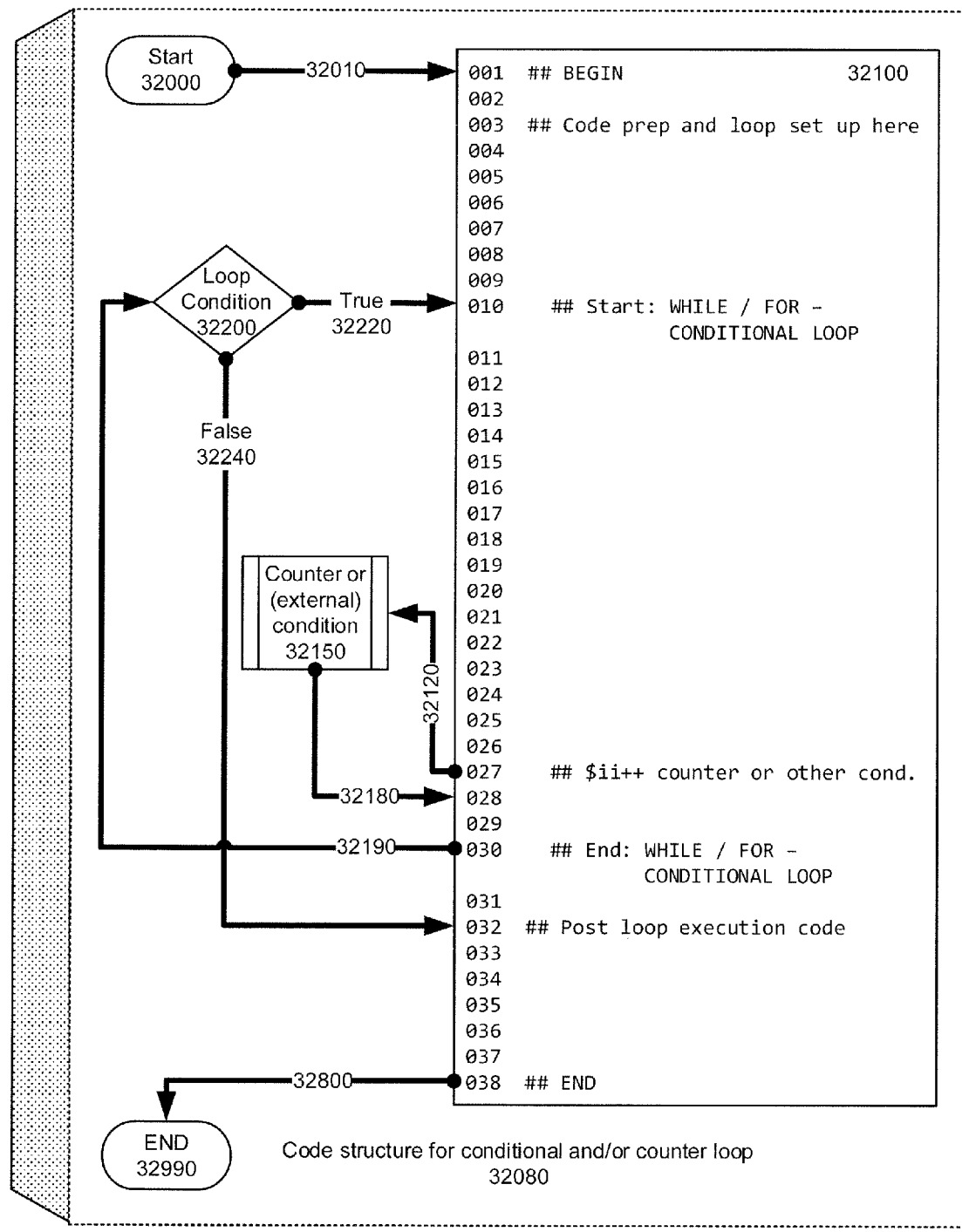
FIG. 32 illustrates conventional techniques—Loops.

FIG. 32 illustrates conventional techniques—Loops. This example embodiment describes conventional techniques of loops within a script which are logically governed either by conditional or count factors 32150. It presents the code structure for a conditional and/or counter loop 32200.

When the file is called by a trigger at Start 32000. In this example, preparation code is run between example lines 004 and 009. In the case of a counter loop, the conditional loop will run while the Loop Condition 32200 evaluates of the current loop cycle counter $ii is less than the number of times that this loop should be run. At line 27 of the example script, the Counter or (external) condition 32150 will add one to $ii via $ii++ or some equivalent. This loop will continue to run as long as the condition remains true 32220.

If the counter $ii is equal to or greater than the number of times the loop should cycle, the loop will end and the processing flow will continue. Post loop code to execute is located between lines 033 and 037.

The script/routine/software ends at line 038 and its execution terminates at END 32990.

While the script is externally called once and loops as many times as prescribed either by a counter or by a condition, there can also be problems such as:
  What happens if/when a script crashes? How can it recover?
  What if a script takes longer to run per cycle?
  What if the base clock of the system drifts to that it is too fast or too slow?
  What if the script forks and sees more than intended number of concurrent instances of itself?
  How to fine tune the granularity of a tick to ms or even μs.

Figure 33:
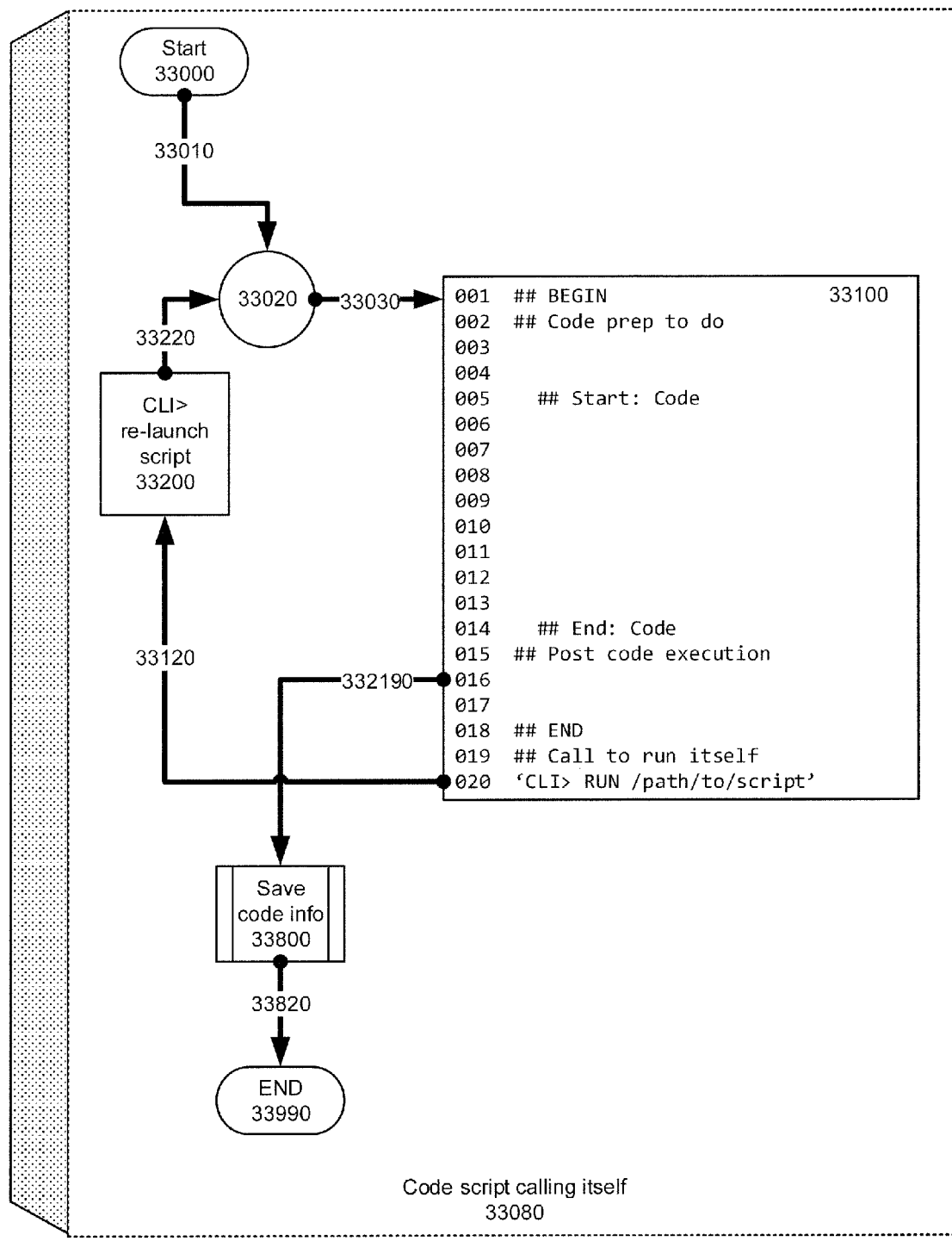
FIG. 33 illustrates conventional techniques—Recursion—Script calling itself.

FIG. 33 illustrates conventional techniques—Recursion—Script calling itself. This example embodiment is similar to FIG. 32 and the main difference is that it is simpler. It does not contain a loop within its code but rather has a command calling itself in a constant run-time loop.

It begins at Start 33000. Code 33100 is listed from lines 001 through 020. To prepare for execution code is located between lines 002 and 004. The code to run during that one instance is between lines 005 and 014. Post execution code to run is between 015 and 018. At line 020 of the figure, the script calls itself and for example it opens a shell CLI> to re-launch script 33200. If there is a condition to end the running of the code (logic not illustrated), then at line 016, code info can be saved 33800. The script ends at END 33990.

If no condition or logic to end the looping of the script running exists, then it will loop run indefinitely.

Figure 34:
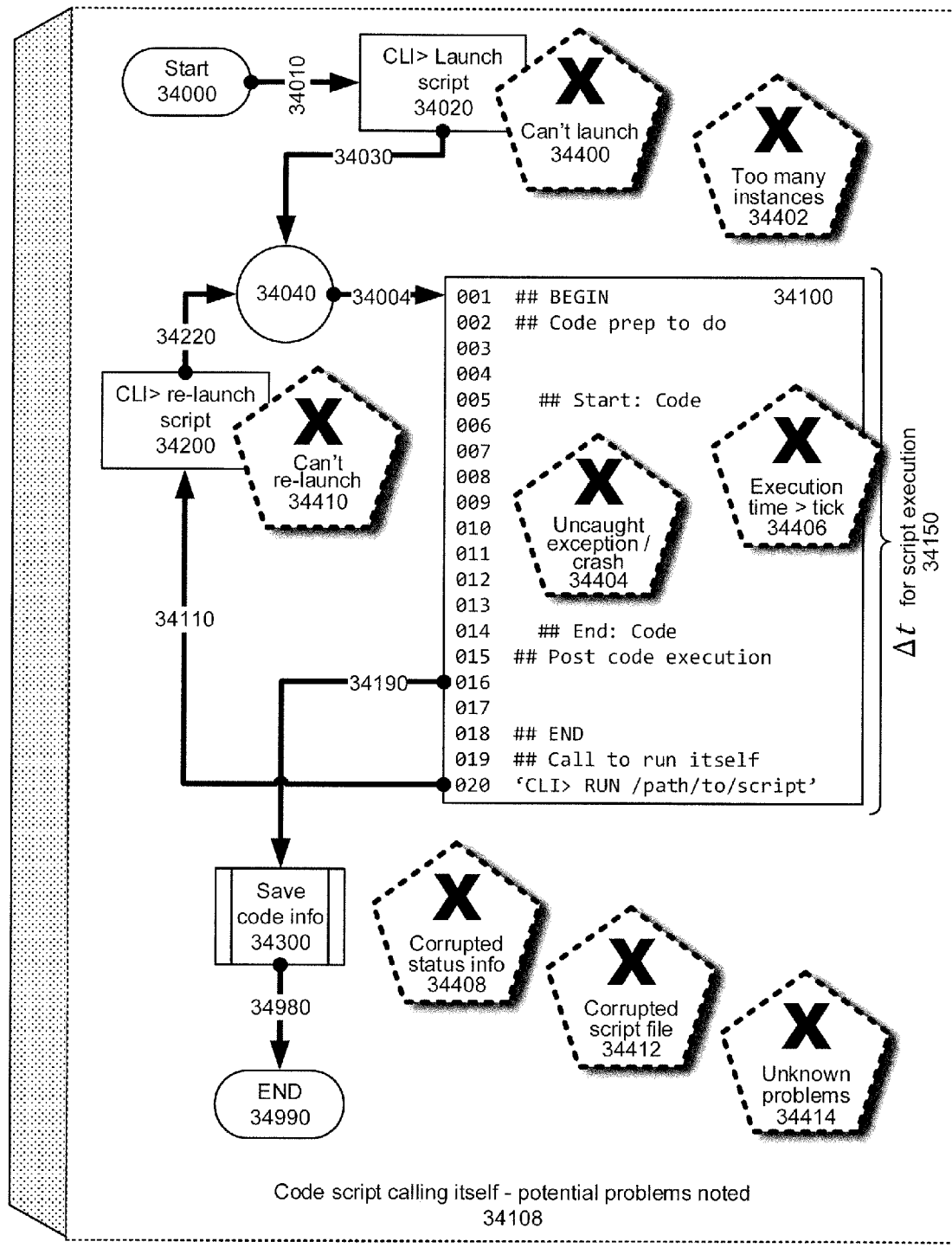
FIG. 34 illustrates Problems with loops.

FIG. 34 illustrates problems with loops. FIG. 34 is based on FIG. 33 and the main differentiating factor are the problems noted as 344##. These problems as follows:

| | |
|---|---|
| 34400 | Can't launch |
| | Due to permissions of the calling system user or other issues, a script 4-100 may not initially be run. This may or may not be immediately evident. Changed software or updated software, missing inclusion files or other factors may prevent the running. |
| 34402 | Too many instances |
| | If for some reason, the script 4-100 is called to run more than once, then more than one instance of the script will be running. This is problematic because every instance of a script will be calling itself and perpetually running consuming system resources. There are also dangers of conflict due to multiple scripts trying to process or handle the same subject matter with unintended and potentially destructive or disruptive results. More is not always better. |
| 34404 | Uncaught exception/crash |
| | If a script runs and crashes, unless this exception is caught, the next loop will not be triggered and the functionality which the script accomplishes will not be realized. |
| 34406 | Execution time > tick allowed time |
| | If a script takes longer than the allocated time for a tick, the next tick will be delayed by the overage throwing a schedule off. |
| 34408 | Corrupted status info |
| | If the status on which a script relies for conditional looping gets corrupted, then unintended consequences could be the result. |
| 34410 | Can't re-launch |
| | If a script is run but can't relaunch itself because the running process has different rights than the user or process which initially called the script, then it will run only once and will not continue to run. |
| 34412 | Corrupted script file |
| | If the script file gets corrupted at the storage media (either physical or virtual in memory storage), the next time it is called by CLI > re-launch script 4-200 it will either crash or could run and produce unintended consequences. |
| 34414 | Unknown problems |
| | There may be other problems which occur which are unknown and undetectable. The launcher which called the script may think that it is running but in reality it is not. |

The above problems are included to highlight some of the potential issues. Not all or only some of these could present themselves at any time. More problems not outlined can exist.

FIG. 35 illustrates Delta Time=P+Q+R. This figure describes the life cycle of a tick. The time granularity of a tick can be defined as follows.

The Granularity of a Tick $$\Delta t = P + Q + R$$

$\Delta t$=Delta time from the start of tick to end of the tick 35100
  Start based on completion of last tick
  or
  according to a scheduled time
  P=Time for batch processing of items for this tick in the cycle.
  Q=Time for post batch processing computing.
  R=Time for delay to ensure no overlap between batch items and/or to set offset between ticks.

The period 35000 is the delta time or $\Delta t$ for the duration of a tick.

FIG. 36 illustrates timing of various cycles where X≠Y. This figure is based on FIG. 35 and it describes two ticks with variable and different times.

Δt=x 36100 and Δt=y 36200 do not equal each other as described by x≠y 36010.

In this example, the delays R 36130 and R 36230 are equal to each other. The processing times P 36110 and P 36210 are not equal reflecting the different amount of tasks each is required to run. The post processing times Q 36120 and Q 36220 are also respectively different based on the amount of tasks each has to complete.

The duration of time for each cycle therefore changes based on how many items are to be processed.

FIG. 37 illustrates timing of various cycles where X is consistent. This figure is based on FIG. 35 and while it describes two tick cycles, unlike FIG. 36, these tick cycles are of equal time duration x0=x2 37010. While Δt=x0 37100 and Δt=x2 37200 are equal, the processing times per tick P 37110 and P 37210 can either be equal to each other or one can be longer than the other. Each is still based on the quantity of tasks it has to process. And respectively the post processing times Q 37120 and Q 37220 can also differ from each other or be equal.

The ticks are kept into equal Δt duration 37010 in at least two ways:
- By limiting the quantity of items to process by a tick's P (P 37110 or P 37210) will never force the Δt to go over its allotted time budget.
- The delays R 37130 and R 37230 dynamically adjust to ensure that the delay is long enough before the next cycle runs. The delay may be a timer to sleep or it could be a null action but there has to be some sort of a gap between end of a Q of the current tick cycle and the beginning of the P of the next tick cycle.

This fixed time is possible if there is a limit on the quantity of the number of items processed based on how much time is required for each P and Q.

Figure 38:
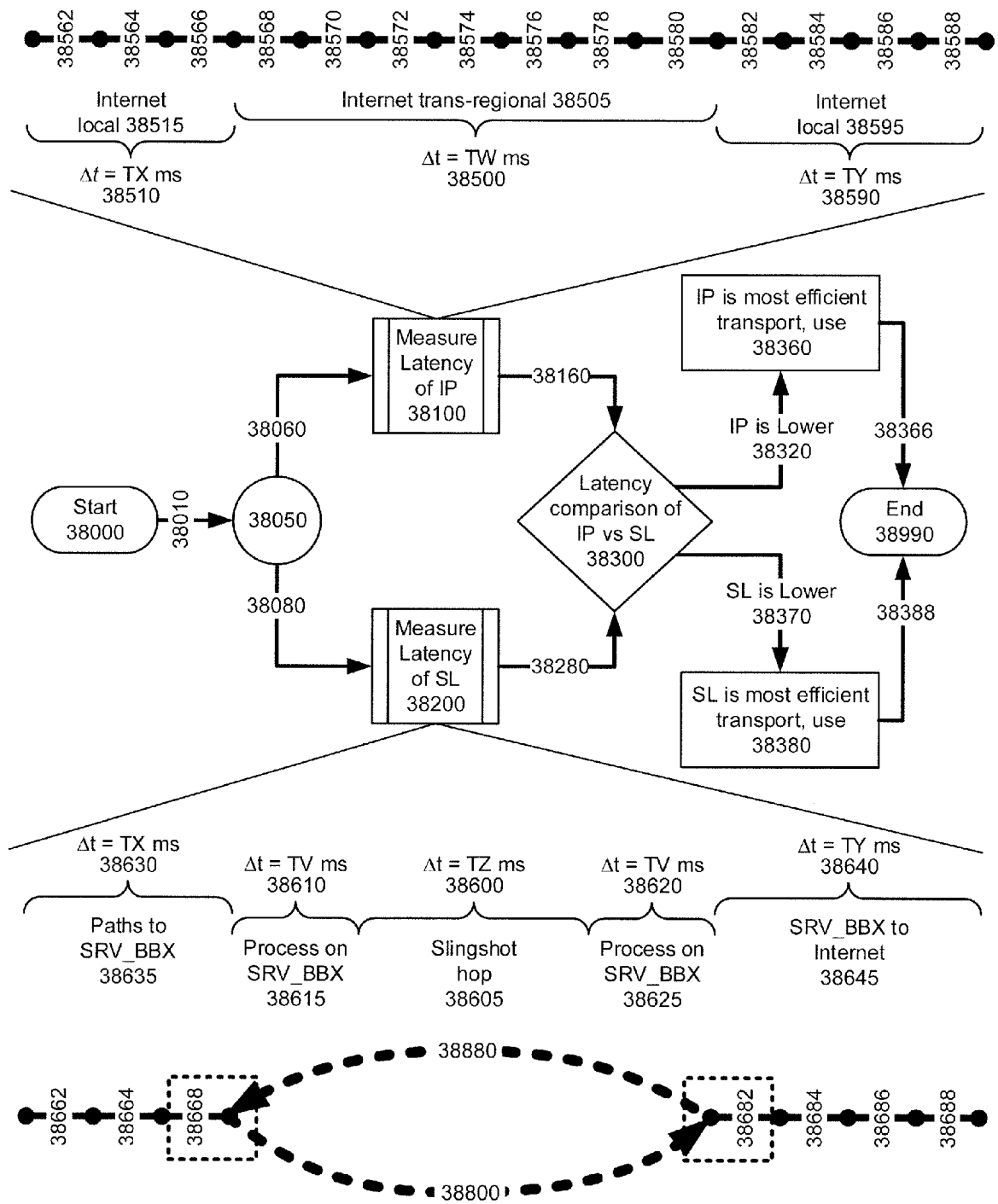
FIG. 38 illustrates distance threshold to realize gain from Slinghop.

FIG. 38 illustrates distance threshold to realize gain from Slinghop. This Figure highlights the algorithmic decision logic of whether or not to it is faster and/or more efficient to send packets via an internet path IP 38562 to 38588 or through a slingshot enhanced internet path 38662 through 38688 with a Slinghop transparent segment 38800 and 38880 between a pair (or more than one pair) of IP addresses 38668 and 36682.

It does not take into account reliability or loss or related congestion or other issues beyond latency which may have an effect on the IP path.

There are inefficiencies of using Slinghop of Δt at each bridgehead 38610 and 38620 of the Slinghop transparent hop segment 38600 versus the gain achieved 38370 via the utilization of Slinghop.

A minimum distance is needed to compensate for the requisite processing time of the Slinghop mechanism at 38615 and 38625.

Measure Latency of IP 38100 uses the following equation to measure

Total Internet Path Time Δt ms=TX 38510+TW 38500+TY 34590

Measure Latency of SL 38200 uses the following equation to measure:

Total Internet-Slinghop Hybrid Path Time Δt=TX 38630+TV 38610+TZ 38600+TV 38620+TY 38640

Latency comparison of IP vs SL uses Equation

Δt{TV+TZ+TV}<Δt{TW ms}

If True that Slinghop enhanced path (Δt{TV+TZ+TV}) has a lower latency SL is Lower 38370 than internet path then "SL is most efficient transport, use" 38380 is the most optimal path.

If False and internet (Δt{TW ms}) is faster than slinghop "IP is Lower" 38320 then "IP is most efficient transport, use" 38360 is the most optimal path.

The importance of exact timing is not just that files are received and processed without duplicates but also that there is a limited delay—that the file is processed with minimal delay.

Figure 39:
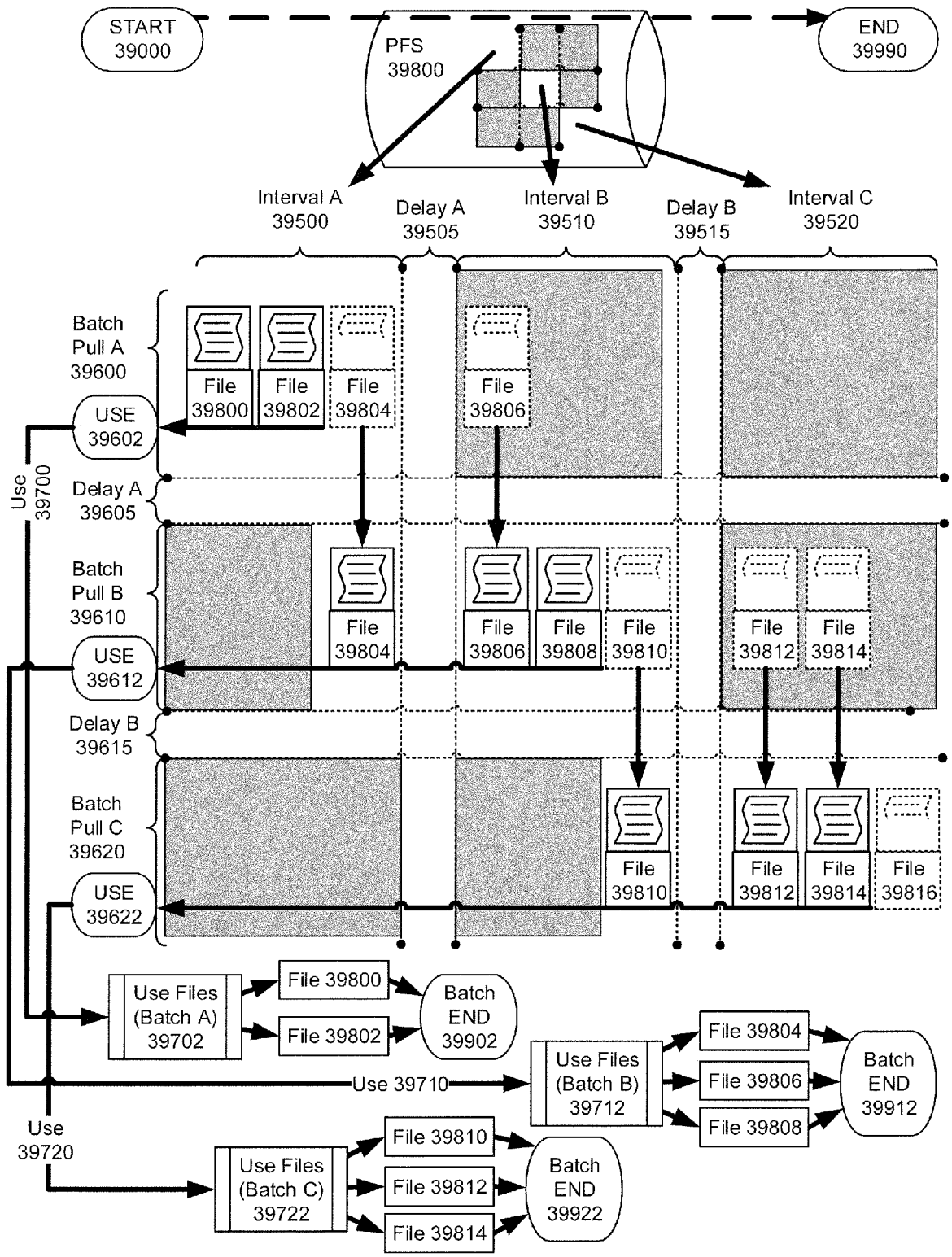
FIG. 39 illustrates synchronization of batches, with respect to marking file(s).

FIG. 39 illustrates synchronization of batches, with respect to marking file(s). This figure is based on FIG. 25 above. The USE of the files illustrated for USE 39602 of files in Batch Pull A 39600, for USE 39612 of files in Batch Pull B 39610, and for USE 39622 of files in Batch Pull C 39620. Use Files (Batch A) 39702 sends files File 39800 and File 39802 in parallel and ends at Batch END 39902. Use Files (Batch B) 39712 sends files File 39804 and File 39806 and File 39808 in parallel and ends at Batch END 39912. Use Files (Batch C) 39722 sends files File 39810 and File 39812 and File 39814 in parallel and ends at Batch END 39922. The key point is that while the files are pulled in batches, the pull of files which are available is in parallel and therefore use is in parallel as well. Files not ready in Batch Pull A 39600 such as File 39804 and File 39806 will not be pulled and used until they are available. File 39804 and 39806 are pulled with File 39808 in Batch Pull B 39610.

The ability to patch pull and process in parallel allows for the Slingshot mechanism to massively scale.

Figure 40:
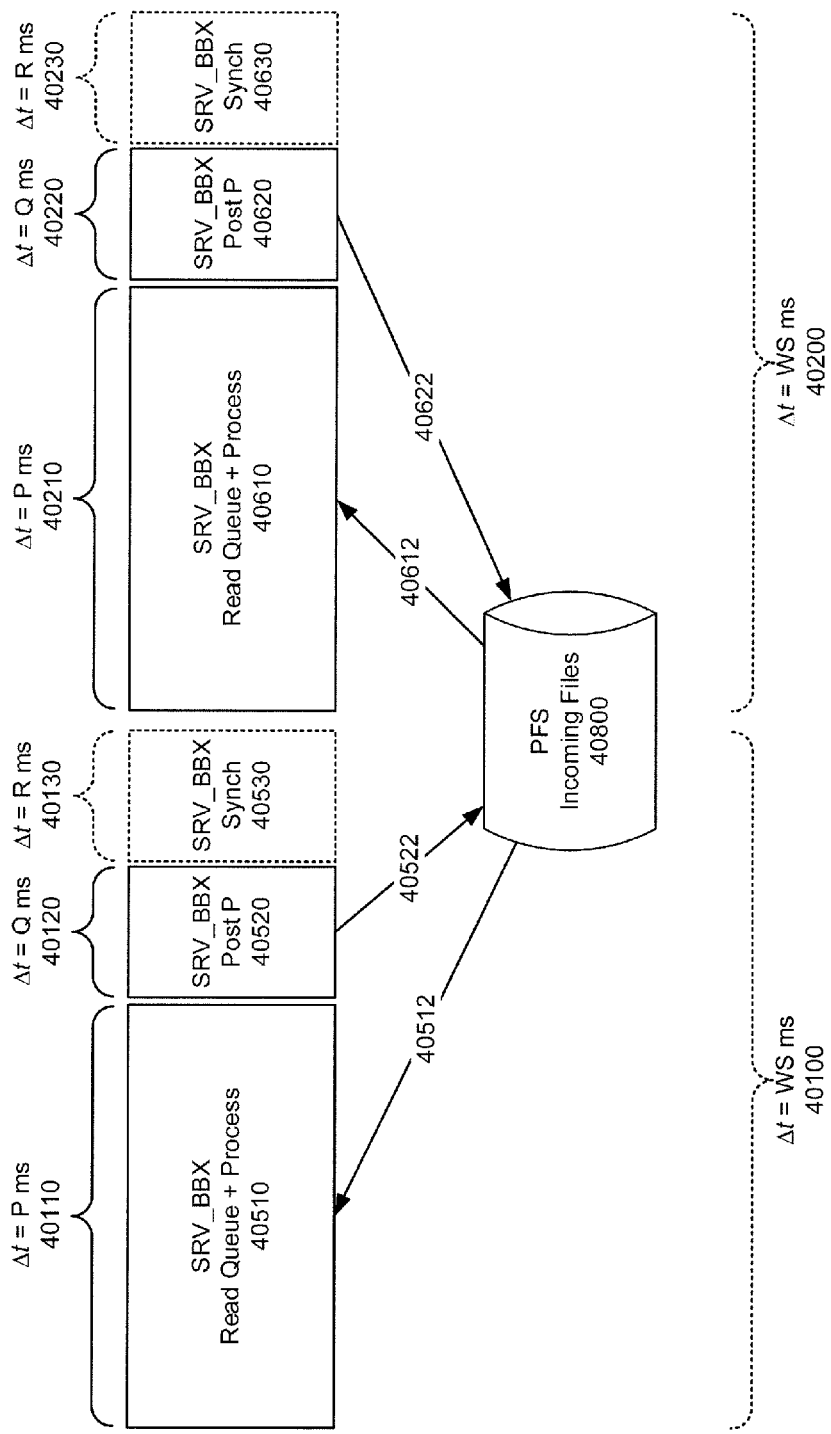
FIG. 40 illustrates granularity of a tick.

FIG. 40 illustrates granularity of a tick. This figure illustrates two ticks 40100 and 40200. This example demonstrates two batch file pulls on a backbone exchange server (SRV_BBX) with Read Queue+Process 40510 and Read Queue+Process 40610. They both pull files from the same storage media parallel file system PFS Incoming Files 40800. Files pulled in 40510 via path 40512 are processed and then in post processing Post P 40520 the files are marked via path 40522.

This is a critically important point because the next batch file pull Read Queue+Process 40610 from PFS Incoming Files 40800 via path 40612 should only include unmarked files or files not filled by previous batches. Then at Post P 40620 the files pulled and used are marked via path 40622 so that they will not be inadvertently pulled by a subsequent batch file pull.

Figure 41:
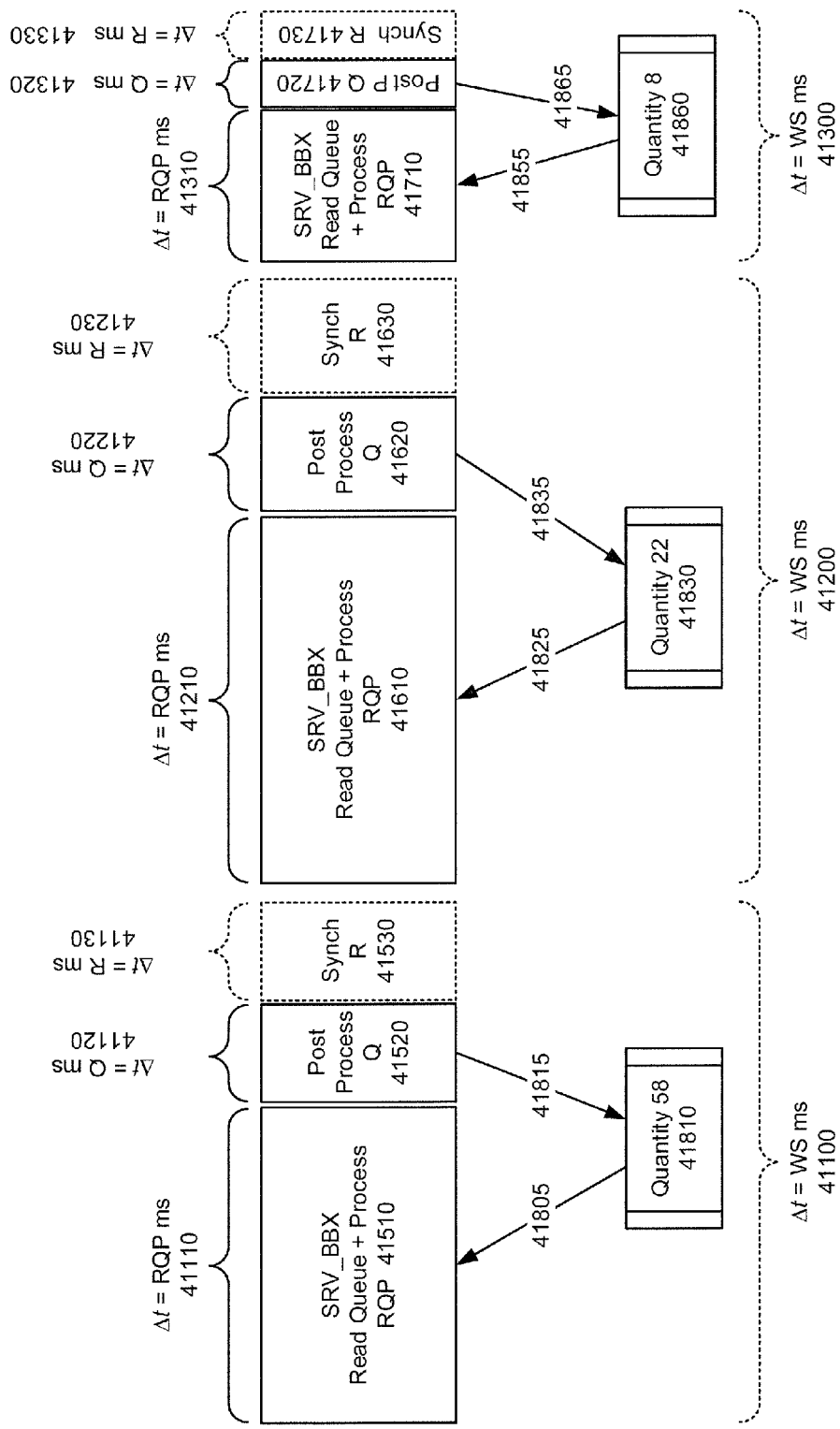
FIG. 41 illustrates granularity of a tick, with respect to variable time interval.

FIG. 41 illustrates granularity of a tick, with respect to variable time interval. This figure is similar to FIG. 40, however, it illustrates the processing of variable quantities of files and demonstrates how this affects both processing and post processing time as well as noting minimum delay before the next cycle should be executed.

There are three cycles noted herein; 41100, 41200 and 41300 and each cycle contains different respective quantities of Quantity 58 in 41810, of Quantity 22 in 41830, and of Quantity 8 in 48860.

Figure 42:
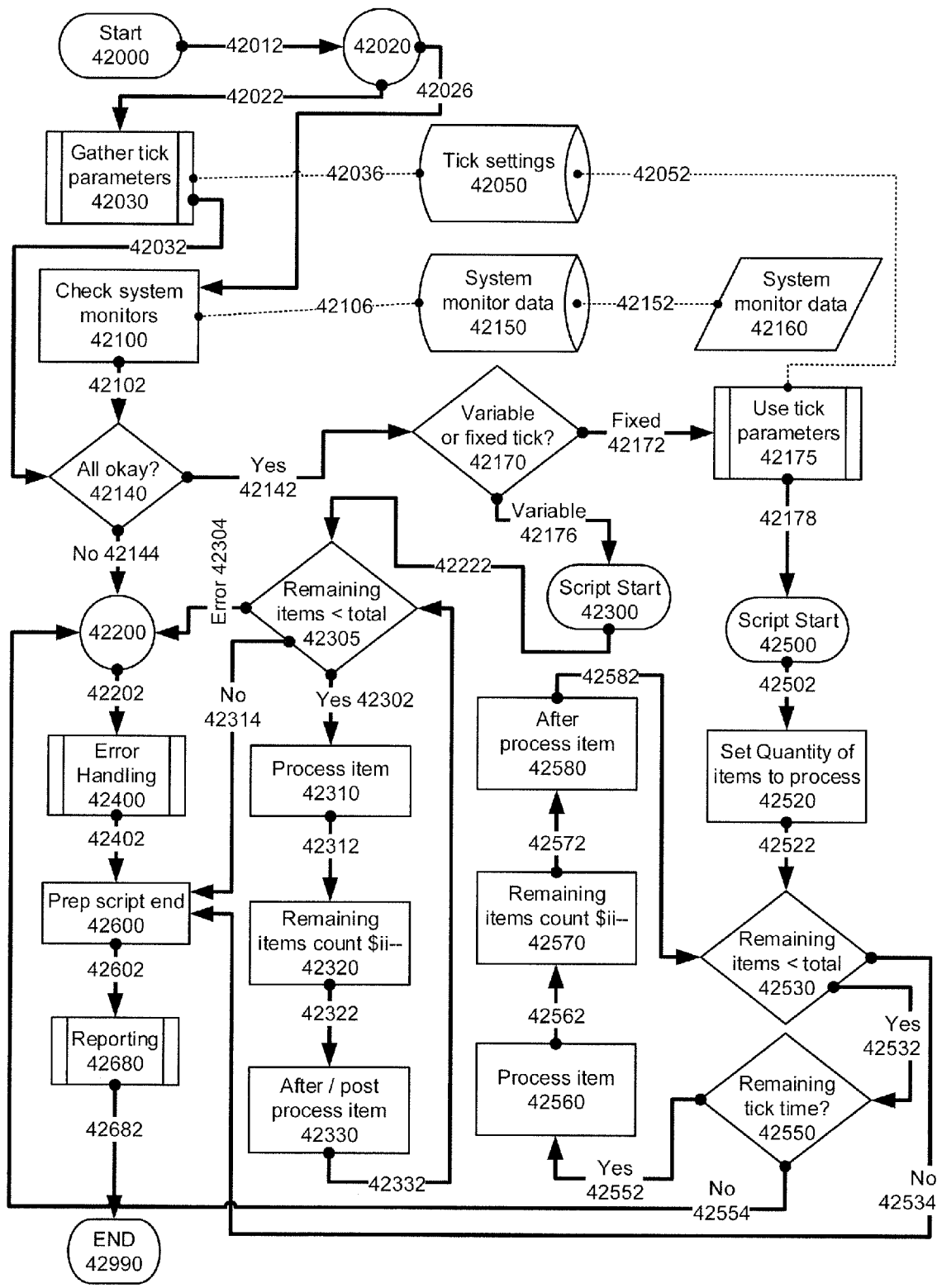
FIG. 42 illustrates an exemplary algorithm, with respect to tick Adjustment.

FIG. 42 illustrates an exemplary algorithm, with respect to tick adjustment. This figure describes the algorithm utilized for different types of ticks. It begins at Start 42000 and terminates at END 42990.

At junction 42020, two parallel processes execute to Gather tick parameters 42030 sourced from Tick settings 42050 and Check system monitors 42100 sourced from System monitor data 42150 accumulated from System monitor data 42160 source.

If all is okay for the tick to continue running at All okay? 42140, then the flow will continue along the path Yes 42142.

If not okay, flow will go to error junction 42200 via path No 42144 to Error Handling 42400.

The two types of tick are either variable or fixed tick? 42170. A variable time tick 42176 begins at Script Start 42300. A fixed-time tick 42172 begins at Script Start 42500 using information from Use tick parameters 42175. There is also an additional logic gate Remaining tick time? 42550 to ensure that there are no time overruns. Common tick running completion processes, used by both fixed and variable processes, include prep script end 42600 and reporting 42680.

Figure 43:
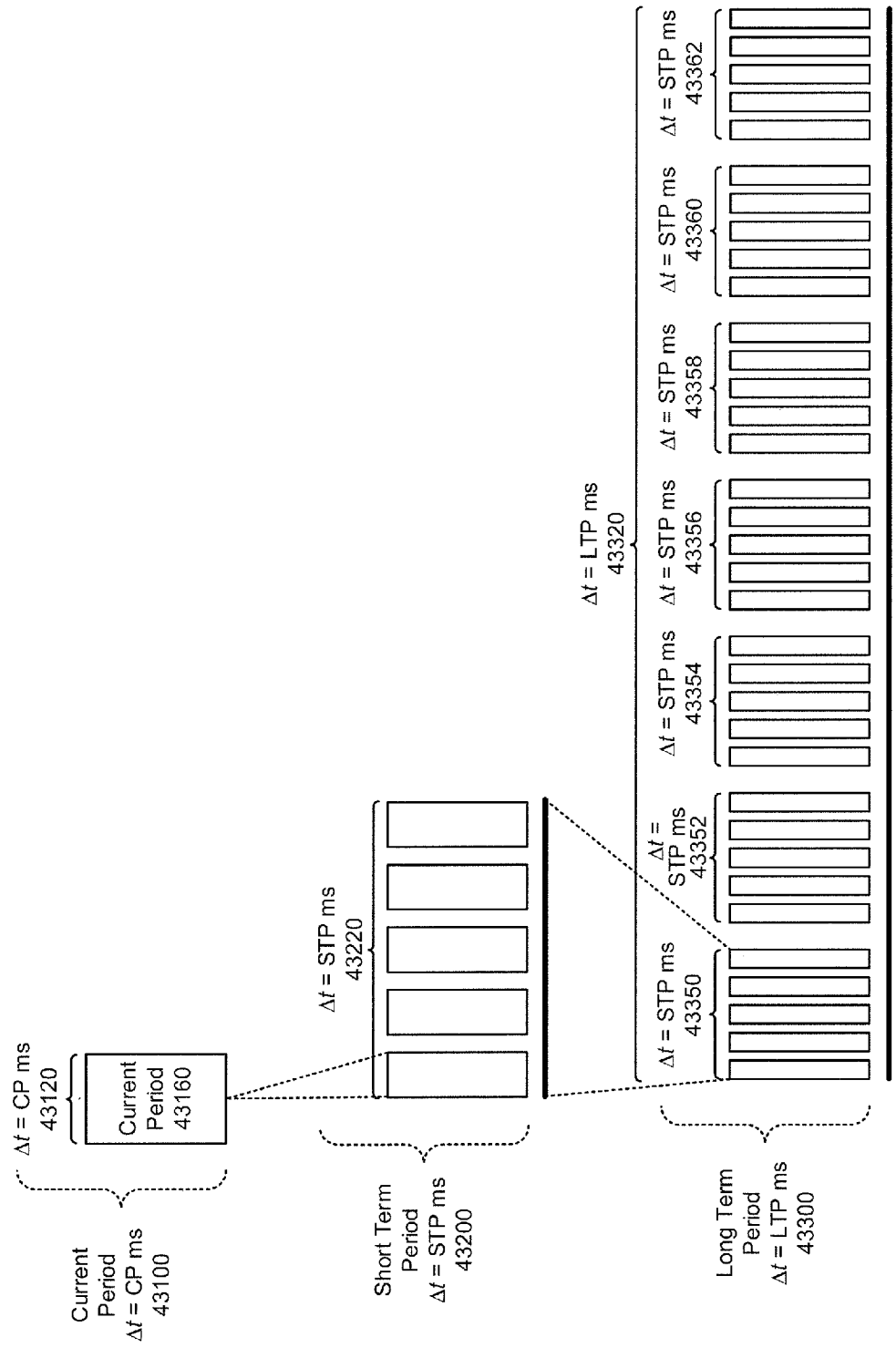
FIG. 43 illustrates Artificial Intelligence analysis, granularity and periods.

FIG. 43 illustrates Artificial Intelligence analysis, granularity and periods. This figure illustrates the analysis and interpretation of periods of tick cycles. Artificial intelligence can assist in future calculations to estimate how long the processing and post processing times of a tick will take based on quantities of items to process taking into account system resources and other factors.

Per period calculated metrics with data from current period 43100, short term 43200 and long term 43300 historical data can be plotted on a standard deviation curve based on the various cyclical trends. Notation of lows, highs, averages and other analysis can indicate whether current performance is in line with expectations or is better, worse, or otherwise different than previous experience.

This data gathering and contextual analysis assists artificial intelligence (AI) algorithms in decision making. Current period 43100 can be compared with short term 43200 and long term 43300 performance data.

Figure 44:
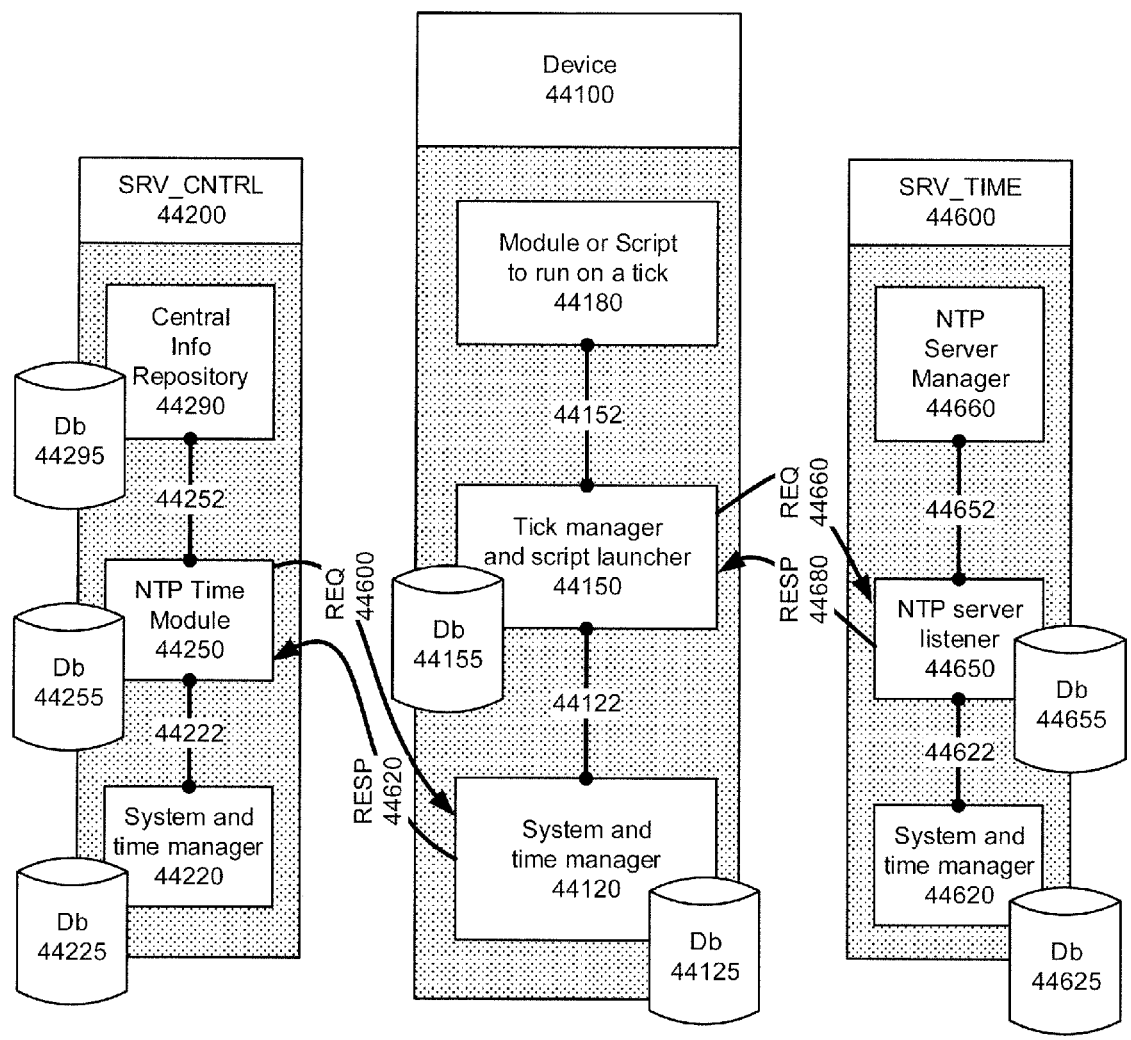
FIG. 44 illustrates exemplary components of Tick—Components.

FIG. 44 illustrates exemplary components of Tick. There are three types of devices illustrated in this figure. A central, control server (SRV_CNTRL) 44200, a generic Device 44100 and a time server (SRV_TIME) 44600. The Device can be any type of end point device (EPD), end point hub (EPH), access point server (SRV_AP), or other type of device.

On the central, control server (SRV_CNTRL) 44200 systemic information is stored in the database (Db) 44295 of the Central Info Repository 44295. This information can be used by tick related managers, monitors and other system components. See FIG. 48 where some tick related items are noted.

To update the time of its internal clock, a Device 44100 can query a SRV_TIME's 44600 NTP server listener 44650 via an API call or another type of request-response framework via paths REQ 44660 for the request and RESP 44680 via the response. The databases on the Device 44100 Db 44155 and on the SRV_TIME 44600 database Db 44655 can store information about time requests, time drift of the device, another other tick, time related, and other information.

Device(s) 44100 save information about time in their local databases Db 44155 and also report their time related information from their System and time manager 44120 to the SRV_CNTRL 44200 via a REQ-RESP posting to SRV_CNTRL 44200 via REQ 44600 with confirmation back via RESP 44620.

The NTP Time Module 44250 on SRV_CNTRL 44200 analyses systemic time related information.

Figure 45:
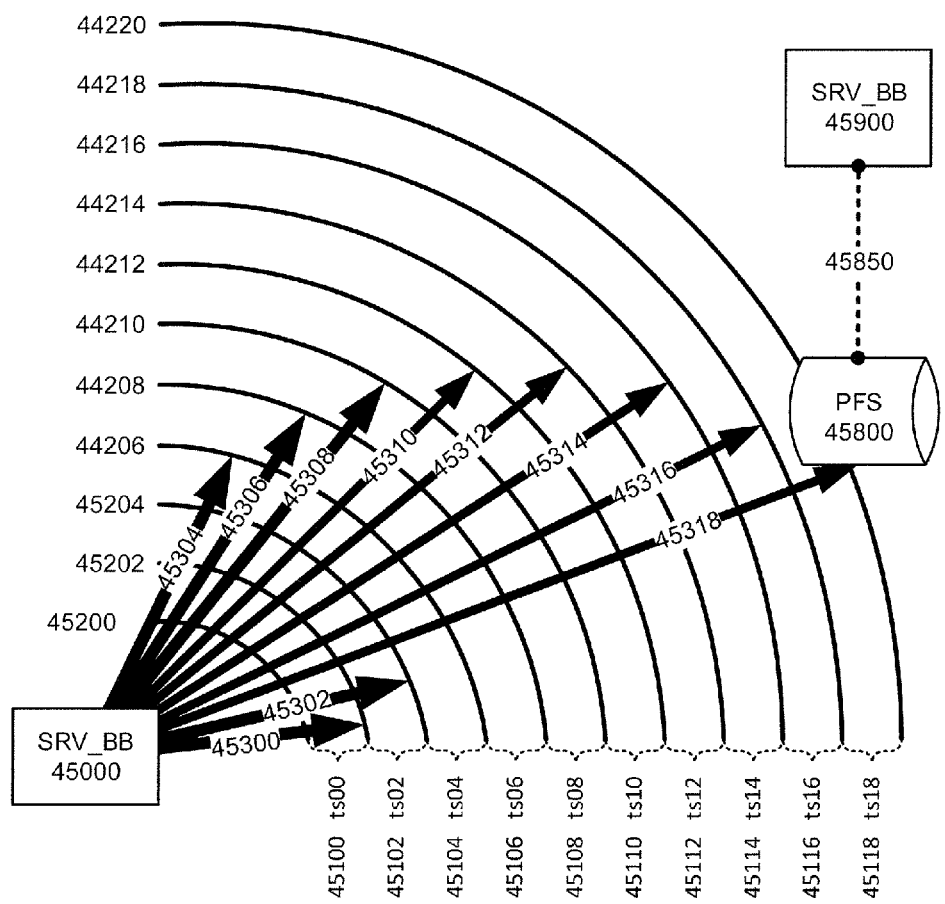
FIG. 45 illustrates an exemplary Tick use in Beacon flashes.

FIG. 45 illustrates an exemplary Tick use in Beacon flashes. This figure illustrates the importance of the utilization of ticks in a real world application, a data beacon. All pulses of information begin at the same origin 45200 which is at a backbone server (SRV_BB) 45000 and radiate outwards. This figure demonstrates 10 pulses from origin to the furthest point where an information file is written to a remote parallel file system (PFS) storage device PFS 45800 for retrieval and for use by SRV_BB 45900 in the remote region. An SRV_BB could also be a Sling node or other device.

The pulses are 45300 through 45318 and the duration of time between each pulse is noted as ts00 45100 through ts18 45118. These pulses should occur at defined intervals so that each flash can be relied on. These can carry simple to complex data. The key point is that the beacon is reliable.

The combination timing of multiple Beacon flashes is called the Pulse rate. And the frequency is the Δt between two flashes. Regarding tolerance, this has to do with the latency and the demand for information currency. How current information is when received is a function of the latency. The freshness of the information is a function of the latency plus the delay between pulses.

For example, if latency is 50 ms from 45000 to 45800 and pulse frequency and tick granularity are every 1 ms, then the info is always fresh. However, if the frequency is 3 ms between pulses and tick granularity is 1 ms, then there is a chance that the information could be stale by 2 ms.

The freshness of the information assumes sending of pulse at best possible wire speed and as most efficient sending and receiving as possible.

Figure 46:
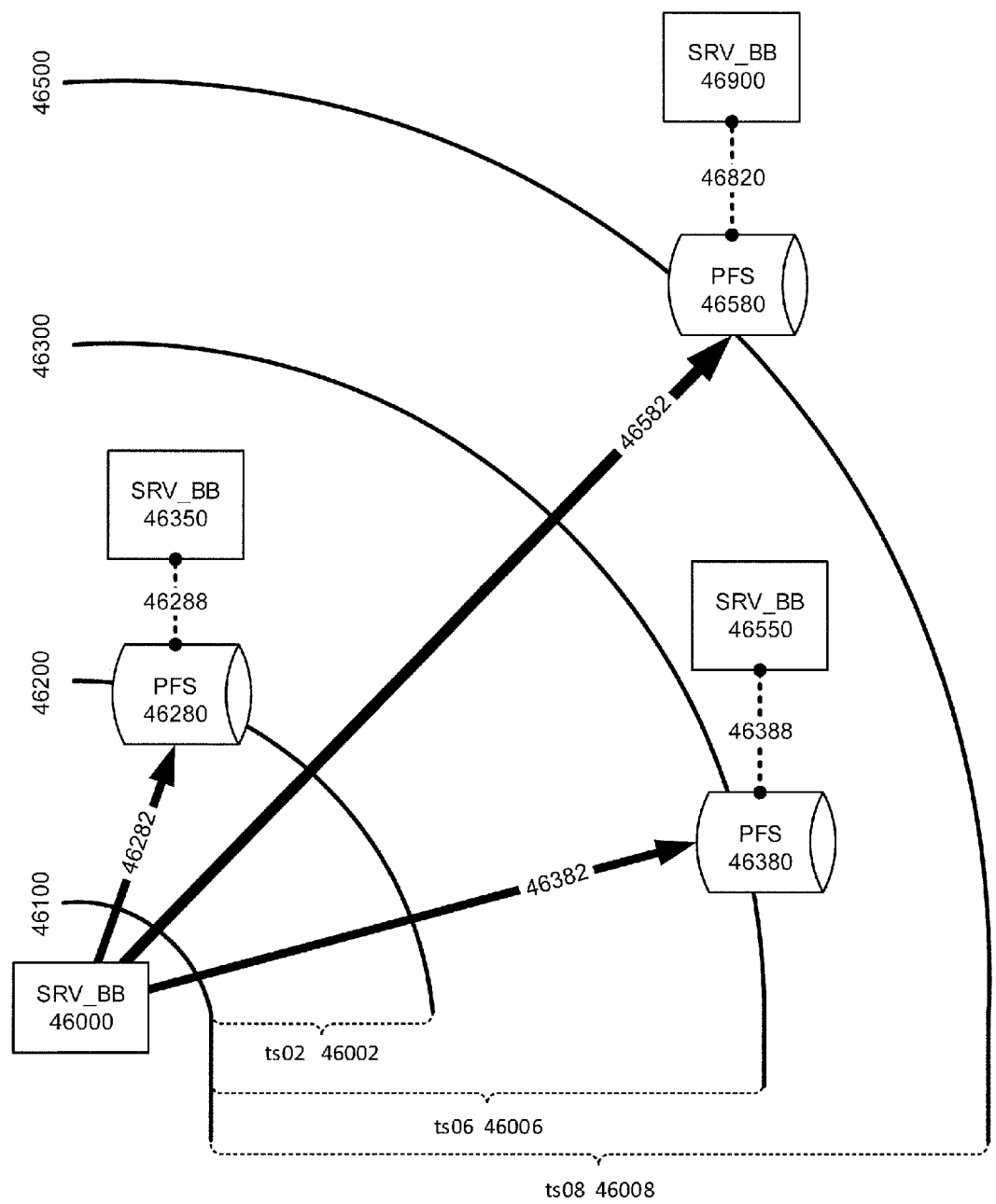
FIG. 46 illustrates an exemplary Tick use in Beacon Multiple Pulse.

FIG. 46 illustrates an exemplary Tick use in Beacon Multiple Pulse. This figure illustrates the tick use in a real-world application such as a Multiple Pulse Information Beacon to various regions. The point of origin for information is SRV_BB 46000 at perimeter 46100. There are three Beacon Pulses which are sent at the exact same tick of time to three different locations which are at varying distances from origin. The three destination locations are target PFS 46280 at 46200 via path 46282, to PFS 46580 via path 46582, and to PFS 46380 via path 46382.

The assumption is that there is a one-way transport of information as a file sent at as close to wire speed as possible from SRV_BB 46000 to be written via remote direct memory access (RDMA) to each PFS. The beacon ensures that information is conveyed globally and combined with multiple pulses ensures that information is always as fresh as possible by combining known latency between two points with consistent granularity of ticks for the sending of the Beacon information pulse/flash and the receiving and then the granularity of a tick for the processing and then subsequent use of received files.

There are more applications for this beyond that which is illustrated.

Figure 47:
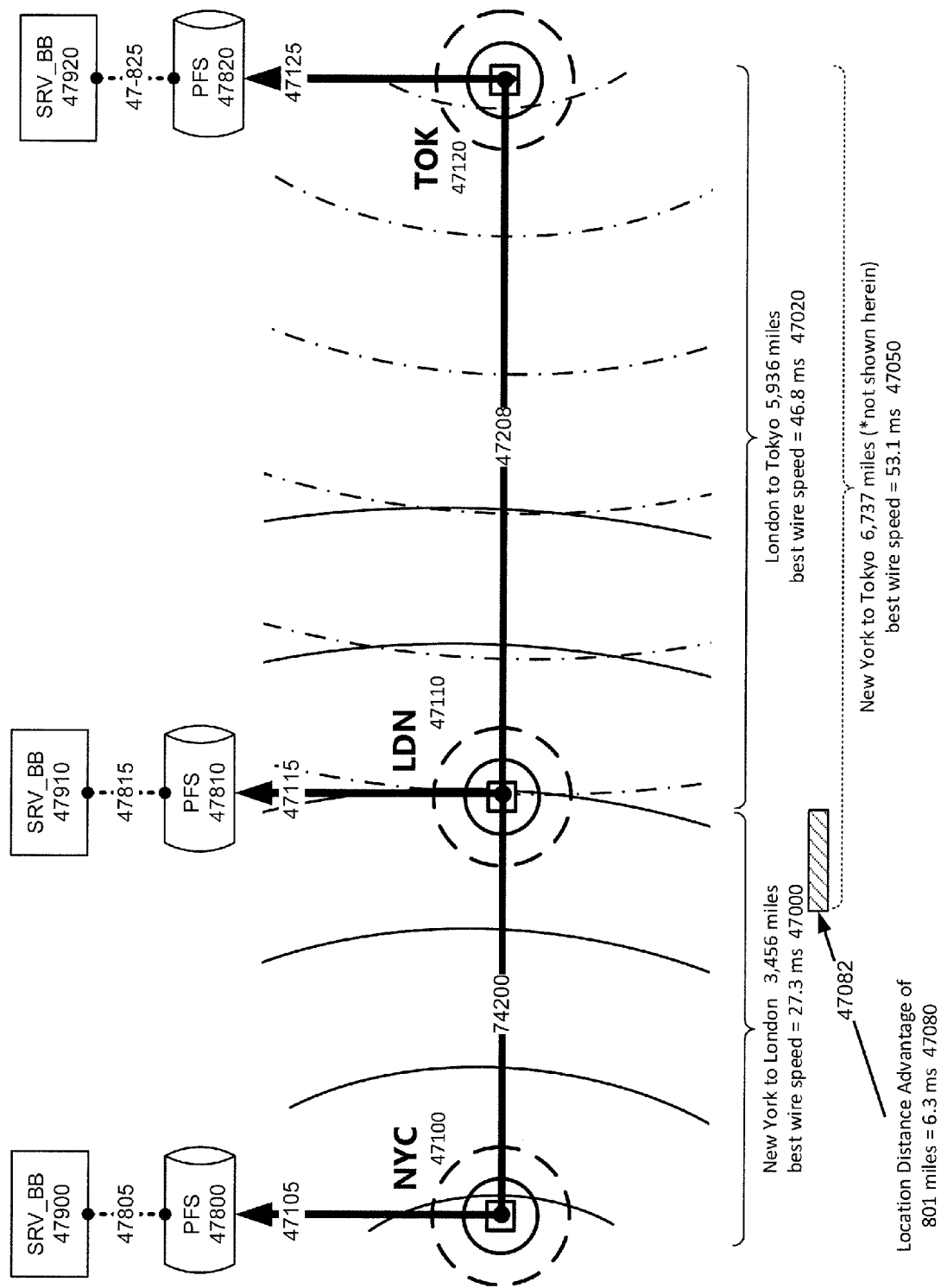
FIG. 47 illustrates an exemplary Tick use in Beacon at intersection points.

FIG. 47 illustrates an exemplary Tick use in Beacon at intersection points. This figure illustrates the granularity of a tick used in a real-world application such as the sending of multiple beacon pulses from two locations and the intersection point of the pulses at a third location.

The first origin of information transmitted by a pulsing information beacon is at NYC 47100. Pulses are sent to LDN 47110 via path 74200. The second origin of information transmitted by a pulsing information beacon is at TOK 47120. Pulses are sent to LDN 47110 via path 47208. In this example, pulses from both origins have been synchronized to overlap. This can be by adjusting start times or by aligning ticks and sending rates.

For this example, NYC represents New York, N.Y., USA, LDN represents London, England, UK, and TOK represents Tokyo, Japan.

The segments between the locations are indicated as well as the best wire speed in one direction for information.

The distance between New York and London is 3,456 miles and the best one-way wire speed 47000 is equal to 27.3 ms. The distance between Tokyo and London is 5,936 miles and the best one-way wire speed is 47020 is equal to 46.8 ms. Not illustrated on the upper part of the diagram but compared below is the distance between New York and Tokyo which is 6,737 miles and the best one-way wire speed between them is 47080 is 53.1 ms.

For example, in financial markets where pricing data, other information, and related news from different global regions is relevant and can influence trading in a local market, having the freshest and up to date information is mission critical. A super computer node (SCN) in London is able to receive information about New York and Tokyo and can react accordingly. If for example pricing in Tokyo starts fluctuating, London can react faster than New York by a Location Distance Advantage of 801 miles 47082 which is equal to 6.3 ms.

The granularity of a tick and its impact on timing and sequencing therefore is of mission critical importance to traders seeking an advantage.

There are many other examples of how multiple pulses from diverse locations can benefit from reliable granularity of ticks.

Figure 48:
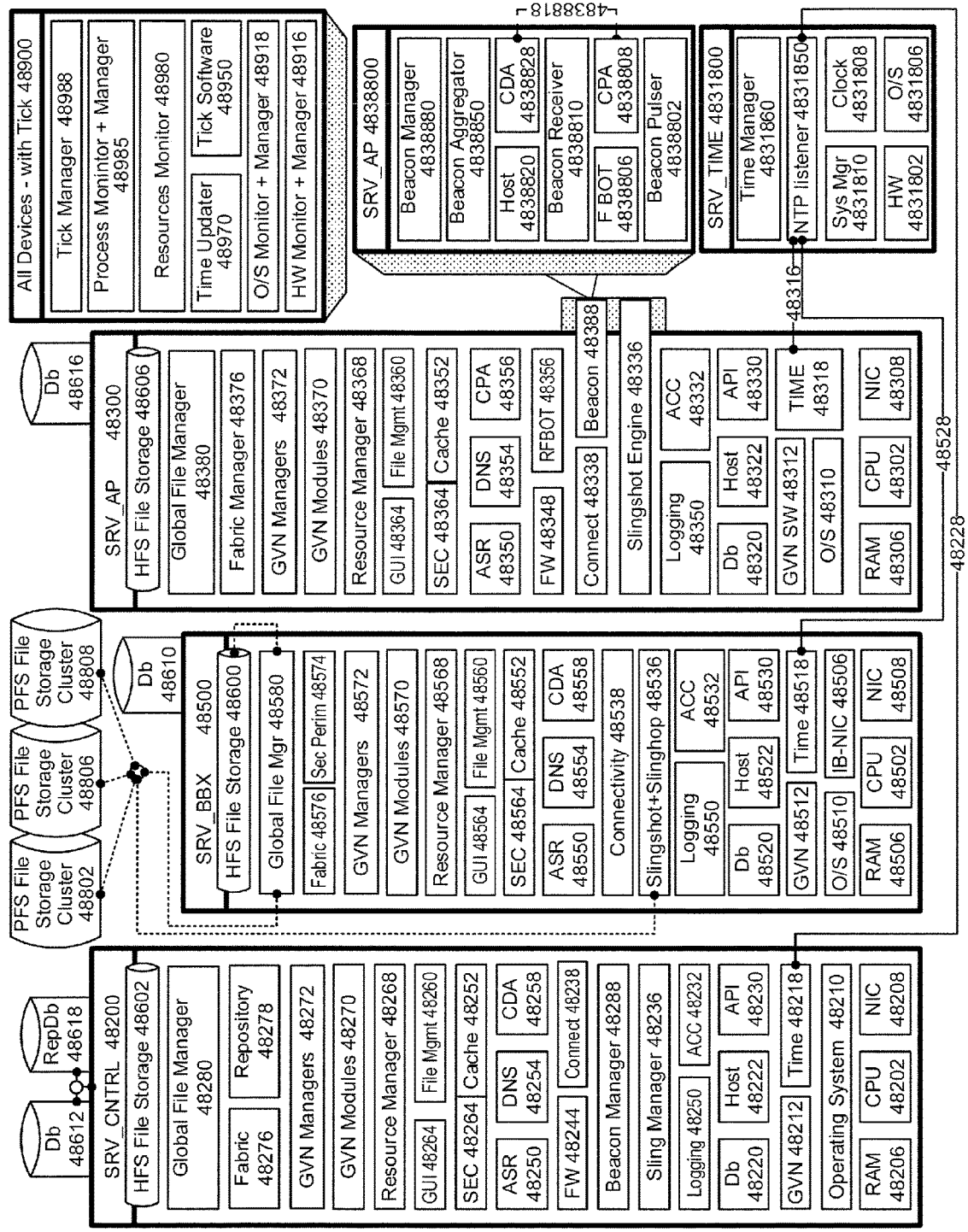
FIG. 48 illustrates an exemplary systems diagram of granularity of a tick.

FIG. 48 illustrates an exemplary systems diagram of granularity of a tick. This figure describes the various modules running on various devices which could utilize the granularity of a tick described herein. The generic device All Devices—with Tick 48900 can be applied to any device for which the granularity of a tick is important. The HW Monitor+Manager 48916 evaluates available resources, system load, HW potential and current use, and other factors which may influence timing.

The O/S Monitor+Manager 48918 evaluates the processes and other system related items running which can have an influence on timing. The Time Updater 48970 interacts with the time server (SRV_TIME) 4831800 via NTP listener 4831850 to request and receive make the most current time.

Tick Software 48950 on All Devices—with Tick 48900 operates to ensure that the granularity of a tick is as efficient as possible. It interacts with monitors and managers. Built in software and plugins and other methods can be utilized to extend this out. The Resources Monitor 48980 and Process Mon.+Manager 48985 can provide information to the Tick Manager 48988.

The modules, managers, HW components, and other constituent parts demonstrated herein are for example only and may differ in real world use. Other devices may also utilize granularity of a tick for various kinds of functionality.

A key unifying thread between all of them is the importance of time. And therefore system time must be accurate and the granularity of a tick reliable so that events and especially sequential events can be processed and executed in a predictable fashion.

The invention claimed is:

1. A system for file transfer and processing in a network environment, comprising:
one or more processors, coupled to a first device, configured to:
determine a distance between the first device and a second device located in a remote region;
in response to determining that the distance is greater than a predetermined threshold:
retrieve a first file from a first file queue, wherein the first file is stored in a first local store of the first device, wherein the first file is transferred from the second device via a Remote Direct Memory Access write process initiated by the second device, and wherein the first file comprises a request from the second device;
process the retrieved first file;
in response to processing the retrieved first file, transfer a second file to a second file queue stored in a second local store of the second device, the second local store being located in the remote region, wherein the second file is transferred to the second file queue via a Remote Direct Memory Access write process initiated by the first device, and wherein the second file comprises a response to the request.

2. The system of claim 1, wherein the second remote device is a backbone exchange server.

3. The system of claim 1, further comprising a dedicated link between the first device and the second remote device.

4. The system of claim 1, wherein at least one file among the first file and the second file comprises a header, a body, and a footer.

5. The system of claim 4, wherein the footer comprises a marker that indicates an end of the at least one file.

6. The system of claim 4, wherein the at least one file comprises a key value pair.

7. The system of claim 4, wherein the footer comprises checksum to validate integrity of the body.

8. The system of claim 1, wherein the Remote Direct Memory Access is implemented based on at least one of Infiniband or fibre channel.

9. The system of claim 1, wherein at least one file among the first file and the second file comprises executable code.

10. The system of claim 1, wherein the one or more processors are further configured to: if the first file is determined to be complete, at least one of set a flag on the first file, move the first file to a folder or delete the first file from the first local store.

* * * * *